(12) United States Patent  
McCabe et al.

(10) Patent No.: US 7,710,631 B2  
(45) Date of Patent: May 4, 2010

(54) REFLECTIVE MIRROR ASSEMBLY

(75) Inventors: Ian A. McCabe, Holland, MI (US); Desaraju V. Varaprasad, Holland, MI (US); Hamid Habibi, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/429,620

(22) Filed: Apr. 24, 2009

(65) Prior Publication Data  
US 2009/0207514 A1 Aug. 20, 2009

Related U.S. Application Data

(63) Continuation of application No. 11/956,893, filed on Dec. 14, 2007, now Pat. No. 7,525,715, which is a continuation of application No. 11/709,625, filed on Feb. 22, 2007, now Pat. No. 7,310,177, which is a continuation of application No. 10/533,762, filed as application No. PCT/US2003/035381 on Nov. 5, 2003, now Pat. No. 7,184,190, said application No. 10/533,762 is a continuation-in-part of application No. 10/528,269, filed as application No. PCT/US2003/29776 on Sep. 19, 2003, now Pat. No. 7,274,501.

(60) Provisional application No. 60/490,111, filed on Jul. 25, 2003, provisional application No. 60/423,903, filed on Nov. 5, 2002, provisional application No. 60/412,275, filed on Sep. 20, 2002, provisional application No. 60/424,116, filed on Nov. 5, 2002, provisional application No. 60/489,816, filed on Jul. 24, 2003.

(51) Int. Cl.  
G02F 1/15 (2006.01)

(52) U.S. Cl. ................... 359/265; 359/267; 359/238

(58) Field of Classification Search ............... 359/265, 359/267, 238, 237, 241, 242, 245, 270  
See application file for complete search history.

(56) References Cited

U.S. PATENT DOCUMENTS 2,263,382 A 11/1941 Gotzinger (Continued)

FOREIGN PATENT DOCUMENTS

EP 0356099 A2 2/1990

(Continued)

Primary Examiner—Timothy J Thompson  
(74) Attorney, Agent, or Firm—Van Dyke, Gardner, Linn & Burkhart, LLP

(57) ABSTRACT

An interior rearview mirror assembly includes a reflective element assembly having a front substrate and a rear substrate with an electro-optic medium sandwiched therebetween. A substantially non-transparent perimeter band is disposed at the second surface of the front substrate and around a perimeter border region of the second surface of the front substrate. The perimeter band is not specularly reflective to visible light that passes through the first substrate and is incident on the perimeter band. A first electrical connection is at the first electrically conductive layer at a first overhang region and a second electrical connection is at the second electrically conductive layer. The perimeter band is dimensioned so as to render the presence of the perimeter seal and at least the first electrical connection substantially unobservable to a driver normally viewing the reflective element assembly when the vehicle is normally equipped with the interior rearview mirror assembly.

39 Claims, 35 Drawing Sheets

U.S. PATENT DOCUMENTS

| | | |
|---|---|---|
| 2,580,014 A | 12/1951 | Gazda |
| 3,266,016 A | 8/1966 | Maruyama et al. |
| 3,280,701 A | 10/1966 | Donnelly et al. |
| 4,435,042 A | 3/1984 | Wood et al. |
| 4,436,371 A | 3/1984 | Wood et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,679,906 A | 7/1987 | Brandenburg |
| 4,712,879 A | 12/1987 | Lynam et al. |
| 4,721,364 A | 1/1988 | Itoh et al. |
| 4,773,740 A | 9/1988 | Kawakami et al. |
| 4,793,690 A | 12/1988 | Gahan et al. |
| 4,799,768 A | 1/1989 | Gahan |
| 4,826,289 A | 5/1989 | Vandenbrink et al. |
| 4,882,466 A | 11/1989 | Friel |
| 4,882,565 A | 11/1989 | Gallmeyer |
| 4,906,085 A | 3/1990 | Sugihara et al. |
| 4,948,242 A | 8/1990 | Desmond et al. |
| 5,014,167 A | 5/1991 | Roberts |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,115,346 A | 5/1992 | Lynam |
| 5,117,346 A | 5/1992 | Gard |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,233,461 A | 8/1993 | Dornan et al. |
| 5,253,109 A | 10/1993 | O'Farrell et al. |
| 5,285,060 A | 2/1994 | Larson et al. |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,406,414 A | 4/1995 | O'Farrell et al. |
| 5,437,931 A | 8/1995 | Tsai et al. |
| 5,446,576 A | 8/1995 | Lynam et al. |
| 5,481,409 A | 1/1996 | Roberts |
| 5,509,606 A | 4/1996 | Breithaupt et al. |
| 5,523,877 A | 6/1996 | Lynam |
| 5,525,264 A | 6/1996 | Cronin et al. |
| 5,535,056 A | 7/1996 | Caskey et al. |
| 5,550,677 A | 8/1996 | Schofield et al. |
| 5,567,360 A | 10/1996 | Varaprasad et al. |
| 5,575,552 A | 11/1996 | Faloon et al. |
| 5,587,236 A | 12/1996 | Agrawal et al. |
| 5,587,699 A | 12/1996 | Faloon et al. |
| 5,594,222 A | 1/1997 | Caldwell |
| 5,610,756 A | 3/1997 | Lynam et al. |
| 5,649,756 A | 7/1997 | Adams et al. |
| 5,668,663 A | 9/1997 | Varaprasad et al. |
| 5,669,698 A | 9/1997 | Veldman et al. |
| 5,689,370 A | 11/1997 | Tonar et al. |
| 5,724,187 A | 3/1998 | Varaprasad et al. |
| 5,751,489 A | 5/1998 | Caskey et al. |
| 5,788,357 A | 8/1998 | Muth et al. |
| 5,790,298 A | 8/1998 | Tonar |
| 5,808,777 A | 9/1998 | Lynam et al. |
| 5,877,897 A | 3/1999 | Schofield et al. |
| 5,910,854 A | 6/1999 | Varaprasad et al. |
| 5,922,176 A | 7/1999 | Caskey |
| 5,938,320 A | 8/1999 | Crandall |
| 6,001,486 A | 12/1999 | Varaprasad et al. |
| 6,002,544 A | 12/1999 | Yatsu |
| 6,005,724 A | 12/1999 | Todd |
| 6,065,840 A | 5/2000 | Caskey et al. |
| 6,111,684 A | 8/2000 | Forgette et al. |
| 6,154,306 A | 11/2000 | Varaprasad et al. |
| 6,164,564 A | 12/2000 | Franco et al. |
| 6,172,613 B1 | 1/2001 | DeLine et al. |
| 6,178,034 B1 | 1/2001 | Allemand et al. |
| 6,196,688 B1 | 3/2001 | Caskey et al. |
| 6,207,083 B1 | 3/2001 | Varaprasad et al. |
| 6,245,262 B1 | 6/2001 | Varaprasad et al. |
| 6,257,746 B1 | 7/2001 | Todd et al. |
| 6,260,608 B1 | 7/2001 | Kim |
| 6,286,965 B1 | 9/2001 | Caskey et al. |
| 6,310,611 B1 | 10/2001 | Caldwell |
| 6,318,870 B1 | 11/2001 | Spooner et al. |
| 6,320,282 B1 | 11/2001 | Caldwell |
| 6,329,925 B1 | 12/2001 | Skiver et al. |
| 6,356,376 B1 | 3/2002 | Tonar et al. |
| 6,420,036 B1 | 7/2002 | Varaprasad et al. |
| 6,428,172 B1 | 8/2002 | Hutzel et al. |
| 6,441,964 B1 | 8/2002 | Chu et al. |
| 6,449,082 B1 | 9/2002 | Agrawal et al. |
| 6,501,387 B2 | 12/2002 | Skiver et al. |
| 6,512,624 B2 | 1/2003 | Tonar et al. |
| 6,595,649 B2 | 7/2003 | Hoekstra et al. |
| 6,615,438 B1 | 9/2003 | Franco et al. |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,719,215 B2 | 4/2004 | Drouillard |
| 6,737,629 B2 | 5/2004 | Nixon et al. |
| 6,742,904 B2 | 6/2004 | Bechtel et al. |
| D493,131 S | 7/2004 | Lawlor et al. |
| D493,394 S | 7/2004 | Lawlor et al. |
| 6,824,281 B2 | 11/2004 | Schofield et al. |
| 6,831,268 B2 | 12/2004 | Bechtel et al. |
| 7,106,392 B2 | 9/2006 | You |
| 7,184,190 B2 | 2/2007 | McCabe et al. |
| 7,274,501 B2 | 9/2007 | McCabe et al. |
| 7,310,177 B2 | 12/2007 | McCabe et al. |
| 7,525,715 B2 * | 4/2009 | McCabe et al. ............. 359/265 |
| 2002/0036828 A1 | 3/2002 | Wong |
| 2002/0159270 A1 | 10/2002 | Lynam et al. |
| 2003/0043589 A1 | 3/2003 | Blank |
| 2003/0101749 A1 | 6/2003 | Lingle et al. |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2005/0195488 A1 | 9/2005 | McCabe et al. |
| 2006/0050356 A1 | 3/2006 | McCabe et al. |
| 2006/0126150 A1 | 6/2006 | Tonar et al. |

FOREIGN PATENT DOCUMENTS

| | | |
|---|---|---|
| JP | 362075619 A | 4/1987 |
| WO | WO 2004/026633 A2 | 4/2004 |
| WO | WO 2004/058540 A3 | 7/2004 |
| WO | WO 2004/103772 A2 | 12/2004 |

* cited by examiner

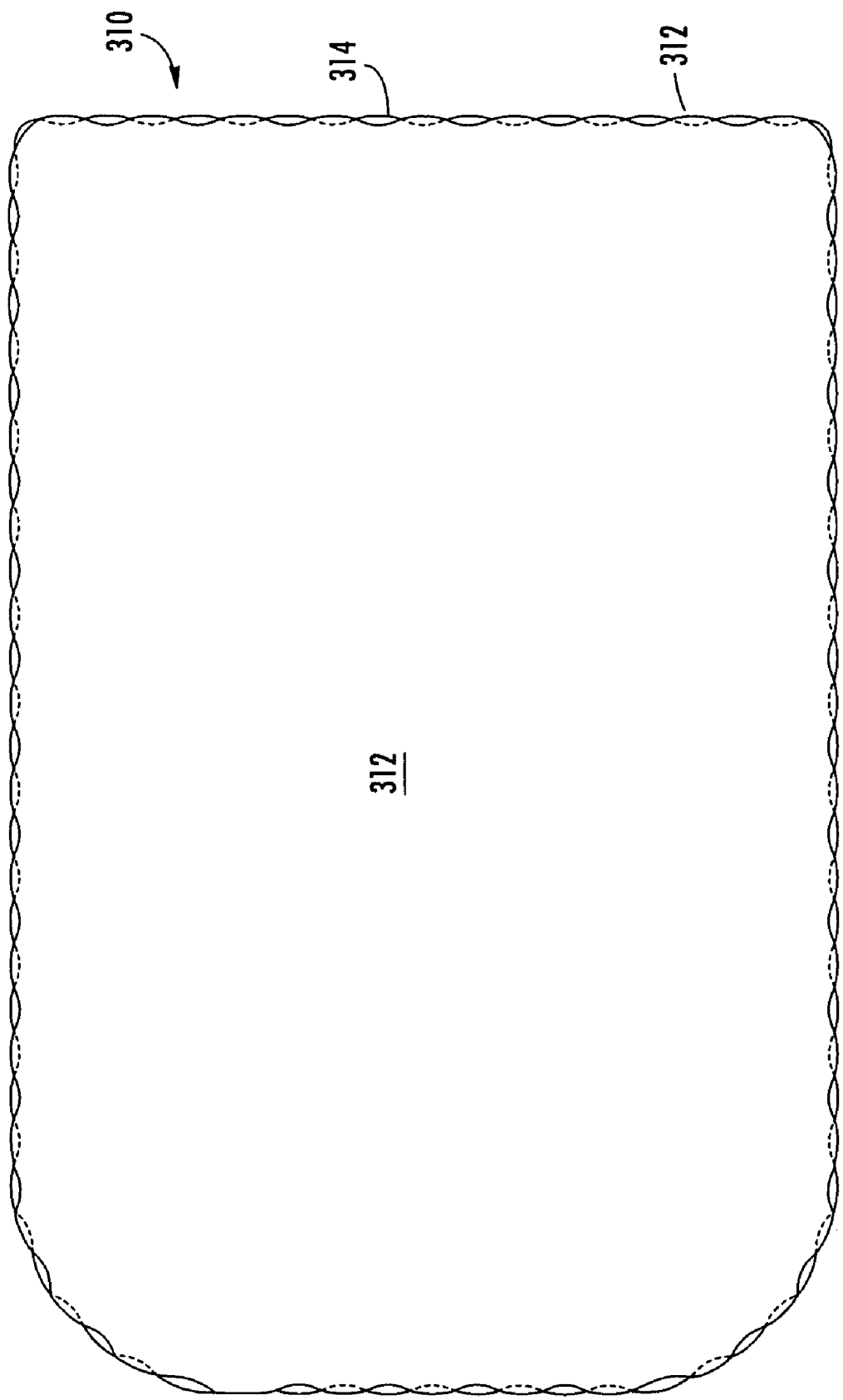

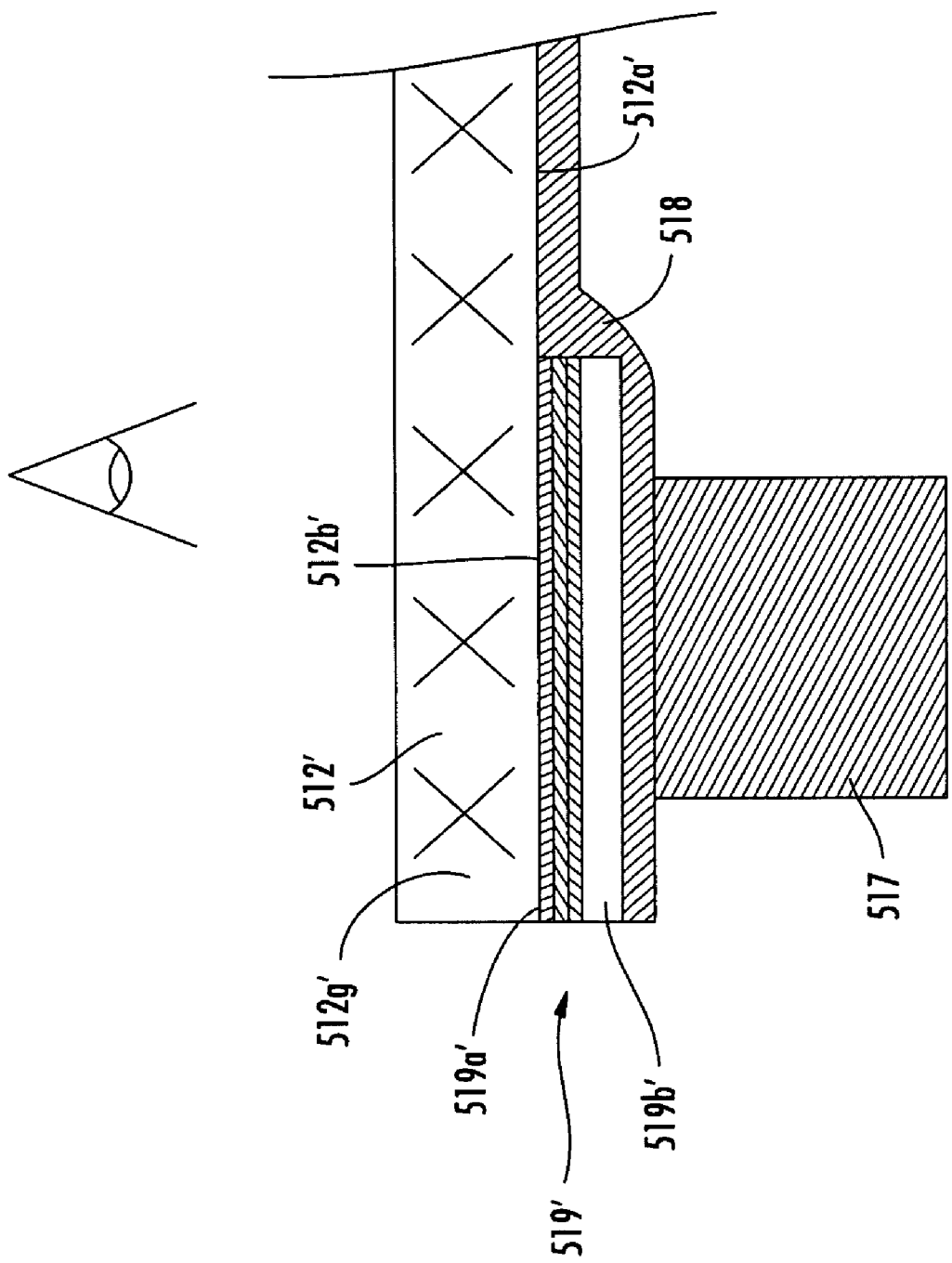

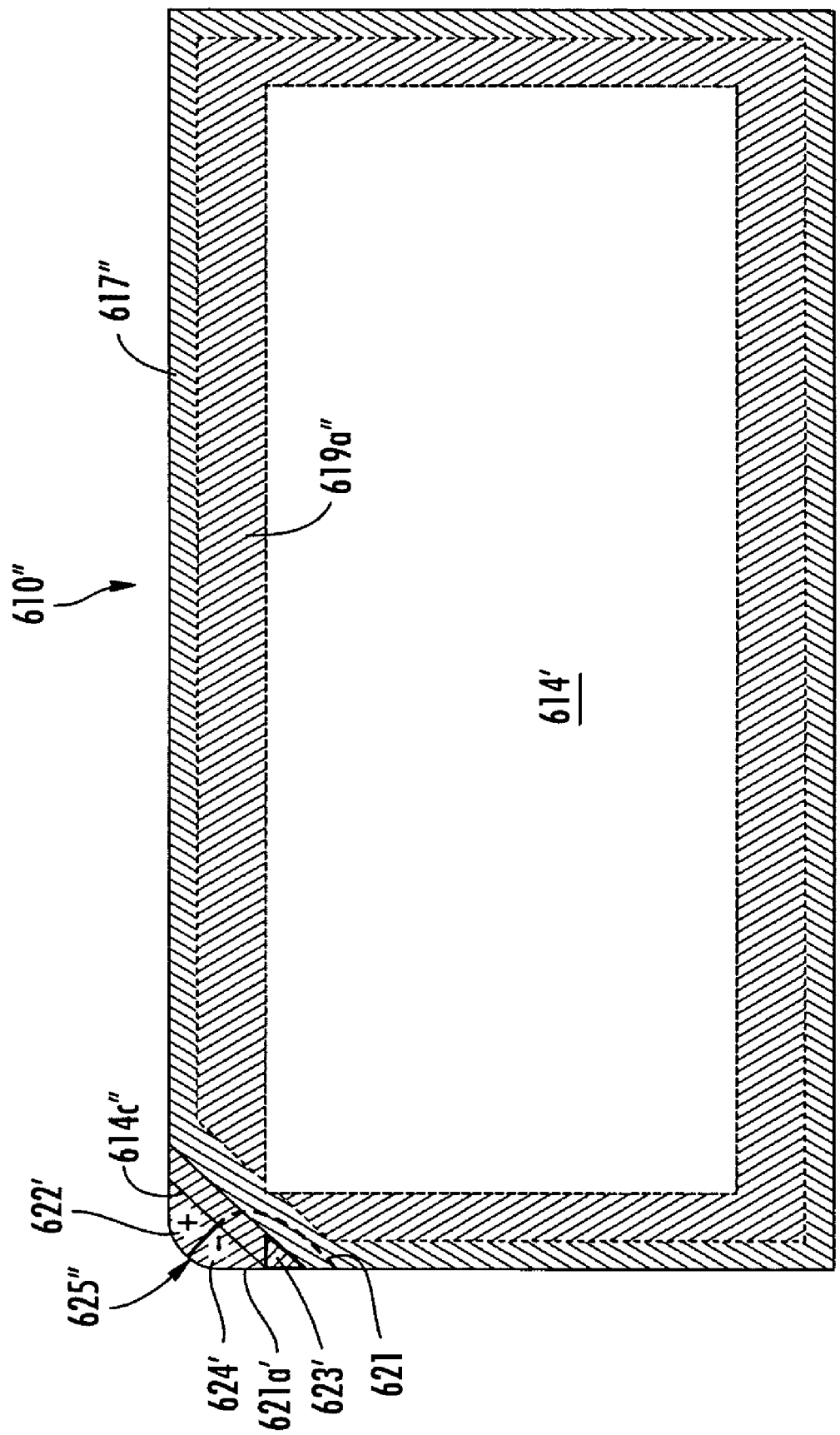

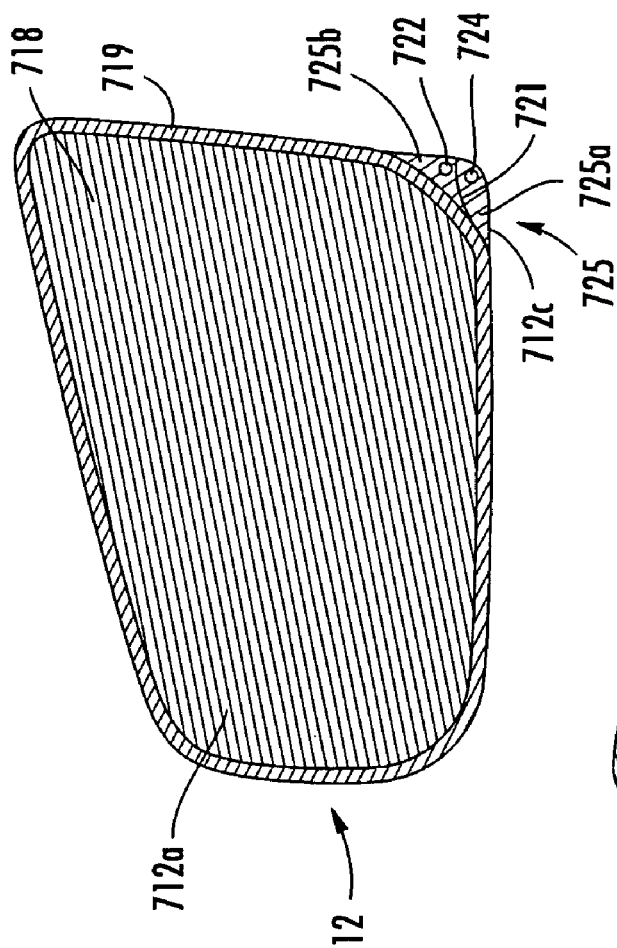
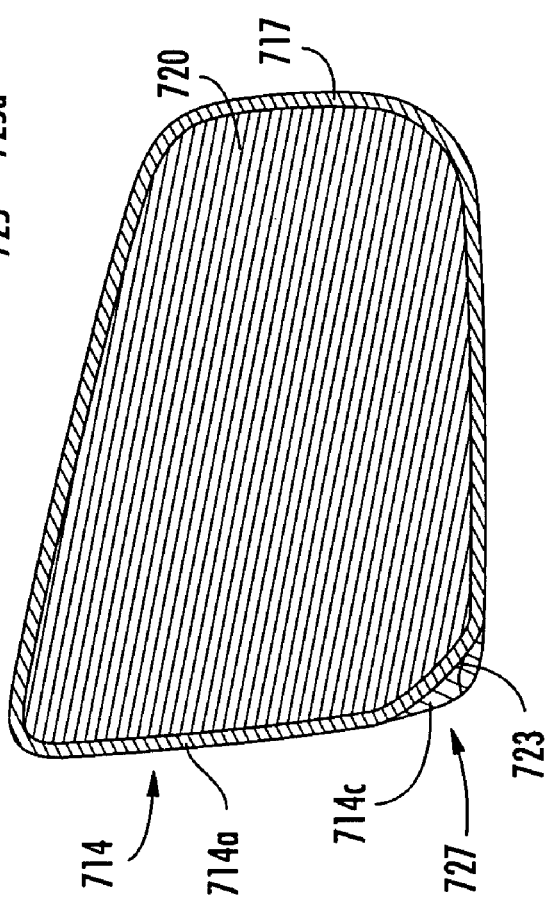

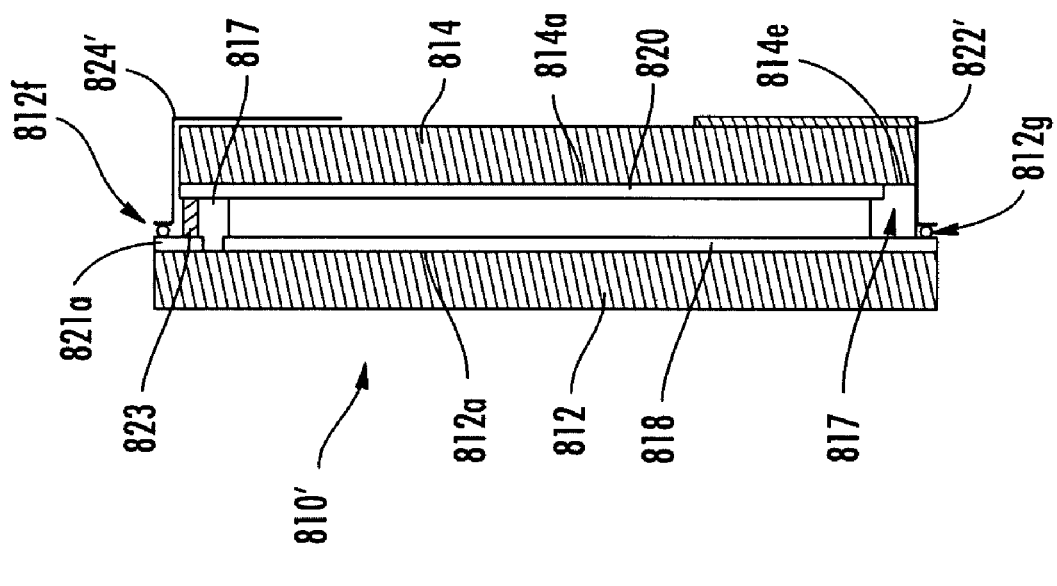
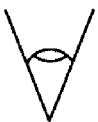
FIG. 28

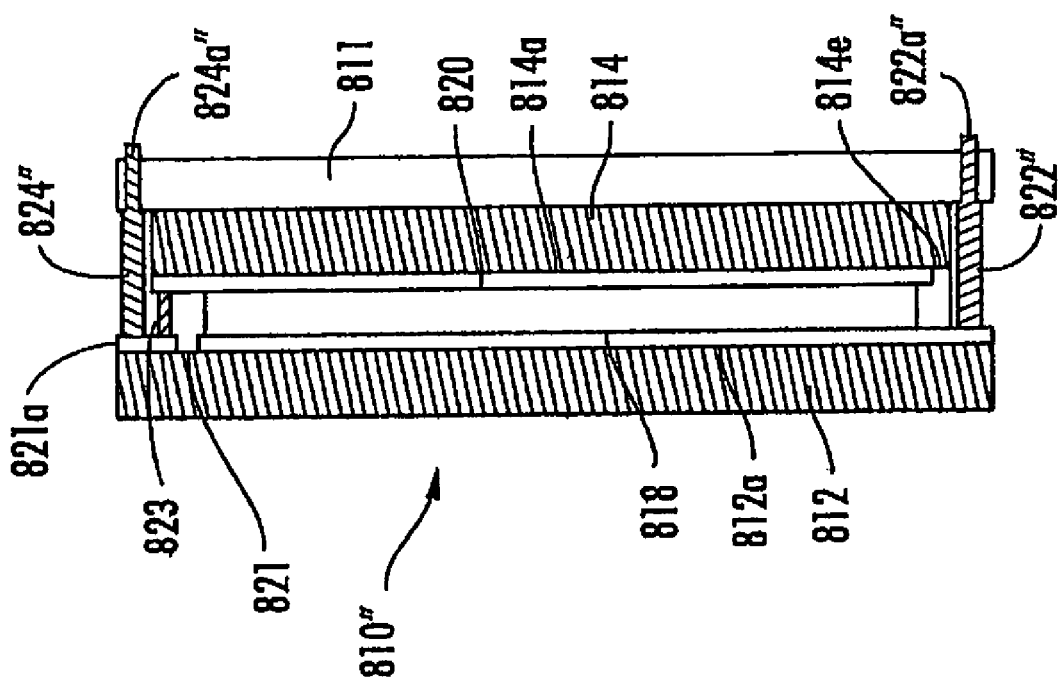
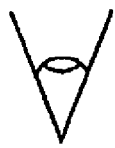
FIG. 29

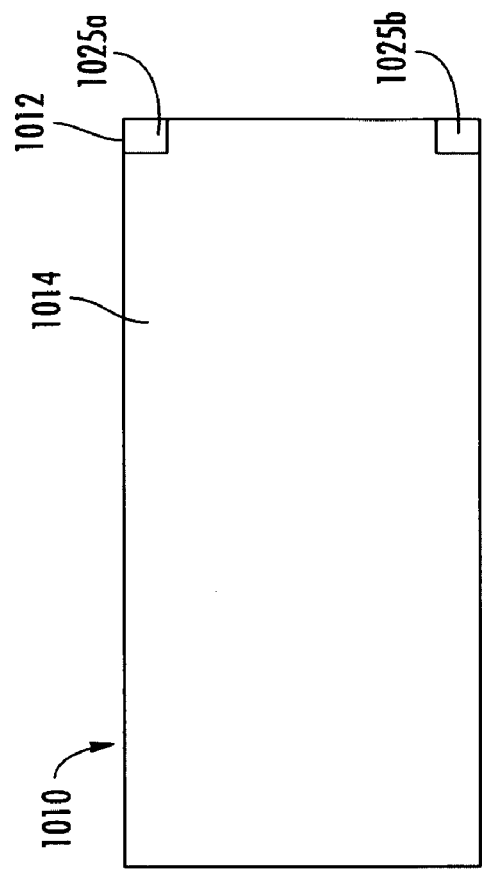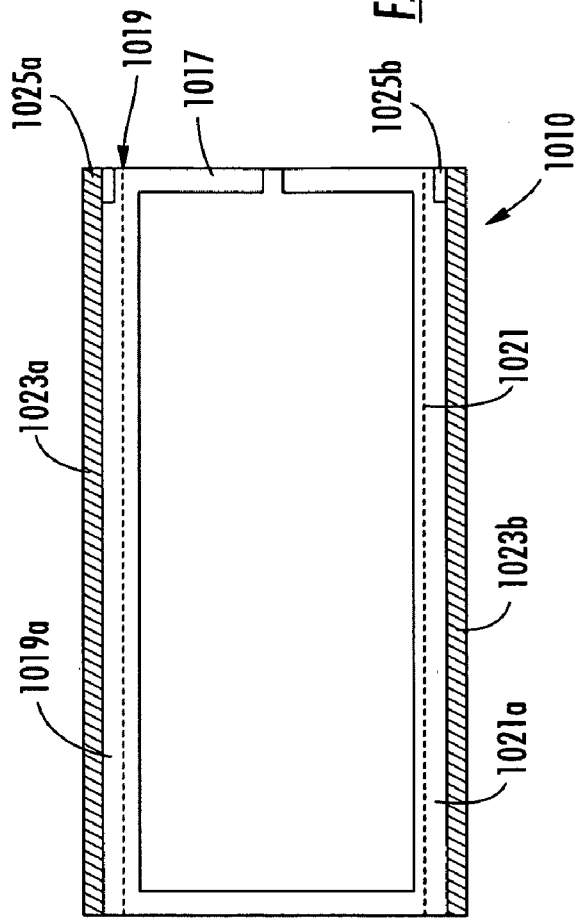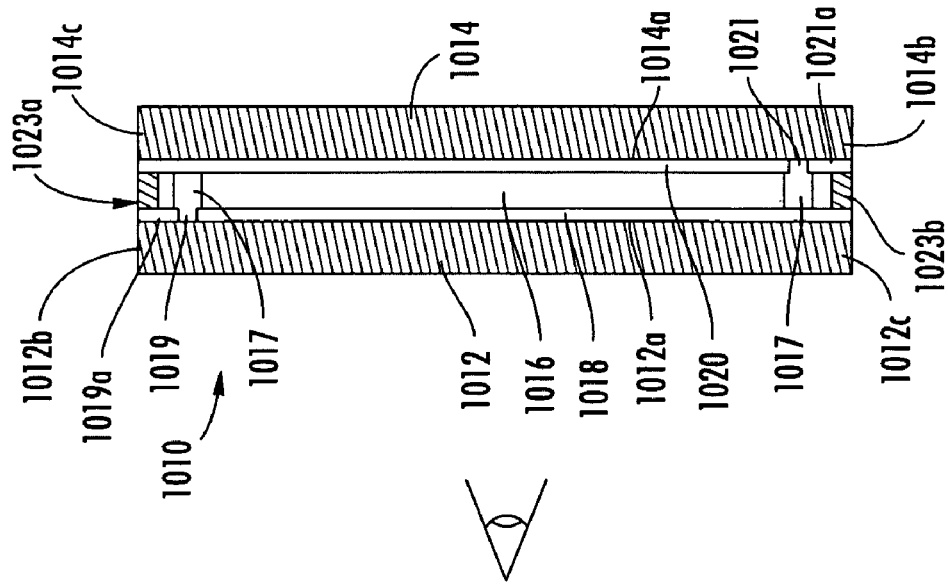

REFLECTIVE MIRROR ASSEMBLY

CROSS REFERENCE TO RELATED APPLICATIONS

The present application is a continuation of U.S. patent application Ser. No. 11/956,893, filed Dec. 14, 2007, now U.S. Pat. No. 7,525,715, which is a continuation of U.S. patent application Ser. No. 11/709,625, filed Feb. 22, 2007, now U.S. Pat. No. 7,310,177, which is a continuation of U.S. patent application Ser. No. 10/533,762, filed May 4, 2005, now U.S. Pat. No. 7,184,190, which is a 371 application of PCT Application No. PCT/US2003/035381, filed Nov. 5, 2003, which claims priority of U.S. provisional applications, Ser. No. 60/490,111, filed Jul. 25, 2003, and Ser. No. 60/423,903, filed Nov. 5, 2002; and U.S. patent application Ser. No. 10/533,762 is a continuation-in-part of U.S. patent application Ser. No. 10/528,269, filed Mar. 17, 2005, now U.S. Pat. No. 7,274,501, which is a 371 application of PCT Application No. PCT/US2003/029776, filed Sep. 19, 2003, which claims priority of U.S. provisional applications, Ser. No. 60/412,275, filed Sep. 20, 2002; Ser. No. 60/424,116, filed Nov. 5, 2002; and Ser. No. 60/489,816, filed Jul. 24, 2003, which are all hereby incorporated herein by reference in their entireties.

FIELD OF THE INVENTION

The present invention relates to an electro-optic reflective element assembly for an electro-optic mirror assembly, such as an electrochromic interior or exterior rearview mirror assembly for a vehicle, and, more particularly, to an electro-optic rearview mirror assembly which includes an electro-optic reflective element assembly with a reduced bezel.

BACKGROUND OF THE INVENTION

Variable reflectivity mirror assemblies, such as electro-optic mirror assemblies, such as electrochromic mirror assemblies, are known and are widely implemented in vehicles. The reflective element assembly of such a mirror assembly often includes two substrates or glass elements with an electrochromic medium sandwiched therebetween. The back or outer surface of the second substrate (commonly referred to as the fourth surface of the reflective element assembly) may include a silvered coating to provide reflectance of an image. Each substrate is coated with at least one conductive or semi-conductive layer, which conduct electricity to the electrochromic medium from an electrical connector clipped or otherwise fastened or secured at least partially along an edge of the substrate and layer. An example of a known electrochromic reflective element assembly is shown in FIGS. 1 and 2. The reflective element includes an electrochromic (EC) medium layer 1 sandwiched between conductive layers 2 and a seal 7 at a front glass substrate 3 and a rear glass substrate 4 (and may include other conductive or semi-conductive layers). The substrates are offset so that an upper edge of one substrate and its conductive coating extends above the upper edge of the other substrate, while the lower edge of the other substrate and its conductive coating extends below the lower edge of the other substrate. This offset allows for electrical connection of electrical connectors or busbars 5 to the conductive coatings of each substrate, as shown in FIG. 2. The busbars or electrical connectors or clips extend substantially along the entire upper or lower edge of the respective substrate and coating. However, in order to manufacture the mirror element to obtain the desired offset, one or more offset or stepped spacers or pins 6 (shown in phantom in FIG. 2) must be placed along one of the upper and lower edges of the substrates to properly space the substrates from one another and to provide the offset along the edges when the substrates are placed in an assembly fixture.

As shown in FIG. 3, another conventional offset mirror element includes a coating on one of the substrates which provides a tab out portion 7 for connection of an electrical clip thereto. The substrates are offset in a similar manner as shown in the embodiment of FIGS. 1 and 2 to provide clearance at the tab out portion for the electrical connection. Such an embodiment also requires a stepped spacer or pin to provide the appropriate spacing between the substrates and to set the offset between the edges at the desired or appropriate amount.

Typically, it is desirable to minimize the size of the bezel or overlap of the casing/bezel (or even to eliminate the bezel) which extends around the reflective element of the mirror assembly. The bezel is typically required to extend over the front or first surface of the electrochromic cell or reflective element assembly to cover or hide or conceal, for example, the seal around the electrochromic medium of the electrochromic cell (that typically spaces the front substrate from the rear substrate, such as described in U.S. Pat. No. 6,002,511, which is hereby incorporated herein by reference), in order to conceal or hide the seal (and/or the electrical spring conductors, busbar conductors, clips, connectors and/or the like) which may otherwise be visible, particularly when the electrochromic medium is darkened. An exemplary and effective means for hiding the seal and, thus, minimizing the size of the bezel is disclosed in U.S. Pat. No. 5,066,112, which is hereby incorporated herein by reference. Also, and such as described in U.S. Pat. No. 6,449,082, which is hereby incorporated herein by reference, there is typically an offset to allow the clip or connector to connect to the cell or substrate that may influence the size of the overlap or bezel.

In cells or reflective element assemblies that may provide a small bezel or no bezel, it is often difficult to make electrical contact to the semi-conductive and/or conductive layers of the substrates with a restricted overhang between the substrates. A variety of methods have been used to provide electrical power to the semi-conductive and/or conductive layers of electrochromic cells, such as described in U.S. Pat. Nos. 5,066,112; 6,356,376; and 6,512,264, which are hereby incorporated herein by reference.

Therefore, there is a need in the art for an electrochromic mirror element which overcomes the above disadvantages and shortcomings of the prior art.

SUMMARY OF THE INVENTION

The present invention provides an electro-optic or electrochromic interior or exterior rearview mirror assembly which includes an electro-optic or electrochromic cell or reflective element assembly having a pair of substrates and an electro-optic or electrochromic medium disposed between the substrates. The reflective element assembly may include electrical connectors for providing electrical current to the conductive and/or semi-conductive layers or coatings at the surfaces of the substrates opposing the electro-optic medium. The electrical connectors may connect to the substrates at or behind an overhang region of the front substrate such that the connectors are substantially not viewable through the front substrate. The electrical connectors may be electrically isolated from one another and may connect to one of the substrates and may provide electrical current to the respective substrates. One edge or side of each of the substrates of the reflective element assembly may be in flush alignment, while allowing for electrical connection to one of the substrates along the generally flush edges.

According to an aspect of the present invention, a reflective element assembly for a mirror system of a vehicle includes front and rear substrates with an electro-optic medium sandwiched therebetween, a non-conductive seal disposed around a perimeter of the electro-optic medium and between the front and rear substrates, and first and second electrical connectors. The rear substrate has a smaller dimension across a dimension of the rear substrate than a corresponding dimension across the front substrate such that the front substrate defines a first overhang region at a first edge of the front substrate that extends beyond a corresponding first edge of the rear substrate. The front substrate has a first surface and a second surface opposite the first surface. The second surface faces the electro-optic medium. The front substrate has at least one first conductive layer disposed on the second surface. The rear substrate has a third surface and a fourth surface opposite the third surface. The third surface faces the electro-optic medium. The rear substrate has at least one second conductive layer disposed on the third surface. The second conductive layer includes a tab portion that extends at least to a second edge of the rear substrate. The rear substrate includes a non-conductive raceway proximate the second edge and devoid of the second conductive layer except at the tab portion. The non-conductive seal encompasses at least a portion of the second conductive layer and at least a portion of the raceway. The first electrical connector is in electrical connection with the first conductive layer and the second electrical connector is in electrical connection with the tab portion of the second conductive layer. The first electrical connector connects to the first conductive layer at the first overhang region so as to be behind the front substrate and substantially not viewable through the first surface of the front substrate.

The front substrate may include a hiding or concealing layer at the perimeter portions to substantially hide the connectors and seal from view by the driver of the vehicle.

According to another aspect of the present invention, a reflective element assembly for a mirror system for a vehicle includes front and rear substrates with an electro-optic medium sandwiched therebetween, a non-conductive seal disposed around a perimeter of the electro-optic medium and between the front and rear substrates, and first and second electrical connectors. The rear substrate has a smaller dimension across a dimension of the rear substrate than a corresponding dimension across the front substrate such that the front substrate defines a first overhang region at a first edge of the front substrate that extends beyond a corresponding first edge of the rear substrate. The front substrate has a first surface and a second surface opposite the first surface. The second surface faces the electro-optic medium. The front substrate has at least one first conductive layer disposed on the second surface. The rear substrate has a third surface and a fourth surface opposite the third surface. The third surface faces the electro-optic medium. The third surface of the rear substrate has a non-conductive portion proximate the first edge and devoid of the second conductive layer. The non-conductive seal encompasses at least a portion of the non-conductive portion of the rear substrate. The first electrical connector is in electrical connection with the first conductive layer and the second electrical connector is in electrical connection with the second conductive layer. The first electrical connector extends from the fourth surface of the second substrate and over at least a portion of the first edge of the second substrate and toward the first overhang region of the front substrate. The first electrical connector connects to the first conductive surface at the first overhang region so as to be behind the front substrate and substantially not viewable through the first surface of the front substrate. The non-conductive seal and the non-conductive portion substantially electrically isolate the first electrical connector from the second conductive layer.

According to another aspect of the present invention, an electro-optic or electrochromic mirror element includes a pair of substrates and an electro-optic or electrochromic medium sandwiched therebetween. Each of the pair of substrates includes at least one conductive or semi-conductive layer disposed thereon. The pair of substrates are positioned relative to one another such that the upper and/or lower edges of the substrates are substantially flush or aligned with one another. One of the substrates includes a relief area along the aligned edge to provide clearance for electrical connection to the conductive layer or layers of the other substrate along the aligned edge.

According to another aspect of the present invention, an electro-optic or electrochromic mirror assembly for a vehicle comprises an electro-optic or electrochromic reflective element assembly comprising a first substrate having first and second surfaces and a second substrate having third and fourth surfaces. The first and second substrates are arranged so that the second surface opposes the third surface with an electro-optic or electrochromic medium disposed therebetween. The first substrate has at least one at least partially conductive coating or layer on the second surface and the second substrate has at least one at least partially conductive coating or layer on the third surface. The first and second substrates are positioned relative to one another such that at least a portion of a first edge of the first substrate is generally flush or aligned with a corresponding edge of the second substrate. The first edge of the first substrate has a relief area formed therealong, wherein the relief area provides clearance for electrical connection to the corresponding edge of the second substrate.

In one form, the conductive coating of the second substrate includes a tab out portion at the corresponding edge. The relief area of the first substrate provides clearance for electrical connection to the tab out portion of the at least one conductive coating or layer. The first substrate may be the front substrate and the second substrate may be the rear substrate, with the aligned or generally flush edges being along the upper edges of the substrates.

Therefore, the present invention provides an electro-optic or electrochromic cell or mirror reflective element assembly that provides an overhang region at least one edge of the front substrate for electrical connection to the conductive layer at the rear surface of the substrate, such that the electrical connection is not viewable through the front surface of the front substrate. The present invention thus may provide a reflective element assembly that is suitable for use in a bezelless mirror assembly, where the front surface of the reflective element is substantially entirely viewable by a driver of the vehicle. Optionally, a reflective element assembly of the present invention may provide a flush alignment of an upper and/or lower edge of a pair of substrates, while providing clearance for electrical connection to the upper and/or lower edges of one of the substrates and the respective conductive coating. The present invention thus provides enhanced assembly processes for the mirror element, since the substrates may be aligned with one another within an assembly fixture and do not require stepped pins or spacers positioned along one edge to provide sufficient offset or staggering between the substrates to provide clearance for electrical connection to one of the substrates along the aligned or flush edge thereof.

These and other objects, advantages, purposes, and features of the present invention will become apparent from the study of the following description in conjunction with the drawings.

BRIEF DESCRIPTION OF THE DRAWINGS

FIG. 5 is a sectional view of the reflective element assembly taken along the line V-V in FIG. 4, showing the clearance provided for electrical connection to each substrate;

FIG. 6 is a sectional view of the reflective element assembly taken along the line VI-VI in FIG. 4, showing the flush alignment of the upper edge of the substrates;

FIG. 11 is a plan view of a generally flush electro-optic reflective element assembly for an exterior rearview mirror assembly in accordance with the present invention, with the substrates cut in generally opposite wave patterns to facilitate electrical connection to the respective semi-conductive layers of the substrates;

FIG. 20 is another enlarged sectional view of a front substrate having a border perimeter coating in accordance with the present invention;

FIG. 24 is a plan view of another electro-optic reflective element assembly similar to the reflective element assembly of FIG. 21;

FIG. 25A is a plan view of the third surface of a rear substrate for an exterior electro-optic reflective element assembly in accordance with the present invention; and FIG. 25B is a plan view of the second surface of a front substrate for the exterior electro-optic reflective element assembly;

FIG. 28 is a sectional view of another electro-optic reflective element assembly in accordance with the present invention;

FIG. 29 is a sectional view of another electro-optic reflective element assembly in accordance with the present invention;

FIG. 33A is a sectional view of another electro-optic reflective element assembly in accordance with the present invention;

FIGS. 33B and 33C are plan views of the reflective element assembly of FIG. 33A;

DESCRIPTION OF THE PREFERRED EMBODIMENTS

Figure 1:
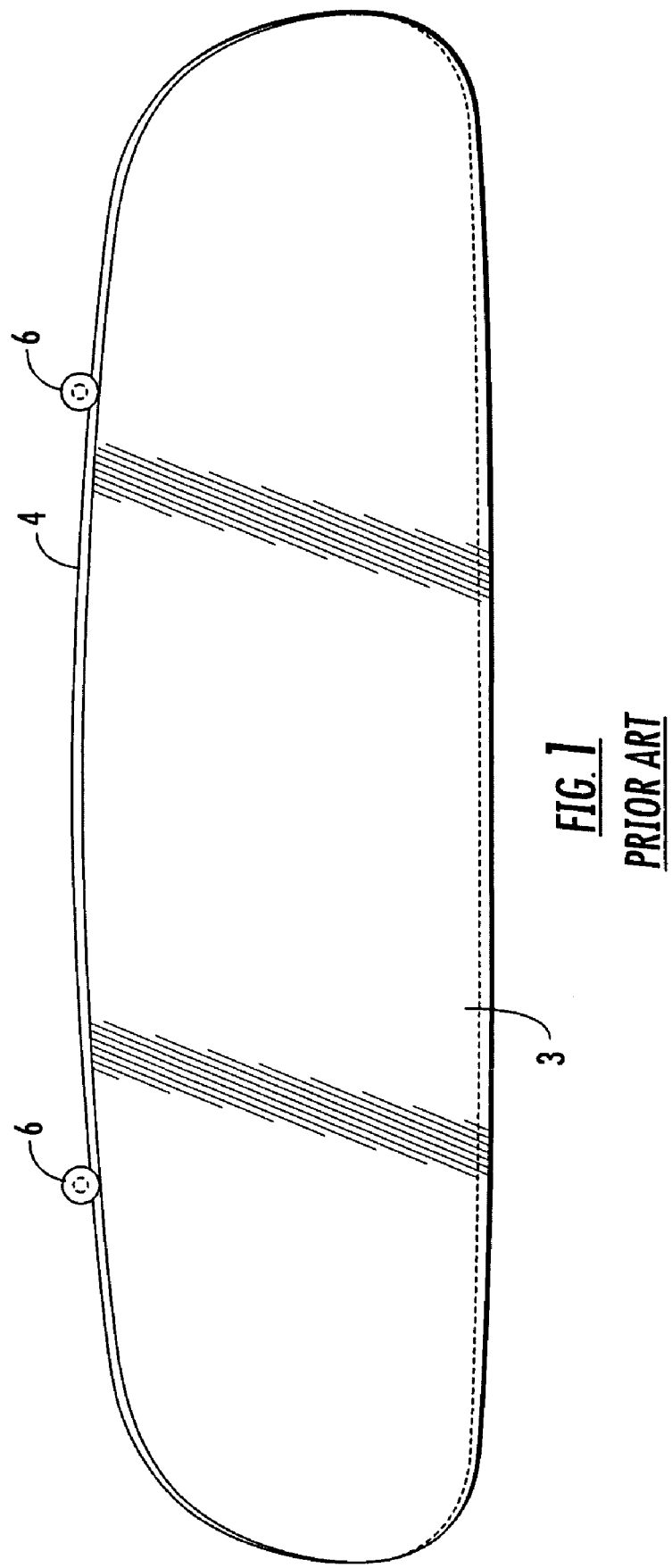
FIG. 1 is a plan view of a conventional electrochromic mirror element, showing a typical offset orientation of the two substrates.
Figure 2:
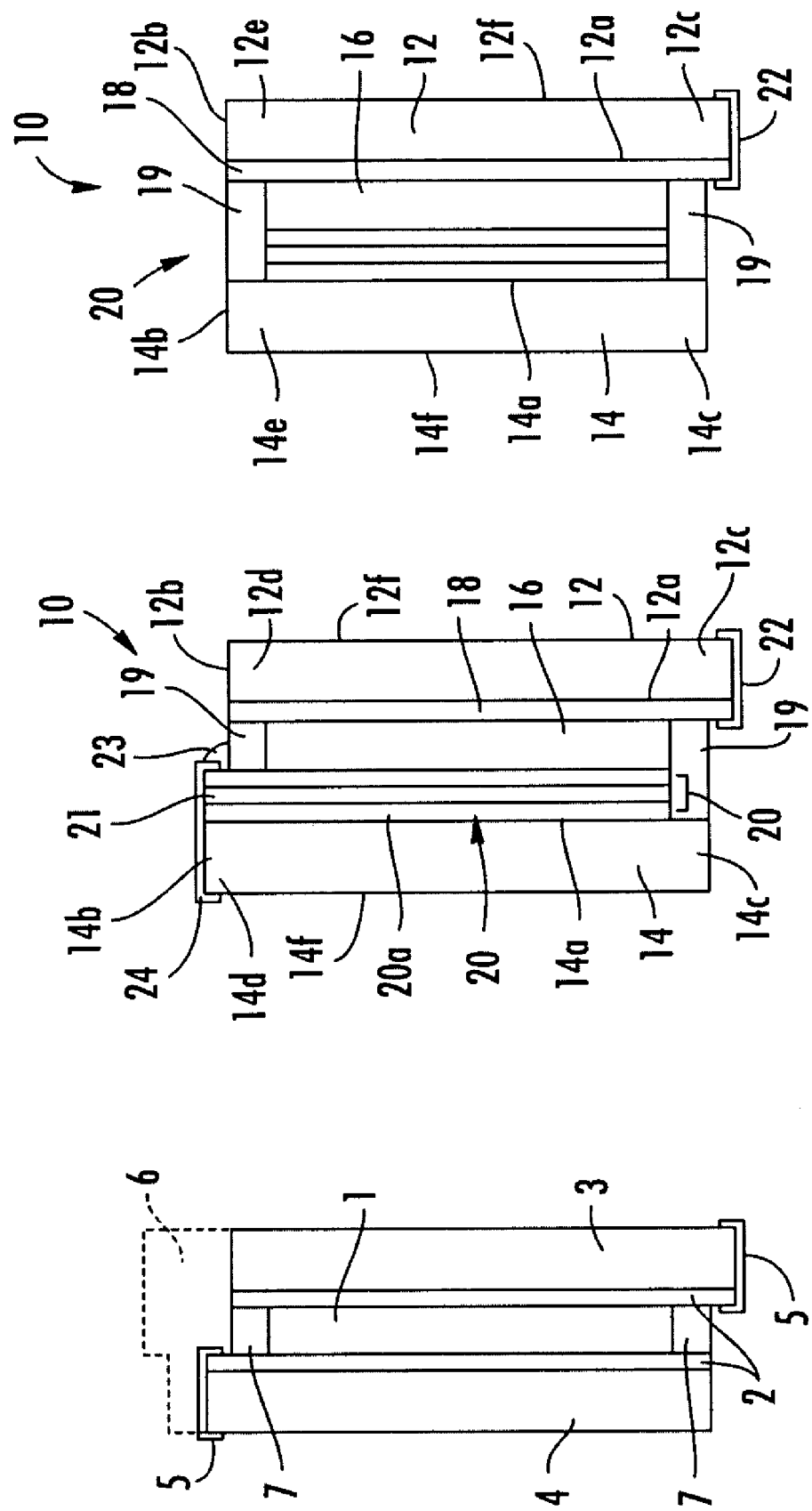
FIG. 2 is a sectional view of a conventional electrochromic mirror element, showing a conventional spacer for use in manufacturing of the conventional mirror element.
Figure 3:
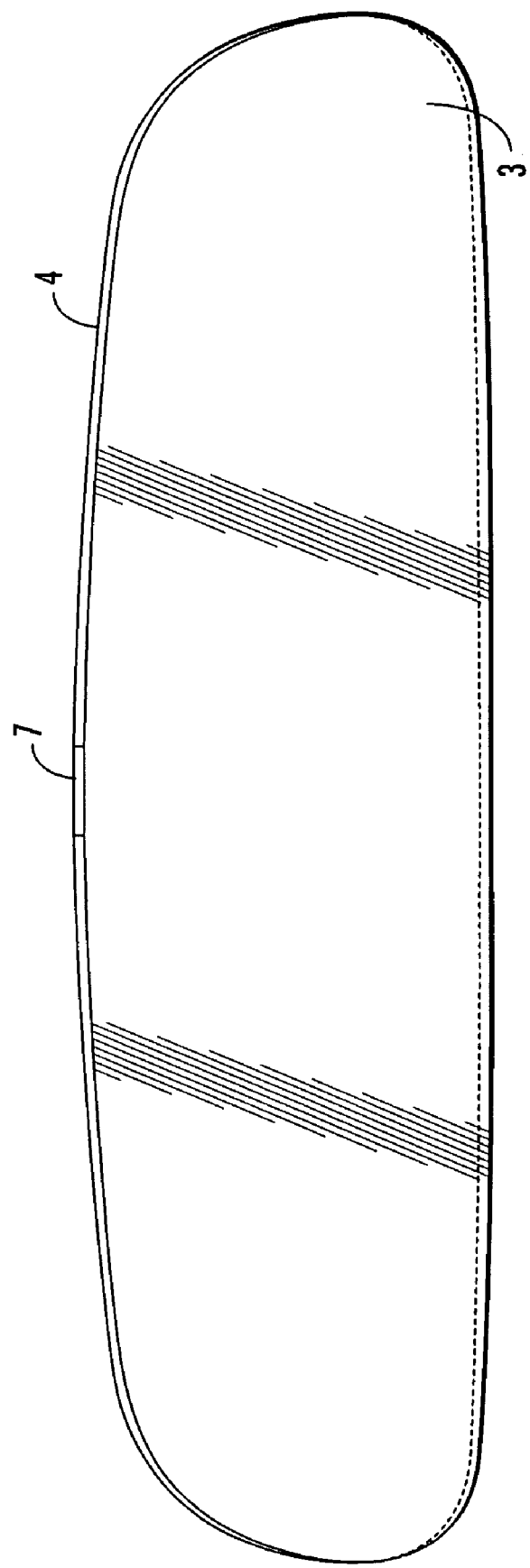
FIG. 3 is a plan view of another conventional electrochromic mirror element similar to FIG. 1, with a tab out portion for electrical connection with a conductive or semi-conductive layer on one of the substrates.
Figure 4:
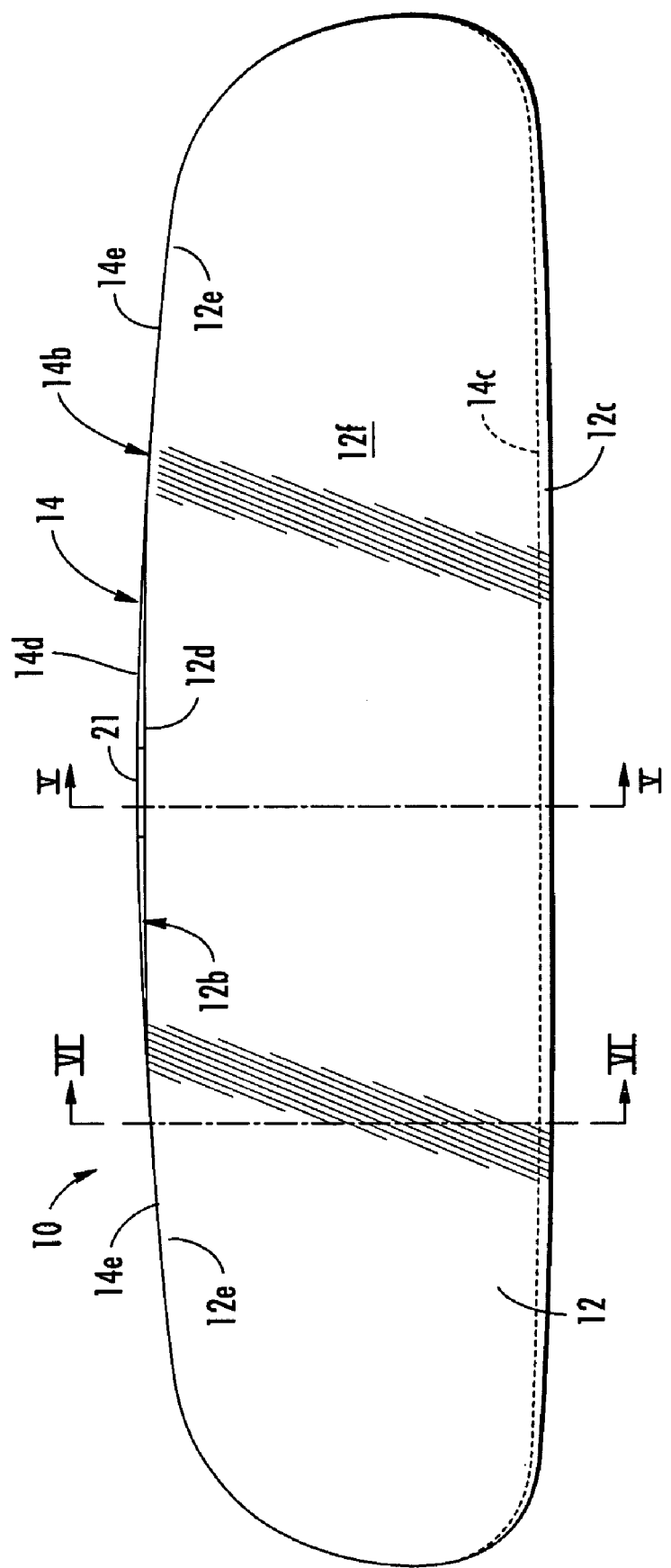
FIG. 4 is a plan view of an electro-optic reflective element assembly of the present invention.

Referring now to the drawings and the illustrative embodiments depicted therein, an electro-optic or electrochromic cell or mirror element assembly or reflective element assembly 10 for an interior rearview mirror assembly of a vehicle (not shown) includes first and second glass substrates 12, 14 and an electro-optic or electrochromic medium 16 disposed or sandwiched therebetween (FIGS. 4-6). Electrochromic medium 16 and at least one metallic and/or non-metallic conductive or semi-conductive layers 18, 20 are disposed on the inner surfaces 12a, 14a of substrates 12, 14 and between the electrochromic medium 16 and the respective substrate 12, 14. At least one of the edges or sides 12b, 14b of the substrates 12, 14 are generally aligned with or flush with one another (as seen in FIGS. 4 and 6) at least along a portion of the edges. The reflective element or mirror element of the present invention is equally suitable for interior or exterior rearview mirror assemblies for vehicles or for other mirror assemblies, without affecting the scope of the present invention.

Electrochromic mirror element assembly 10 comprises a first or front substantially transparent substrate 12 and a second or rear substantially transparent substrate 14 (which may be glass substrates or the like). The substrates are generally elongated along a longitudinal axis and define upper and lower edges and generally curved opposite side or end edges. Although shown and described as a reflective element assembly for an interior rearview mirror assembly or system, the reflective element assembly may be formed to be suitable for other mirror assemblies or systems, such as for an exterior rearview mirror assembly of a vehicle or the like.

The first substrate 12 of reflective element assembly 10 includes one or more electrically conductive or semi-conductive layers 18 (shown in FIGS. 5 and 6 and a single layer), such as a tin oxide or indium tin oxide (ITO) or any other transparent electrically semi-conductive layer or coating or the like (such as indium cerium oxide (ICO), indium tungsten oxide (IWO), indium oxide (IO) layers or the like, or a zinc oxide layer or coating, or a zinc oxide coating or the like doped with aluminum or other metallic materials, such as silver or gold or the like, or other oxides doped with a suitable metallic material or the like), deposited on an inward surface 12a of first substrate 12 (i.e., the second surface 12a of the mirror element assembly 10). As shown in FIGS. 5 and 6, coating 18 may extend substantially up to and along a lower edge 12c of substrate 12 and may be electrically connected to a clip or busbar 22 extending along edge 12c to provide electricity to coating or layer 18.

Rear or second substrate 14 includes at least one layer or coating of metallic conductive (such as a layer of silver, aluminum or an alloy of silver or an alloy of aluminum or other metal or metal alloy) or non-metallic semi-conductive material (such as an ITO layer or the like) 20 disposed on a forward or third surface 14a of rear substrate 14 (shown in FIGS. 5 and 6 as three layers). The layers or coatings may be selected to provide sufficient reflectance of the mirror element and may provide a desired transmissivity if the mirror element includes a display at the fourth surface of the rear substrate, as discussed below. Optionally, the layers or coatings may define reflective and conductive layers or stacks of the types described in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference. Such a stack of layers comprises a metallic layer sandwiched between two semi-conductive layers (both of which preferably are the same material, but either of which can be different from the other). As shown in FIGS. 4 and 5, at least one layer 20a is deposited directly on surface 14a of substrate 14 and includes a tab out portion 21 extending toward and substantially up to edge 14b at a generally central region 14d thereof. An electrical clip 24 is connected to tab out portion 21 to provide electricity to the layer or layers 20 on substrate 14. The outer perimeter portion of rear substrate 14 is masked during the coating process such that the coatings or layers 20 do not cover surface 14a at the outer perimeter portions except at tab out portion 21.

As can be seen in FIGS. 5 and 6, the first and second substrates 12, 14 are positioned in spaced-apart relationship with one another with an electro-optic or electrochromic medium 16 disposed between semi-conductive layer or layers 18 and semi-conductive layer or layers 20. A non-conductive seal 19 is positioned around the perimeter of the electrochromic medium 16 and around the perimeter of the semi-conductive layer 20 except at the tab out portion 21. The electrochromic medium 16 changes color or darkens in response to electricity or voltage applied to or through the semi-conductive layers 18 and 20 at either side of the electrochromic medium. The electrochromic medium 16 disposed between the front and rear substrates 12, 14 may be a solid polymer matrix electrochromic medium, such as is disclosed in U.S. Pat. No. 6,154,306, which is hereby incorporated by reference herein, or other suitable medium, such as a liquid or solid medium or thin film or the like, such as the types disclosed in U.S. patent application Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268, and/or in U.S. Pat. Nos. 5,668,663 and 5,724,187, the entire disclosures of which are hereby incorporated by reference herein, without affecting the scope of the present invention. The electrochromic mirror element assembly may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein, and in U.S. patent application Ser. No. 09/792,002, filed Feb. 26, 2001 by Schofield et al. for VIDEO MIRROR SYSTEMS, INCORPORATING AN ACCESSORY MODULE, now U.S. Pat. No. 6,690,268, which is hereby incorporated herein by reference. Mirror element assembly 10 may also include a seal (not shown) positioned around the outer portions of the layers 18, 20 and the electrochromic medium 16 to seal the layers and avoid corrosion of the metallic layer or layers.

During operation, a voltage may be applied to mirror element assembly 10 via busbars or clips or electrical connectors 22, 24 positioned around and engaging at least a portion of an outer edge of the semi-conductive layers 18, 20 (FIG. 5). The connectors may be connected to an appropriate power source or circuitry or control or the like, such as to a circuit board or the like at the rear of the electrochromic cell or reflective element assembly. Optionally, the circuitry may be applied to the rear surface of the rear substrate utilizing the principles described in U.S. provisional application Ser. No. 60/508,086, filed Oct. 2, 2003 by Schofield for MIRROR REFLECTIVE ELEMENT ASSEMBLY INCLUDING ELECTRONIC COMPONENT, which is hereby incorporated herein by reference.

The voltage applied by connectors 22, 24 is bled from semi-conductive layers 18, 20 to the electrochromic medium 16. Preferably, the layers provide for reduced resistance through the layers, which provides for faster, more uniform coloration of the electrochromic medium 16, since the electrons applied via busbars 24 at semi-conductive layer 20a may bleed through the other semi-conductive layers 20 faster due to the enhanced conductivity in the conductive layers 20. Preferably, the layers 20 provide a sheet resistance of less than approximately 10 ohms per square, more preferably less than approximately 5 ohms per square, and most preferably less than approximately 2 ohms per square. Desirably, and particularly for larger area mirrors, the sheet resistance is less than approximately 1 ohm per square, such as in the range of approximately 0.1 to 0.7 ohms per square.

In order to provide enhanced performance of the electrochromic mirror element, each of the layers of the combination or stack of layers may have substantial conductivity and none of the layers significantly retard electron/electrical conductivity from one layer to the other throughout the stack, and, thus, do not impede the flow of electrons into the electrochromic (EC) medium. In this regard, it is desirable that one or more of the metallic layers comprises a metallic material (which is preferably a highly reflective material, such as silver or silver alloys or the like) having a specific resistivity of preferably less than approximately $5\times10^{-5}$ ohm·cm, more preferably less than approximately $1\times10^{-5}$ ohm·cm, and most preferably less than approximately $5\times10^{-6}$ ohm·cm. Preferably, such a highly conductive metallic layer or layers is/are sandwiched between two non-metallic, partially conductive layers, preferably formed of a non-metallic material (such as a semi-conducting oxide, such as indium oxide, tungsten oxide, tin oxide, doped tin oxide or the like) having a specific resistivity of less than approximately $1\times10^{-2}$ ohm·cm, more preferably less than approximately $1\times10^{-3}$ ohm·cm, and most preferably less than approximately $5\times10^{-4}$ ohm·cm, such as disclosed in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference.

In the illustrated embodiment of FIGS. 4-6, semi-conductive layers 18, 20a are deposited on the inward surfaces 12a, 14a of the respective substrates 12, 14. The semi-conductive layer 18, 20a may be deposited on the glass or substrate 12, 14 via any suitable process. The particular thickness of the conductive layers may vary depending on the particular application of mirror element 10. Optionally, the semi-conductive layer 20a on rear substrate 14 need not be transparent and may comprise a chromium layer or the like. However, the semi-conductive layer 20a may comprise a generally transparent semi-conductive layer of coating, such as a tin oxide layer, an indium tin oxide (ITO) layer or the like, without affecting the scope of the present invention.

The transparent semi-conductive non-metallic layers on rear substrate 14 preferably comprise non-metallic transparent electrically conductive or semi-conductive materials, such as tin oxide, indium oxide, indium cerium oxide, indium tungsten oxide, nickel oxide, tungsten oxide, indium tin oxide, half-wave indium tin oxide, full wave indium tin oxide, doped tin oxides, such as antimony-doped tin oxide and fluorine-doped tin oxide, doped zinc oxides, such as antimony-doped zinc oxide and aluminum-doped zinc oxide and/or the like.

The metallic layer or layers on rear substrate 14 comprise a thin film or layer of metal, such as silver, aluminum, or alloys thereof, or the like, with a selected thickness to provide sufficient reflectivity and/or transmissivity, depending on the application of the mirror element and whether the mirror element includes a display, such as a display-on-demand or display-on-need type of display or the like, as discussed below. Preferably, the selected metallic material comprises silver, but may otherwise comprise a material selected from aluminum, silver alloys, aluminum alloys (such as 6061 or 1100 aluminum alloys or the like), manganese, chromium or rhodium, or any other metallic material which is sufficiently reflective and/or transmissive at a selected thickness, without affecting the scope of the present invention.

In a preferred embodiment, the semi-conductive layers 18, 20a comprise indium tin oxide (ITO) and are deposited onto the surfaces 12a, 14a of the respective substrate 12, 14 via a hot deposition process, which may involve, for example, sputter deposition onto a heated substrate, with the heated substrate often being heated to a temperature of greater than about 200° C., sometimes greater than 300° C., as is known in the art. The combination of the semi-conductive layers 18, 20a on the substrates 12, 14 defines a conductive substrate which may be used for various embodiments of a mirror element in accordance with the present invention.

The other semi-conductive layers and metallic layers of the layers 20 on rear substrate 14 (or other layers on front substrate 12) may be deposited onto semi-conductive layer 20a via a cold deposition process, such as sputter coating or the like, onto an unheated substrate. Preferably, each of the layers 20 is deposited on second substrate 14 by a sputter deposition process. More particularly, the substrate 14 (including the semi-conductive layer 20a already deposited thereon) may be positioned in one or more sputter deposition chambers with either planar or rotary magnetron targets, and with deposition of the layers being achieved by either reactive deposition of an oxide coating by sputtering from a metal target (or from a conductive, pressed oxide target) in an oxygen-rich atmosphere, or by DC sputtering from an oxide target, such as an indium oxide (IO), indium tungsten oxide (IWO), indium tin oxide (ITO) or indium cerium oxide (ICO) target or the like, such as described in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference. However, other processes for applying or depositing layers of conductive material or layers and metallic material or layers may be implemented, without affecting the scope of the present invention.

The rear substrate 14 is masked substantially around the outer region of surface 14a during the deposition process, such that the semi-conductive and/or conductive layer or layers 20 is/are not deposited in the masked outer region. However, substrate 14 is not masked over the entire outer edge or region of substrate 14, in order to allow deposition of the layer or layers at a particular un-masked area, such that a tab-out portion or area 21 is formed in the layer or layers 20. The tab out area 21 facilitates electrical connection of connector 24 with the conductive layers 20.

As shown in FIG. 4, the upper edge 12b of first or front substrate 12 is formed to have a flattened area or relief area 12d along a generally central region thereof. The relief area 12d may be formed by cutting the glass substrate along the edge 12b. The relief area 12d allows the upper edge 12b along the outer or side regions 12e to generally align with the outer or side regions 14e of upper edge 14b of rear substrate 14, while providing clearance at the center region 14d of rear substrate 14 for the electrical connector or clip 24 to clip onto rear substrate 14 and coatings or layers 20. The relief area 12d also forms a pocket that helps to contain the silicone material 23 (such as Shin-Etsu 3421 or the like) which protects the tab out portion 21. As can be seen in FIG. 4, front substrate 12 is slightly larger than rear substrate 14, such that when the outer or side regions 12e, 14e of upper edges 12b, 14b are aligned, the lower edge 12c of front substrate 12 extends downward below the lower edge 14c of rear substrate 14, to provide for connection of the busbar 22 along lower edge 12c of front substrate 12.

Because the relief area 12d along upper edge 12b of front substrate 12 provides clearance for electrical connection to the other substrate 14, while also allowing for substantially flush alignment of the upper edges 12b, 14b of the substrates 12, 14, the present invention provides for enhanced assembly processes for assembling the mirror element and obviates the need for a stepped or offset spacer or pin. During assembly of the mirror element assembly 10, the substrates 12, 14 may be placed in a fixture with the outer regions 12e, 14e of the upper edges 12b, 14b of both substrates abutting a wall of the fixture. The wall of the fixture thus aligns the upper edges of the substrates, and a stepped pin or the like is not necessary to provide the appropriate offset or clearance for the electrical connections to each substrate. This eases the assembly process, since stepped pins do not have to be carefully placed at the appropriate places along the edges of the substrates to achieve the desired offset or clearance. Uniform pins may be placed between the substrates to provide the appropriate spacing or separation gap between the substrates during assembly.

Although shown and described as being generally aligned along the upper edges, the lower edges may alternately be aligned in a similar manner, without affecting the scope of the present invention. It is further envisioned that a similar relief area may be formed at both the upper edge of one substrate and the lower edge of the other substrate, such that both the upper and lower edges may be generally flush or aligned with one another, while providing clearance for electrical connection to both substrates and their respective conductive or semi-conductive layer or layers.

Optionally, the first (outermost) surface 12f of front substrate 12 may be coated with an anti-wetting property, such as via a hydrophilic coating (or stack of coatings), such as is disclosed in U.S. Pat. Nos. 6,193,378; 5,854,708; 6,071,606 and 6,013,372, the entire disclosures of which are hereby incorporated by reference herein. Also, the first (outermost) surface 12f of front substrate 12 may be optionally coated with an anti-wetting property, such as via a hydrophobic coating (or stack of coatings), such as is disclosed in U.S. Pat. No. 5,724,187, the entire disclosure of which is hereby incorporated by reference herein. Such a hydrophobic property on the first/outermost surface of the electrochromic mirror reflective elements (and on the first/outermost surface of a non-electrochromic mirror, non-electro-optical, conventional reflective elements) can be achieved by a variety of means such as by use of organic and inorganic coatings utilizing a silicone moiety (for example, a urethane incorporating silicone moieties) or by utilizing diamond-like carbon coatings. For example, long-term stable water-repellent and oil-repellent ultra-hydrophobic coatings, such as described in PCT International Publication Nos. WO0192179 and WO0162682, the entire disclosures of which are hereby incorporated by reference herein, can be disposed on the first (outermost) surface 12f of front substrate 12. Such ultra-hydrophobic layers comprise a nano structured surface covered with a hydrophobic agent which is supplied by an underlying replenishment layer (such as is described in Classen et al., "Towards a True "Non-Clean" Property: Highly Durable Ultra-Hydrophobic Coating for Optical Applications", ECC 2002 "Smart Coatings" Proceedings, 2002, 181-190, the entire disclosure of which is hereby incorporated by reference herein).

Figure 7:
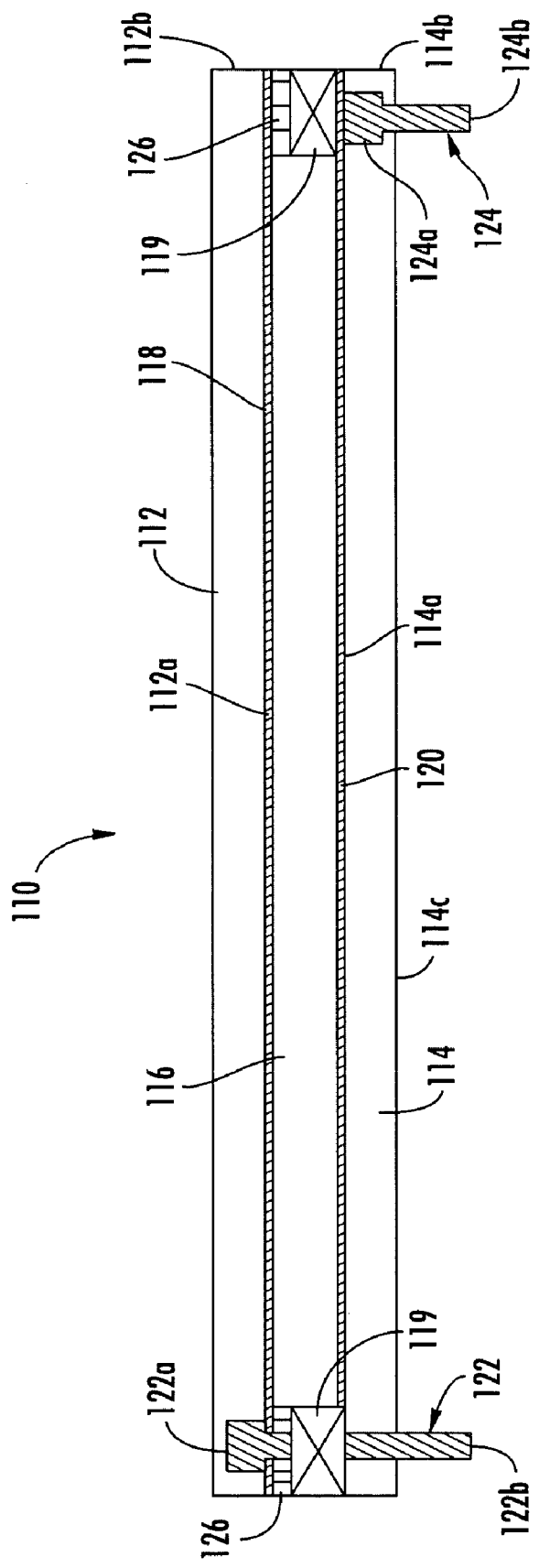
FIG. 7 is a sectional view of a generally flush electro-optic reflective element assembly in accordance with the present invention, with electrically conducting pins providing the electrical connection to the appropriate semi-conductive layer of the substrates of the reflective element assembly.

Referring now to FIG. 7, an electro-optic or electrochromic cell or reflective element assembly 110 for a rearview mirror assembly of a vehicle includes a first or front substrate 112 and a second or rear substrate 114 (which typically are made of glass, but may comprise a polymeric material or the like), with an electrochromic medium 116 disposed or sandwiched therebetween. The front substrate 112 includes a non-metallic, transparent semi-conductive layer 118 (such as indium tin oxide (ITO), doped tin oxide or the like, such as described in U.S. Pat. No. 6,002,511, which is hereby incorporated herein by reference) disposed on the rear or second surface 112a, while the second or rear substrate 114 includes one or more metallic and/or non-metallic conductive or semi-conductive layers 120 (such as silver, silver alloy or other metal or metal alloy or the like) disposed on the front or inwardly facing or third surface 114a of rear substrate 114. The electrochromic medium 116 is sandwiched between the semi-conductive or conductive layers 118, 120, and is contained therein via a seal 119 positioned around the perimeter of the electrochromic medium 116. The conductive or semi-conductive layers 118, 120, electrochromic medium 116 and seal 119 may be substantially similar to the layers, electrochromic medium and seal of mirror assembly 10, discussed above, such that a detailed description of these items need not be repeated herein.

As can be seen with reference to FIG. 7, reflective element assembly 110 may comprise a generally flush cell or reflective element assembly, with at least some of the perimeter edges 112b, 114b of the substrates 112, 114 being generally flush or aligned with one another, Electrical current may be applied to each of the semi-conductive or conductive layers 118, 120 via a respective pin or connecting member 122, 124 that contacts the respective semi-conductive or conductive layer and extends rearwardly out the back or fourth surface 114c of the rear substrate 114 for electrical connection to an appropriate power source or circuitry or control or the like at the rear of the electrochromic cell or reflective element assembly.

The first pin or connecting member 122 may be attached to the first or front substrate 112, such as by counter sinking a head 122a of pin 122 into the rear surface 112a of front substrate 112, such that a body or shaft portion 122b of pin 122 extends rearward therefrom. The pin 122 thus may contact (or may be contacted by) the semi-conductive layer or coating 118 on the second surface 112a of front substrate 112 to make the electrical connection thereto. The pin may be countersunk in the rear surface 112a of front substrate 112 prior to depositing or applying the semi-conductive layer 118 to the rear surface 112a of the substrate 112. The substrate and pin assembly may then be placed in a vacuum deposition chamber/apparatus, such as a sputter deposition chamber or the like, to have the semi-conductive coating 118 deposited on both the surface 112a of substrate 112 and on at least a portion of the pin 122 itself. Such an approach provides an effective electrical connection between the pin and the semi-conductive coating because the coating is also deposited on and contacts the electrical connector or pin.

As can be see in FIG. 7, the pin 122 may be countersunk within the rear surface 112a of the front substrate 112 such that the head 122a of the pin 122 is within the glass substrate and generally flush with the surface 112 of the substrate. A metallic layer or coating or busbar 126 may be applied around the perimeter region or surface of the substrate 112 to enhance the electrical connection between the pin and the outer perimeter portion of the semi-conductive layer 118. The metallic layer or coating 126 may comprise an opaque metallic layer to conceal or hide the seal 119 and electrical connectors and the like, so as to reduce the size of the bezel overhang which may otherwise be needed to provide the desired appearance of the perimeter edges of the mirror assembly. Optionally, the perimeter coating 126 may comprise a chromium oxide (often referred to as "black chrome") or other metal or metal oxide or metal compound that is dark, such as black, and thus effectively hides or conceals the seal, connectors and the like, thereby obviating the need for a bezel around the perimeter of the reflective element assembly. The shaft portion 122b of pin 122 may then extend through the seal and through a hole or aperture in the rear substrate 114. As can be seen in FIG. 7, the conductive coating 120 may not extend to the area where the pin 122 passes through rear substrate 114, such that a non-conductive glass surface or area or region 115 may be defined at the perimeter region of the surface 114a of rear substrate 114. The non-conductive seal 119 may partially or substantially fill or encompass the non-conductive area 115, such that the non-conductive area 115 and non-conductive seal 119 electrically isolate or insulate the pin 122 from conductive layer 120 of rear substrate 114.

Similar to pin 122, pin 124 may be countersunk within the front or third surface 114a of rear substrate 114, such that the head 124a of pin 124 is generally flush with the third surface 114a of the substrate. After the pin is countersunk within the rear substrate 114, the third surface 114a of the substrate may be coated with the semi-conductive layer or layers, such that the semi-conductive layer 120 coats or contacts the head 124a of pin 124 and makes electrical contact therewith. The shaft or body portion 124b of pin 124 may extend through a hole or opening through substrate 114 and rearwardly from the substrate or cell for electrical connection to the appropriate power source or circuitry or control or the like at the rear of the reflective element assembly. As can be seen in FIG. 7, the front or third surface 114a of rear substrate 114 may be masked during coating of the third surface in the area of the first pin 122, such that the conductive and/or semi-conductive coatings or layers 120 are not applied to or deposited on the surface 114a in the region where shaft 122b of pin 122 extends through substrate 114. This substantially precludes the possibility that pin 122 may come in contact with both semi-conductive layers 118, 120, which may short the electrochromic cell or reflective element assembly.

The pin connectors of the electrochromic cell or reflective element assembly of the present invention thus may facilitate a flush electrochromic cell or reflective element assembly, because no clips or busbars are required around the outside of the perimeter edges of the substrates to contact the semi-conductive and/or conductive layers of the substrates.

Optionally, a perimeter coating, which may be substantially opaque and may be conductive or semi-conductive, may be applied along the perimeter regions or border of the semi-conductive layer of the first or front substrate, in order to mask or hide or conceal the seal and connectors and the like to enhance the aesthetic appearance of the electrochromic reflective element assembly and to minimize the size or overhang of the bezel of the mirror assembly. The perimeter coating or layer may be of the type disclosed in U.S. Pat. No. 5,066,112, which is hereby incorporated herein by reference, or may be any other type perimeter coating which may provide the desired result or appearance.

Figure 8:
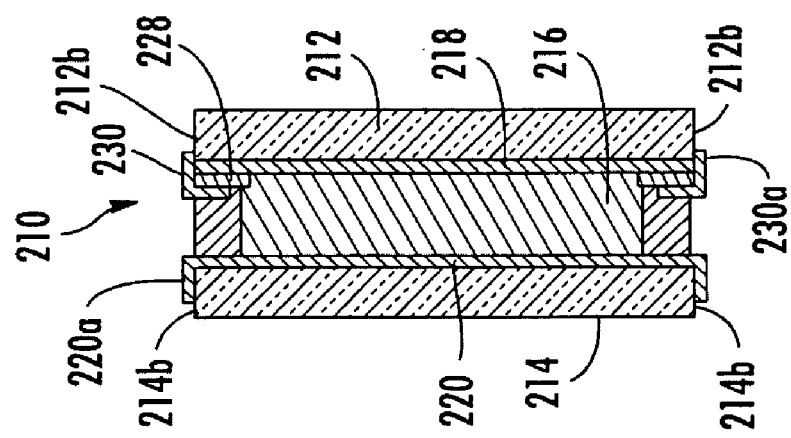
FIG. 8 is a sectional view of another electro-optic reflective element assembly in accordance with the present invention.

Referring now to FIG. 8, an electrochromic cell or reflective element assembly 210 comprises a flush or generally flush electrochromic reflective element assembly and includes a front substrate 212 having an semi-conductive coating or layer 218, and a rear substrate 214 having a conductive and/or semi-conductive coating 220, with an electrochromic medium 216 disposed or sandwiched between the conductive or semi-conductive layers 218, 220. An opaque or darkened or substantially opaquifying or hiding or concealing or light absorbing perimeter coating 228 may be applied around the perimeter region or surface of the semi-conductive coating 218 of front substrate 212 to mask or hide or conceal the seal 219 of the electrochromic reflective element assembly 210. Perimeter coating 228 may comprise a black or darkened or opaque coating (such as a substantially opaque or dark, such as black, coating or layer) and may be conductive (such as a metallic electric conductive layer or element) or a combined opaquifying or dark or black non-conductive layer closest to the substrate surface and a conductive layer on the opaquifying layer. The perimeter coating may provide a class A appearance (i.e. a surface readily viewable by a user of the vehicle and thus required to be aesthetically and functionally acceptable) and may comprise a black ink or the like that may provide a substantially uniform hiding and concealing layer which may be applied via an inkjet or screen print process or the like. If a non-conductive opaque layer (such as paint or ink or the like) is used on the substrate surface, it is desirable to apply a conductive layer (such as a conductive tape or coating or the like) overt the opaque layer. Optionally, the opaquifying layer may comprise a chrome oxide (sometimes referred to as "black chrome"), which may be substantially dark on the surface, and may be coated with a substantially pure metal or chrome (such as discussed below with respect to FIG. 20) to provide a conductive layer or raceway along the substrate. Preferably, the opaquifying conductive coating or layer comprises a silver and aluminum alloy, but may comprise other dark colored (preferably black) conductive inks and/or adhesives based on silver and/or silver alloys, such as an electrically conductive black epoxy, such as EPO-TEK H32E or EPO-TEK H32C, both of which are available from Epoxy Technology of Billerica, Mass. It is further envisioned that other colors (other than black) may be used for perimeter coatings an busbar hiding coatings to match the color of the mirror case or to match other desired colors or shades or the like.

A metallic or conducting connector layer 230 may be applied or disposed or positioned around the perimeter region of the perimeter coating 228 and may be folded or wrapped around to at least partially cover the perimeter edges 212b of the substrate 212 so that an outer or edge portion 230a may extend partially along the outer perimeter edge 212b of the substrate and may be in contact with the semi-conductive layers on the surface 212a of substrate 212. As shown in FIG. 8, an outer or edge portion 220a of the conductive layers 220 of rear substrate 214 may also extend around or wrap around the outer perimeter edges 214b of rear substrate 214.

The outer or edge portions 230a of the metallic layer 230 and the outer or edge portions 220a of the layers or layers 220 of rear substrate 214 thus may provide for electrical contact to the conductive layers of the substrate substantially around the perimeter of the electrochromic cell or reflective element assembly, without requiring overlap or offset between the cells, such as for known or conventional clips and busbars. The metallic layer 230 and conductive layers 220 thus may provide an electrical raceway around at least a portion of the reflective element to enhance electrical flow along the substrates to enhance the performance of the mirror cell. Optionally, the metallic layer 230 may be substantially hidden by the Class A type appearance of the opaque layer 228, such that the mirror cell or reflective element assembly may minimize the size of any bezel associated with the mirror assembly, while providing an aesthetically pleasing mirror reflective element and mirror assembly. The reflective element assembly of the present invention thus may provide a minimum bezel size or no bezel mirror cell or reflective element assembly.

Figure 9:
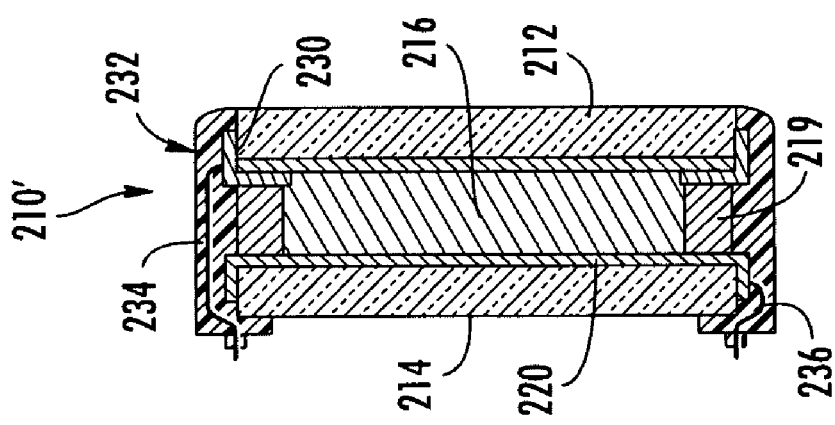
FIG. 9 is a sectional view of another flush electro-optic reflective element assembly in accordance with the present invention, with an extruded wraparound connector for providing electrical contact to the semi-conductive layers of the substrates of the reflective element assembly.

With reference to FIG. 9, an electrochromic cell or reflective element assembly 210' may be substantially similar to the electrochromic cell or reflective element assembly 210 shown in FIG. 8, and may include an outer wraparound connector 232, which may wrap around the perimeter of the reflective element assembly and provides for electrical contact between the metallic contacts or layers 230, 220 and the appropriate power source, circuitry or control or the like. In the illustrated embodiment, wraparound connector 232 comprises an extruded flexible member which includes a wire connector 234. The wire connector 234 extends along and through the wraparound connector 232 and connects to the metallic connector 230, and may connect at the other end to the appropriate power source, circuitry or control or the like. Wraparound connector 232 also includes a second wire connector 236 which extends through the wraparound connector 232 and may connect the conductive and/or semi-conductive layers 220 of the rear substrate 214 to the appropriate power supply, circuitry or control or the like. The extruded wraparound connector 232 may be formed with the wires positioned or inserted therein and extending or protruding partially from an appropriate location or locations along the wraparound connector so as to make a strong electrical connection or contact with the respective member or layer when the wraparound connector 232 is wrapped around and secured to the reflective element assembly 210'.

Figure 10:
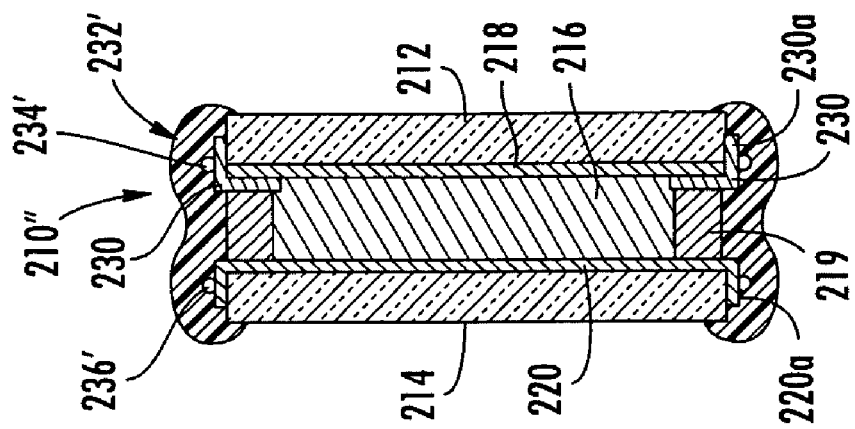
FIG. 10 is a sectional view of another electro-optic reflective element assembly similar to the reflective element assembly of FIG. 9.

Similarly, as shown in FIG. 10, a wraparound connector 232' may include a pair of electrical wires or metallic members 234', 236' extending therealong and partially protruding from an inner surface of the extruded wraparound connector 232'. One of the wires or members 234' may partially protrude along the inner surface of the connector to contact the outer or edge portion 230a of the metallic layer or connector 230 to make electrical connection thereto at least partially or substantially around the perimeter of the front substrate 212 of the electrochromic cell or reflective element assembly 210". Likewise, the other wire or metallic member 236' may protrude partially from the extruded wraparound connector 232' to contact the outer or edge portion 220a of the layer or layers 220 along the outer perimeter edge of the rear substrate 214 to make electrical connection thereto at least partially or substantially around the perimeter edge or edges of the rear substrate. One or more electrical wires or connectors may extend through the wrap around connector 232' to contact the appropriate one of the wires or metallic members 234', 236', in order to provide electrical connection to between the wires 234', 236' and the appropriate power source, circuitry or control or the like at the rear of the reflective element assembly.

Although shown as having a single perimeter electrical connector or layer 230 along the second surface of the front substrate 212, the reflective element assemblies 210', 210" may optionally include a substantially opaque Class A layer between the connectors 230 and semi-conductive layer 218, such as described above with respect to the reflective element assembly 210 of FIG. 8. Optionally, the electrical connectors 230 may comprise an opaque conductive material and may provide a black or opaque appearance to hide or conceal the seal 219 and connectors of the reflective element assemblies, such as via utilizing principles disclosed in U.S. Pat. No. 5,066,112, which is hereby incorporated herein by reference.

Figure 12:
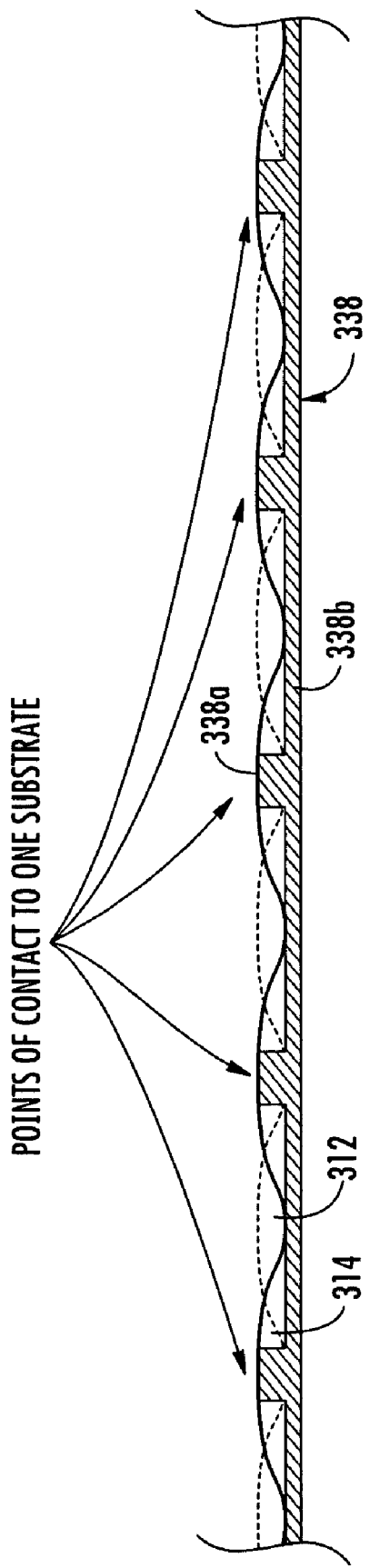
FIG. 12 is an enlarged plan view of a portion of the reflective element assembly of FIG. 11, with an electrical connector connecting to the exposed portion or wave peaks of an edge of one of the substrates of the reflective element assembly.

Referring now to FIGS. 11 and 12, a flush electro-optic or electrochromic cell or reflective element assembly 310 for an exterior rearview mirror assembly of a vehicle comprises a front substrate 312 and a rear substrate 314. The reflective element assembly 310 also includes semi-conductive and/or conductive layers and electrochromic medium (not shown in FIGS. 11 and 12), such as described above or such as otherwise known in the art. As can be seen in FIGS. 11 and 12, both of the substrates 312, 314 are cut in a wave like pattern, such as a sine wave or the like, around the perimeter edges of the substrate, with the wave cut of the rear substrate 314 being about 180 degrees out of phase with the wave cut of the front substrate 312. When the substrates are generally aligned with one another, the waves are out of phase and provide alternating outward peaks for connection of an electrical connector at least substantially around the entire perimeter of the substrates and reflective element assembly.

The front and rear substrates of the reflective element assembly thus may have a full wraparound busbar connected at least some of or most of or each of the outer points or peaks of the waves. As shown in FIG. 12, a clip or busbar 338 for providing electrical connection to the outward protrusions or peaks of the respective one of the substrates may include a plurality of clips or clip portions 338a connected together by a connecting member 338b. The spacing between the clips 338a generally corresponds to the wavelength of the wave cut around the substrates. Although only one of the clips or busbars for the rear substrate 314 is shown in FIG. 12, the other clip or busbar for the front substrate 312 would be substantially similar to busbar 338, but with the clips aligning with the outward peaks or protrusions or wave portions of the wave cut around the front substrate. The clips may connect to or contact conductive layers or busbars or raceways (not shown in FIGS. 11 and 12) that are disposed along the perimeter edge of the substrate. The wave design or pattern may vary depending on the size and particular application of the mirror assembly, the conductivity of the semi-conductive and/or conductive coatings on the substrates, and/or the like. For example, the wave cut may change in amplitude and/or frequency depending on the particular application. The clips or busbars may also change to correspond with the changes in the wave profile.

The wave cut reflective element assembly or electrochromic cell may provide a faster coloring of the reflective element assembly or electrochromic cell and a more uniform transition from bleached to color because the electrical potential may be generally uniformly distributed at substantially all of the points along the perimeter of the reflective element assembly. The benefits associated with the wave cut design may be even more significant for larger mirror sizes. The wave cut design of the present invention may also facilitate implementation of a less expensive or lower conductivity substrate while having little or no affect on the performance of the reflective element assembly or electrochromic cell. The cell gap may thus also be made smaller to assist in reducing double imaging of the mirror assembly. Also, because the voltage may be distributed more uniformly across the electrochromic cell, the "banding effect" may be significantly less for the wave cut design. Because the electrochromic cell may be a generally flush electrochromic cell, multiple cells may be stacked on one another during the manufacturing process using less complicated and less costly fixtures and jigs, in order to reduce the manufacturing costs associated with the electrochromic cells. Also, by taking advantage of the overlapping areas of the substrates, the effective surface area of the perimeter seal around the electrochromic cell may be made larger than in conventional cells.

Figure 13:
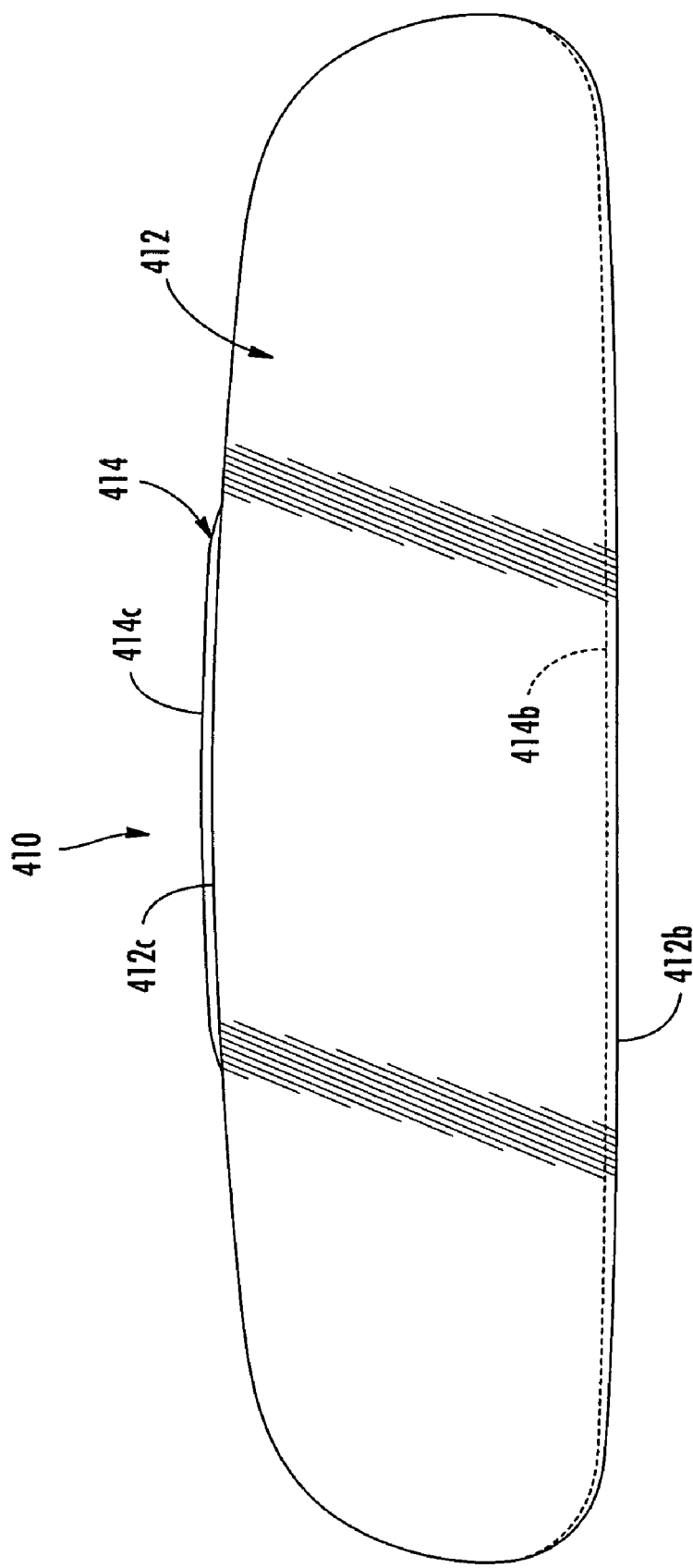
FIG. 13 is a plan view of another one sided flush electro-optic reflective element assembly in accordance with the present invention.
Figure 14:
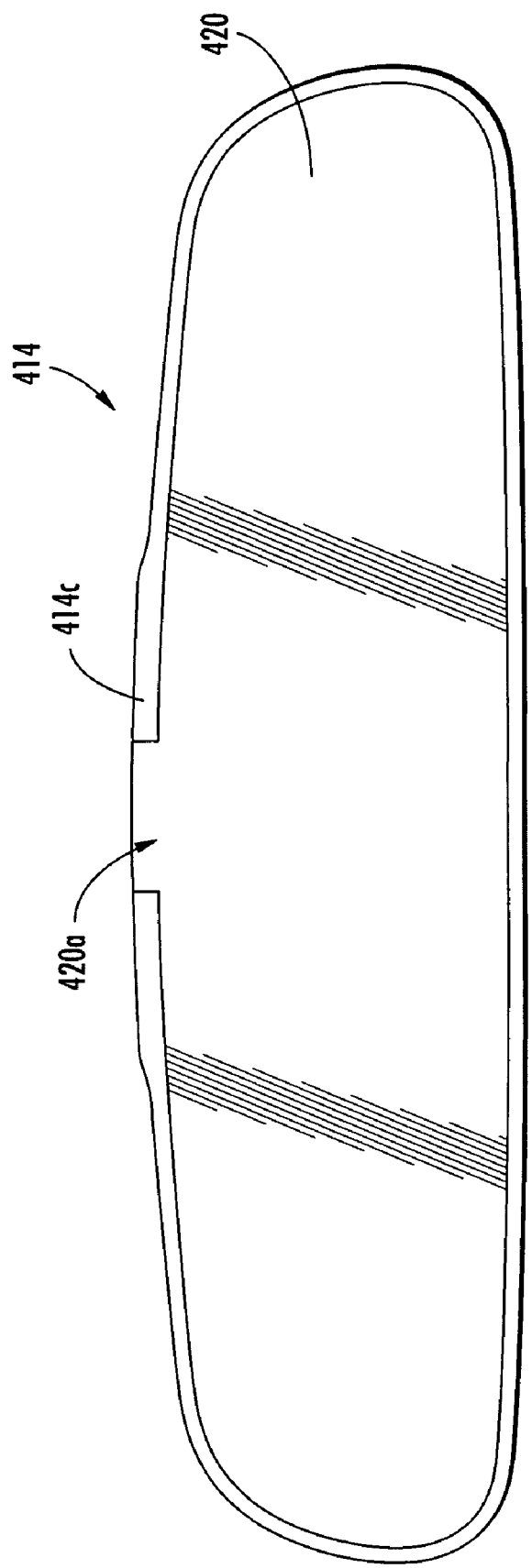
FIG. 14 is a plan view of the rear substrate of the reflective element assembly of FIG. 13, with a semi-conductive layer or coating on the third surface of the rear substrate.
Figure 15:
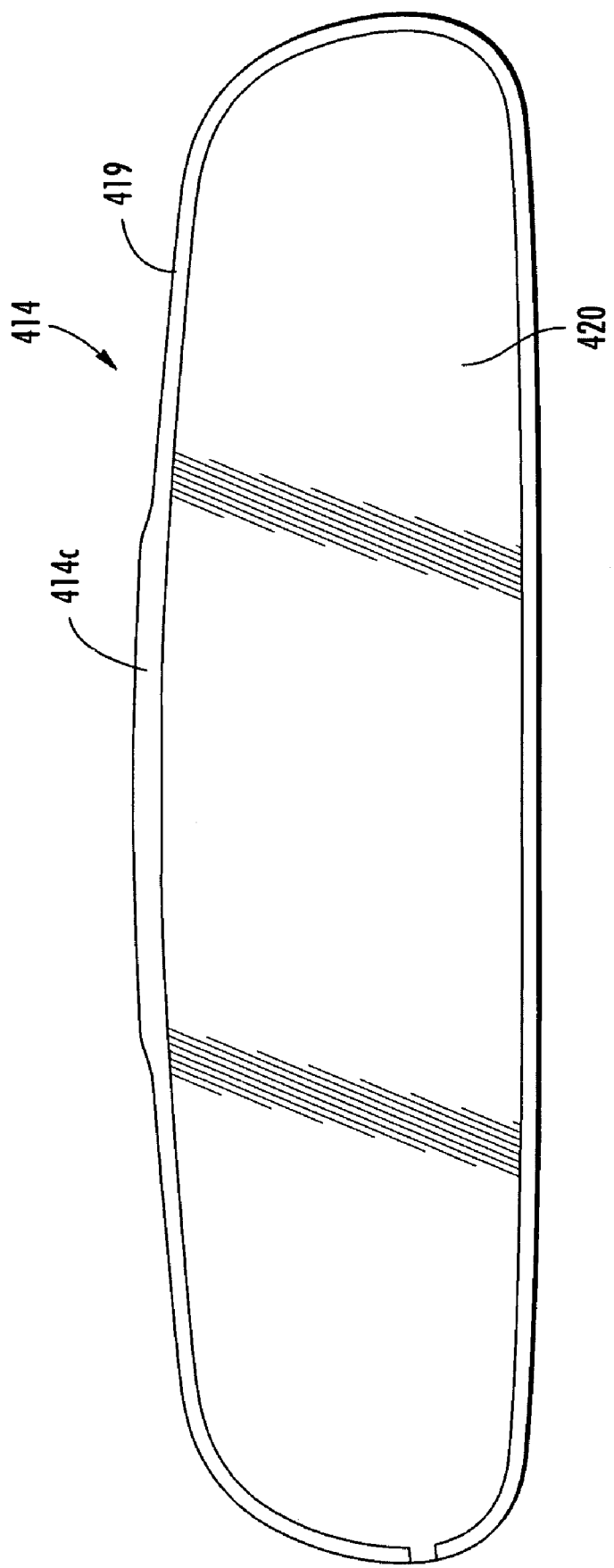
FIG. 15 is a plan view of the rear substrate of FIG. 14, with a seal applied or disposed around the perimeter surface or region of the rear substrate.

Referring now to FIGS. 13-15, a one sided flush electro-optic or electrochromic cell or reflective element assembly 410 includes a front substrate 412 and a rear substrate 414. The reflective element assembly 410 also includes an electro-optic or electrochromic medium and conductive and/or semi-conductive layers or coatings, which may be substantially similar to the elements of the reflective element assembly 10 of FIGS. 4-6, discussed above. As shown in FIG. 13, the front substrate 412 may comprise a substantially oval shaped substrate and may be downwardly offset with respect to the rear substrate 414, such that the lower edge 412b of the front substrate 412 extends over and below the lower edge 414b of the rear substrate 414 to facilitate electrical connection thereto. The rear substrate 414 is formed to have an upwardly extending portion or top hat portion 414c along the middle region of the upper edge of the substrate 414, such that the upward extending portion 414c is generally offset from the upper edge 412c of front substrate 412, while the side portions or regions of the upper edges of the substrates are generally flush or aligned with one another.

The upward extending portion or top hat portion 414c of rear substrate 414 thus may provide or facilitate electrical connection to the rear substrate, without requiring the substrates to be offset along the upper edges in the conventional manner. As shown in FIG. 14, the conductive coating 420 on the third surface of the rear substrate 414 may include a tab out portion 420a for the electrical connector to connect thereto. The upward extending portion or top hat portion 414c of the rear substrate 414 thus may provide for electrical connection to the conductive coatings on the rear substrate, while also providing for a substantially flush upper edge along a substantial portion of the upper edges of the reflective element assembly, such that offset pins and the like are not required during the manufacturing processes of the electrochromic cell or reflective element assembly 410. A seal 419 (FIG. 15) may be provided around the perimeter region or surface of the rear substrate 414 to encase or seal the electrochromic medium, such as discussed above.

Referring now to FIGS. 16-19, an electro-optic or electrochromic cell or reflective element assembly 510, such as for an interior or exterior rearview mirror assembly of a vehicle, includes a front substrate 512 and a rear substrate 514, with an electro-optic or electrochromic medium 516 (FIGS. 17 and 19) disposed or sandwiched therebetween. Front substrate 512 includes an opaquifying or darkening or hiding conductive coating or layer 519 (such as, for example, an opaque or black conductive epoxy or dark colored conductive frit or chrome oxide/metallic chrome bilayer or the like, or other materials such as described above with respect to layer 228) applied or deposited around the border or perimeter of the front substrate 512. The opaquifying layer 519 may at least partially wrap around the perimeter edges of the substrate so that an edge portion 519c of opaquifying layer 519 extends at least partially along the perimeter edge 512c of substrate 512. The front substrate 512 also includes a semi-conductive, transparent coating or layer 518 (such as an ITO layer or doped ITO layer or the like) applied to or deposited on the rear surface 512a of front substrate 512 and overlapping the opaquifying or hiding conductive border layer or coating 519 (as can be seen with reference to FIG. 17). Alternately, the semi-conductive layer 518 may be applied to or deposited on the rear surface 512a of front substrate 512 first, and then the opaquifying or black conductive layer may be applied to or deposited on the perimeter region of the semi-conductive layer 518. The conductive layer 519 provides an electrical raceway (due to the lower resistance provided by the conductive layer 519 versus the semi-conductive or ITO layer 518) around the perimeter of and in contact with the semi-conductive layer 518 to provide quick electrical flow around the perimeter of the semi-conductive layer to quickly energize the layer and get substantially uniform and even and rapid coloring or darkening of the reflective element assembly.

The rear substrate 514 includes a metallic or conductive layer or coating 520, preferably a highly reflective metallic layer or coating (such as, for example, chromium, chromium/rhodium, silver, aluminum, silver alloy, aluminum alloy, ITO/silver/ITO stack, ITO/aluminum/ITO stack (such as ITO-silver-ITO stacks, display on demand stacks or infrared transmitting stacks of the types disclosed in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference) or the like) applied to or deposited on and substantially over the third surface 514a of rear substrate 514. The outer perimeter edge area or border region 514b of the third surface 514a of the rear substrate 514 may be masked while the metallic reflector 520 is applied, such that the border region 514b of the front surface 514a of substrate 514 provides a non-conductive surface or path or raceway 514e (such as a glass surface or the like) at least partially around the metallic reflector 520 and proximate to the edge 514d of substrate 514.

Figure 16:
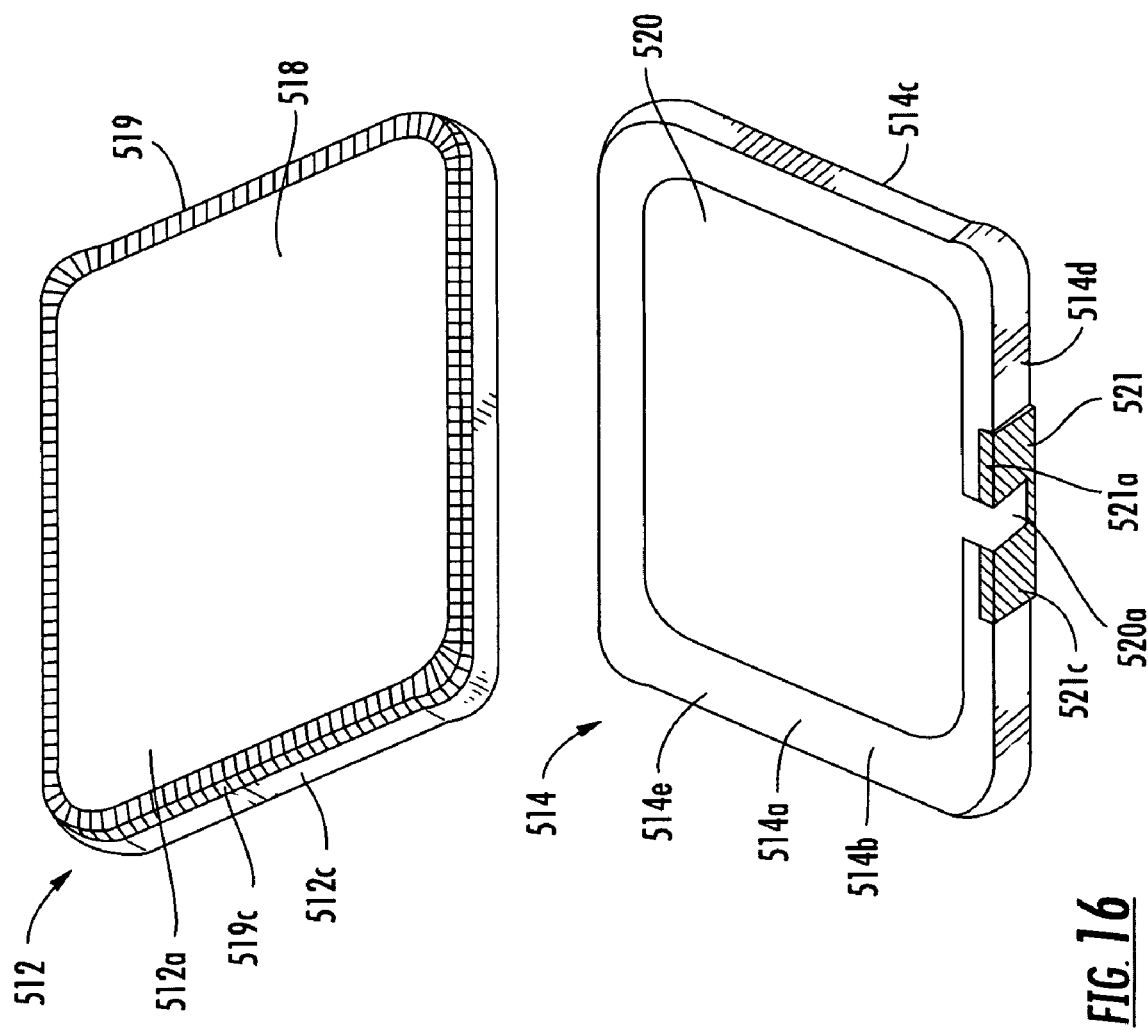
FIG. 16 is a perspective view of a front substrate and a rear substrate of an electro-optic reflective element assembly in accordance with the present invention.

As shown in FIG. 16, rear substrate 514 may also include a conductive coating or layer 521 (such as, for example, a conductive epoxy layer or a conductive silver frit layer or the like) applied to or deposited on or positioned at and partially along a perimeter edge 514d of the substrate 514 (optionally, a third surface portion 521a of the conductive layer 521 may extend partially along the border region 514b of the third surface 514a, or the conductive layer 521 may have an edge portion 521c that may partially wrap around and onto and over the edge 514d of substrate 514, or the conductive layer 521, may further include a rear portion 521b (FIG. 18) that may extend or wrap further around to the rear or fourth surface 514c of substrate 514). A tab out portion 520a of conductive layer 520 may extend over the border region 514b or raceway 514e and may overlap the conductive coating 521 to provide an electrical contact point or region or area for the rear substrate 514, as discussed below. The non-conductive raceway 514e thus is substantially devoid of the conductive layer 520 except at the tab portion. Optionally, the tab out portion 520a may wrap at least partially around the edge dimension 514d of the substrate 514 (such as shown in FIG. 16, where the tab out portion 520a extends along an outer perimeter or border region 514b of third surface 514a of substrate 514 and may further extend at least partially along and over the perimeter edge 514d of substrate 514 and over edge portion 521c of conductive coating 521).

Figure 17:
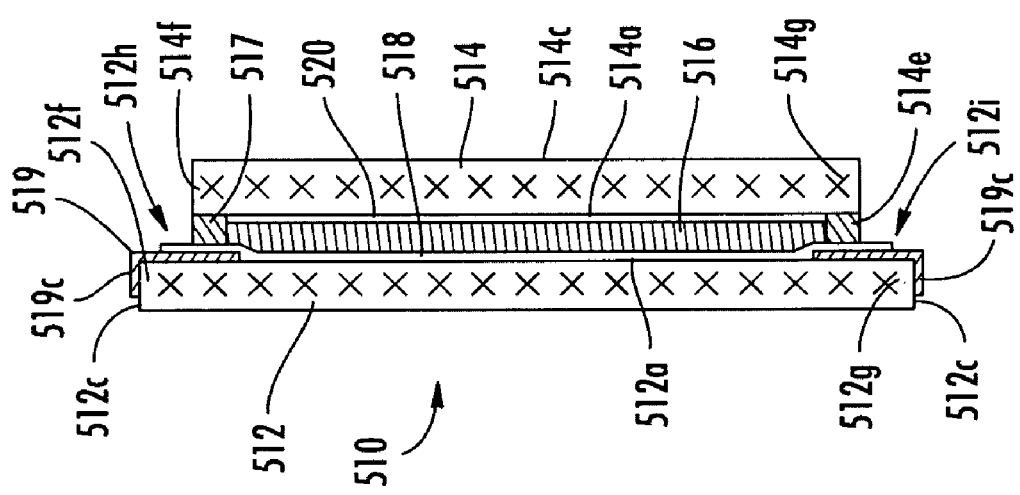
FIG. 17 is a sectional view of an electro-optic reflective element assembly having the substrates of FIG. 16.

As shown in FIG. 17, the front substrate has a height dimension that is greater than a corresponding height dimension of the rear substrate, such that the upper perimeter region or edge portion 512f and lower perimeter region or edge portion 512g of front substrate 512 extend beyond the corresponding perimeter regions or edge portions 514f, 514g of rear substrate 514 and define upper and lower overhang regions 512h, 512i. The connector or connectors may connect to the conductive layer at the rear surface of the front substrate at the overhang region or regions 512h, 512i and thus may not interfere or overlap the perimeter edge of the front substrate. The overhang regions of the front substrate relative to the rear substrate thus may allow for the electrical connectors to connect to the respective conductive layers substantially or entirely within the viewable profile of the front substrate by extending along the respective perimeter edges of the rear substrate, such that the connectors do not overlap the perimeter regions of the front substrate and, thus, are not viewable at the front surface of the front substrate. The front substrate may include a hiding layer or concealing layer at the perimeter regions or overhang regions, such as at the rear surface of the front substrate, to substantially hide or conceal the connectors and the seal of the reflective element assembly. The reflective element assembly thus may be suitable for a bezel-less or minimal bezel mirror assembly.

Although shown and described herein as having upper and lower overhang regions, the reflective element assembly of the present invention may have only one overhang region, such as for the electrical connection to the conductive layer on the rear surface of the front substrate, or may have one or more overhang regions elsewhere along the perimeter of the reflective element assembly, such as along one or both sides of the reflective element assembly or the like, without affecting the scope of the present invention. The overhang region or regions may be selected at the upper or lower edges or at one or both side edges of the reflective element assembly depending on the particular application of the reflective element assembly. For example, for an interior rearview mirror assembly, where the longitudinal axis of the reflective element assembly typically extends lengthwise along the reflective element assembly (such as generally horizontally when the reflective element assembly is installed in a vehicle), the overhang region or regions may be at the upper and/or lower edges of the reflective element assembly. Similarly, for an exterior mirror assembly of, for example, a truck or the like, where the longitudinal axis of the reflective element assembly may extend generally vertically when the reflective element assembly is installed at the truck or vehicle (in other words, where the width of the reflective element assembly is less than the height of the reflective element assembly), the overhang regions may be at the side edges of the reflective element assembly. The overhang regions may thus extend along the width dimension of the reflective element assembly. However, the overhang regions may be elsewhere along or around the edges of the reflective element assembly, without affecting the scope of the present invention.

Figure 19:
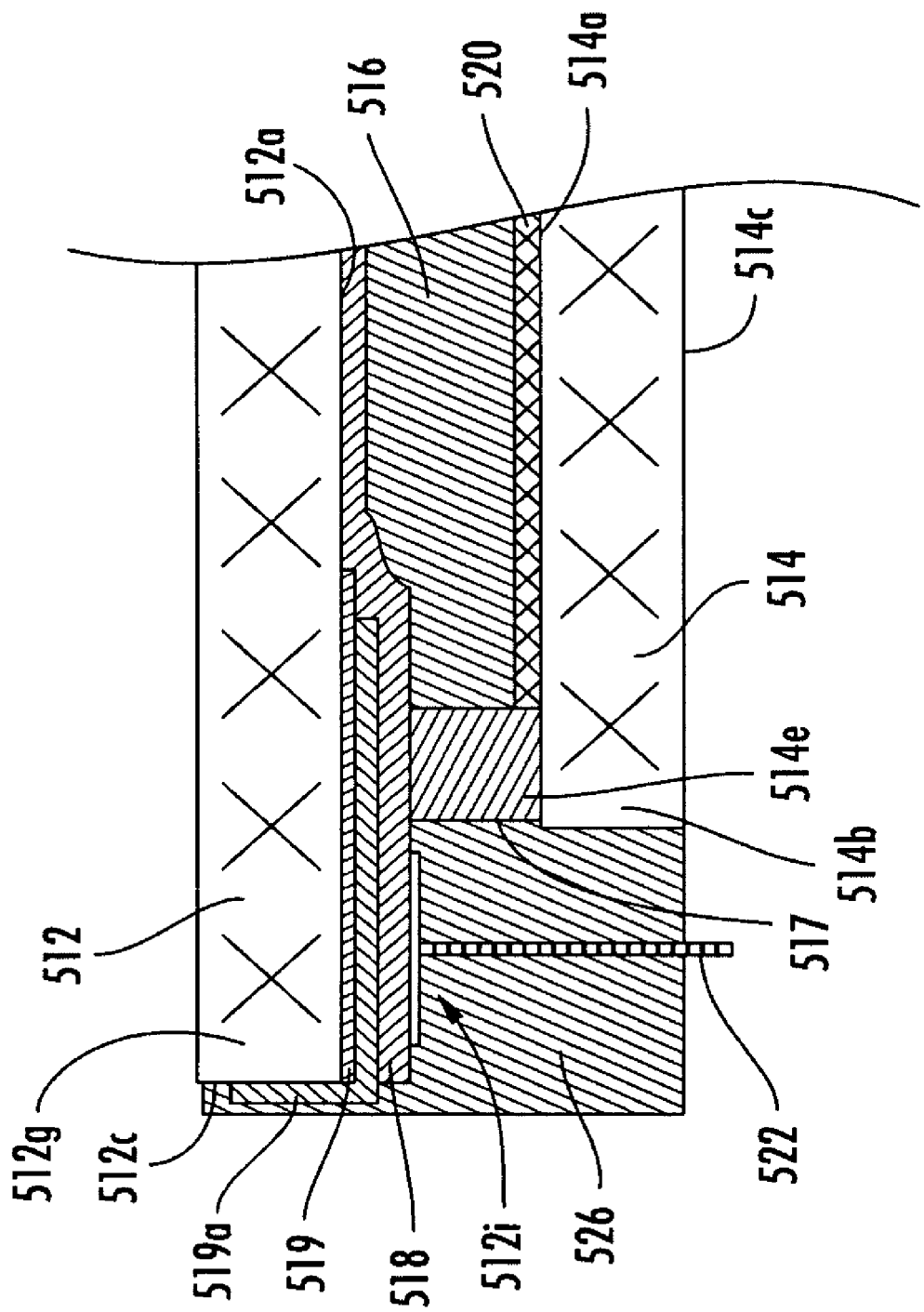
FIGS. 19 and 19A are enlarged sectional views of an edge portion of the electro-optic reflective element assembly of FIG. 17, showing an electrical connector for providing electrical connection to the rear surface of the front substrate.

As can also be seen with reference to FIG. 17, reflective element assembly 510 may provide an electrically conductive opaque or hiding or concealing layer 519 at least substantially around the perimeter edges of the front substrate, with the transparent semi-conductive layer 518 overlapping the opaque conducting layer 519 in the area at which the seal 517 is positioned around the electrochromic medium 516. The opaque conducting layer 519 thus provides a contacting region around the perimeter of the substrate for contacting the transparent semi-conductive layers or coatings 518. The seal 517 is positioned along the opaque conductive layer 519 and is thus masked or hidden by the opaque conductive layer to enhance the appearance of the reflective element assembly, particularly when the electro-optic or electrochromic medium is darkened or colored. The opaque conductive layer may thus allow for a smaller or no bezel overhang around the perimeter of the reflective element assembly. As can be seen in FIGS. 17 and 19, the seal 517 may be positioned around the masked or border region 514b of the rear substrate 514. The non-conductive perimeter seal 517 at least partially fills or covers or encompasses the non-conductive glass surface or masked region 514e to electrically isolate or insulate the conductive coating 520 from the conductive adhesive 526, such that the conductive coating 520 of rear substrate 514 is electrically isolated from connector 522 that connects to the conductive surface 518 of front substrate 512.

Figure 18:
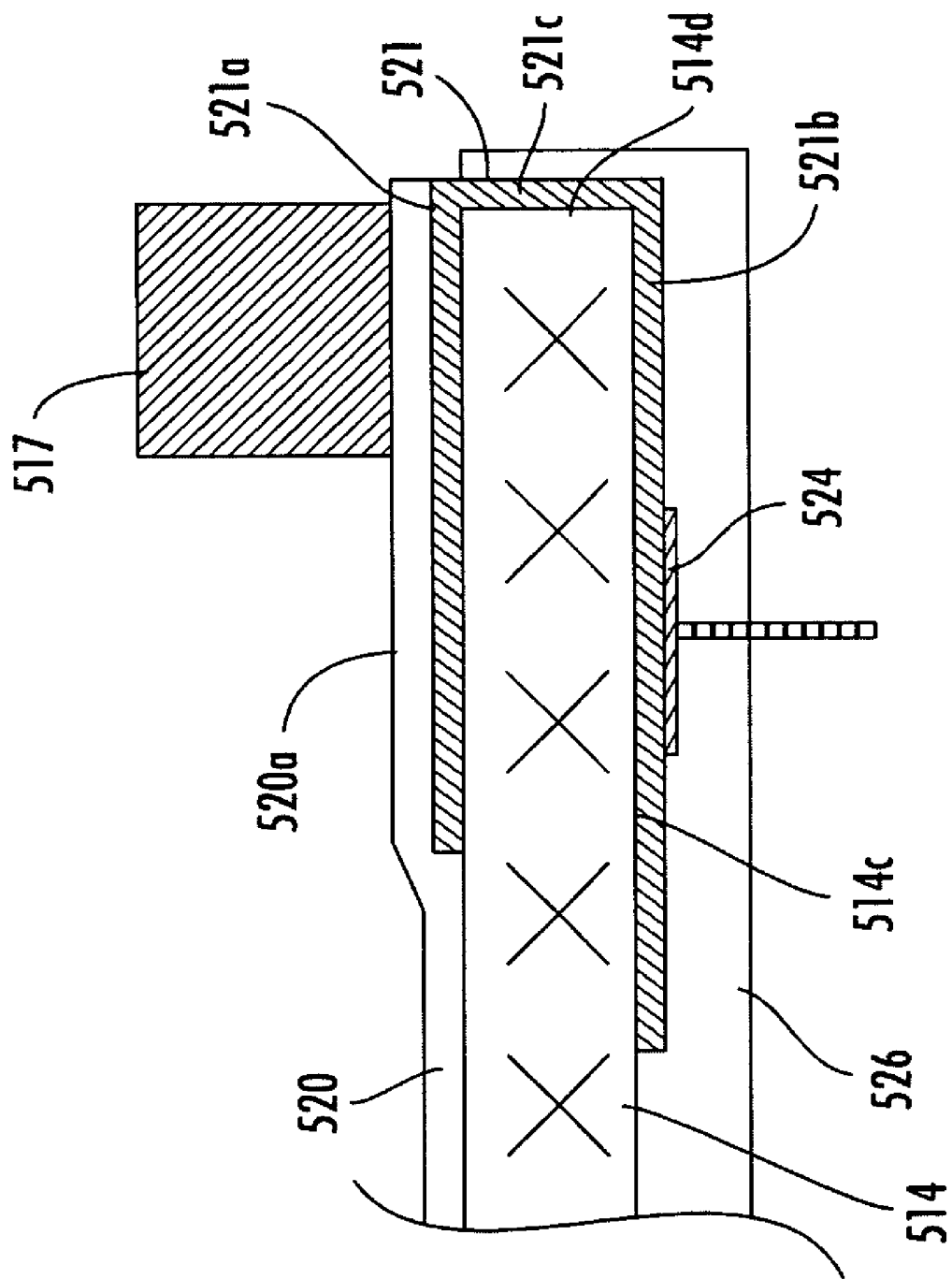
FIG. 18 is an enlarged sectional view of an edge portion of the rear substrate of the electro-optic reflective element assembly of FIG. 17, showing an electrical connector extending from the rear surface of the rear substrate.

As shown in FIGS. 18 and 19, the front substrate 512 and rear substrate 514 may include electrical connectors or terminals 522 and 524, respectively, for providing electrical connection to the conductive or semi-conductive layers 518, 520. Particularly, and as shown in FIG. 18, rear substrate 514 may include an electrical connection terminal or connector 524 at its rear or fourth surface 514c for providing electrical connection between the conductive metallic layer 520 and the appropriate electrical source, circuitry or control or the like at the rear of the reflective element assembly. The electrical connection terminal 524 may be soldered or adhered or attached (such as via electrically conductive adhesive or the like, such as a conductive coating or layer or the like) to, or may be mechanically contacting at (such as via a spring-action contact or the like) a rear portion 521b of the conductive coating or layer 521 along the fourth or rear surface 514c of rear substrate 514. The conductive layer 521 thus provides electrical connection between the terminal 524 at the rear or fourth surface 514c of rear substrate 514 and the conductive layer 520 at the front or third surface 514a of rear substrate 514.

As discussed above, the electrically conductive layer 521 may provide electrical connection to the metallic reflector 520 via the tab-out portion 520a of the metallic reflector, which may be overcoated or applied to the front portion 521a of the electrically conductive layer 521 along the front or third surface 514a of the rear substrate 514. A potting material 526 (such as, for example, a silicone or urethane elastomer, preferably a conductive semi-elastomeric material or the like) may be applied or positioned over the rear surface (and may be applied partially or entirely around the outer perimeter edge of the substrate) to seal the connection of the connector terminal 524 and the conductive layer 521. The electrical connection terminal 524 may extend rearward from the reflective element assembly 510 and may protrude from the potting material 526 for electrical connection to a connector associated with the appropriate electrical power, circuitry or control or the like.

As shown in FIG. 19, the front substrate 512 of reflective element assembly 510 may include one or more electrical connection terminals 522 at or along its rear or second surface 512a. The electrical connection terminal 522 may comprise a stick or ribbon or pin connector for providing electrical connection to the semi-conductive transparent layer 518 at the second surface 512a of front substrate 512 and generally at or along the lower overhang region 512i. The electrical connector or terminal 522 may be positioned entirely within a perimeter profile (as viewed from the front of the reflective element assembly) of the front substrate and generally rearward of the overhang region, so that the electrical connector or terminal is substantially not viewable through the front surface of the front substrate. The electrical connection terminal 522 may be soldered or adhesively attached, such as via an electrically conductive epoxy or the like, to the semi-conductive layer 518, or may be mechanically attached to or contacting the semi-conductive layer 518, such as via a spring-action contact or the like, and may extend or protrude rearward from the front substrate (and may extend rearward of the rear substrate as shown in FIG. 19) for electrical connection to the appropriate electrical power, circuitry or control or the like at the rear of the reflective element assembly.

As discussed above, the semi-conductive layer 518 may be applied to or deposited on the second surface 512a of substrate 512 and on or over a perimeter black out or opaquifying layer 519. Optionally, as also discussed above, the perimeter layer 519 may be conductive. Optionally, as shown in FIG. 19, the perimeter opaquifying layer 519 may be non-conducting and applied to or deposited on the outer perimeter region 512g of the rear surface 512a of front substrate 512, and an electrical conducting perimeter busbar layer 519a (such as a metallic or high electrical conducting layer) may be applied to the opaquifying layer 519 and may overlap or fold over to cover a portion of the side edge 512c of substrate 512, such that the metallic or high electrical conducting busbar layer 519a may provide the electrical connection to the semi-conductive layer 518, while the opaquifying layer 519 may function to substantially hide or conceal the metallic busbar layer 519a and seal 517 of the reflective element assembly, such that the layers and seals and connectors are not viewable by a driver or occupant of the vehicle when viewing the reflective element assembly of the mirror assembly of the vehicle.

Figure 19A:
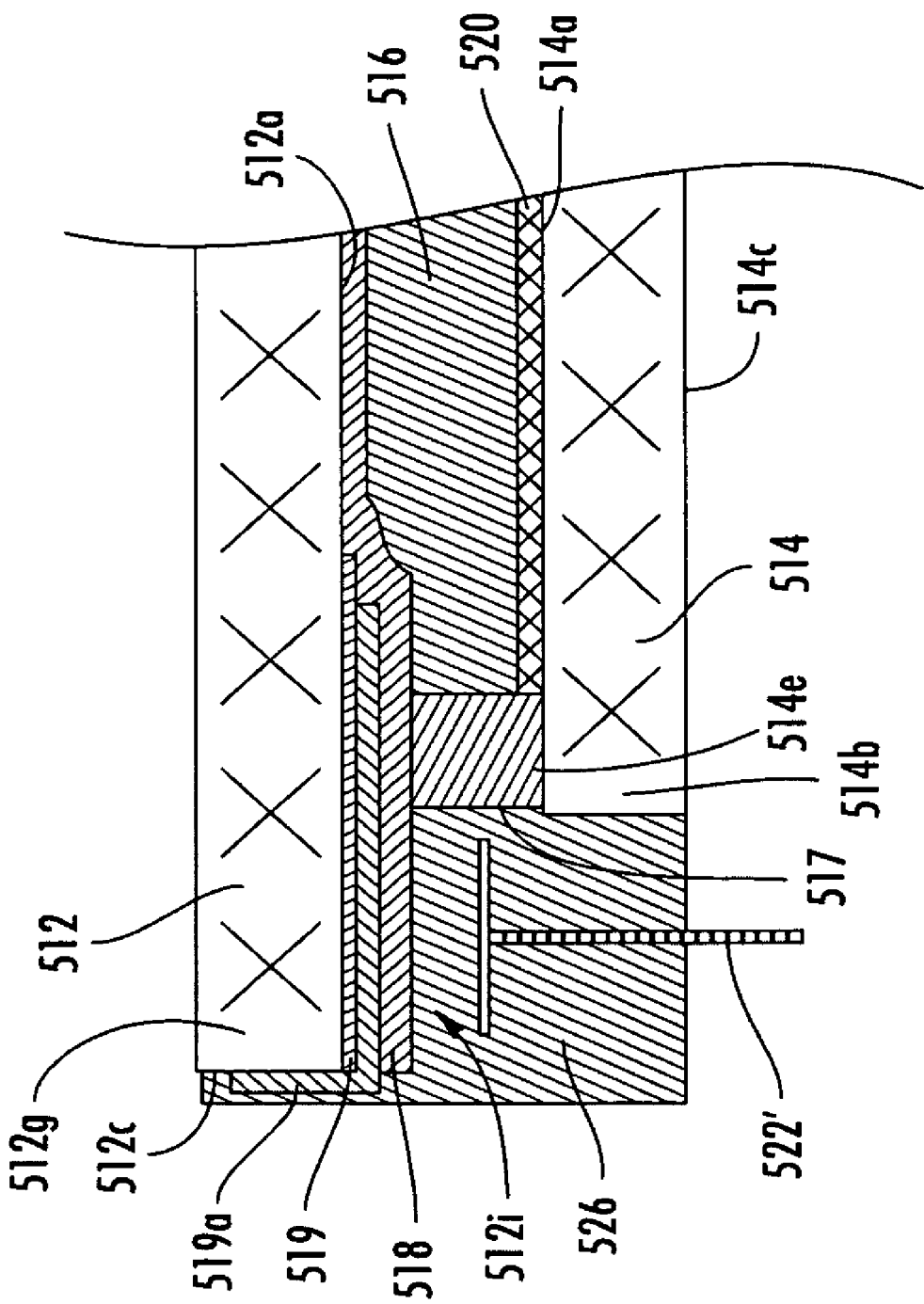

The potting material 526 may extend partially around the perimeter edge of the front substrate and substantially surround and seal the electrical connector 522 at the rear surface of the front substrate. Preferably, the material 526 surrounding the connector 522 may comprise a conductive material, such as a conductive epoxy, such as a conductive epoxy commercially available from DuPont, a conductive paste, a conductive tape, such as a copper tape with conductive adhesive, a conductive frit or the like, to provide an enhanced connection of the pin or connector 522 to the conductive layer or raceway and the semi-conductive or ITO layer or the like on the front substrate. As shown in FIG. 19, the connector 522 may contact the semi-conductive layer 518 at the conductive busbar layer 519a, and the conductive material 526 may substantially surround the connector 522 to enhance the electrical connection between the connector and the semi-conductive layer 518 and/or the conductive busbar layer 519a. Optionally, and with reference to FIG. 19A, the connector 522' may be spaced from the semi-conductive layer 518 and conductive busbar layer 519a and substantially surrounded by the conductive material 526, such that the conductive material 526 connects the connector 522 along the semi-conductive layer 518 and busbar layer 519a. Because a substantial amount of conductive material 526 may be packed in or disposed around the connectors and along the semi-conductive layer and busbar layer to substantially fill the overlap region or area, the conductive material may provide enhanced electrical flow and electrical contact between the connector and the busbar layer, thereby improving the performance of the reflective element assembly. Therefore, the conductive material may provide a substantial raceway effect along the semi-conductive layer and busbar layer even if the conductive material is a weak conductor.

The conductive material or epoxy may be injected or disposed into the area of the reflective element assembly outside and around the perimeter seal to substantially fill the area and to enhance the conductivity around the connector 522 and conductive coating 518 of front substrate 512. Optionally, the conductive material or epoxy may be applied to the overlap region at the "empty cell" stage of the manufacturing process, where the cell has not yet been filled with the electrochromic medium. The empty cell, with the seal and conductive epoxy disposed thereon, may then be fired or heated together to cure or harden both the seal and the conductive epoxy in a single process.

Therefore, the opaquifying layer and semi-conductive and conductive layers, and the electrical connectors of the reflective element assembly 510 provide a concealed or hidden seal and electrical connectors, such that the bezel size may be reduced or eliminated, while providing an aesthetically pleasing rearview mirror assembly and reflective element. The overhang region of the front substrate relative to the rear substrate may allow for multiple electrical connectors or multiple-point contact between the front electrical/perimeter busbar and the appropriate electrical power or circuitry or control or the like at the rear of the reflective element assembly or cell.

Optionally, and as shown in FIG. 20, the rear or second surface 512a' of a front substrate 512' may include multiple hiding layers 519' around the perimeter regions (such as lower perimeter region 512g' of FIG. 20) of the substrate to conceal or hide the seal 517 and connectors (not shown in FIG. 20) of the reflective element assembly. For example, the hiding layers 519' may include a "black chrome" layer 519a' (such as a chromium oxide layer or the like) applied to or deposited on the rear surface 512a' of the substrate and along the perimeter regions and overhang regions, and a chromium metal layer 519b', which may be sputter deposited or otherwise applied to the layer or layers of chromium oxide 519a'. Alternately, other metals or metal compounds may be deposited on the perimeter regions of front surface 512a' of front substrate 512', and preferably may be applied in a manner that results in a substantially opaque layer (that may be substantially non-conductive) at the surface of the substrate and a substantially pure, highly conductive metallic layer over the opaque layer, such as discussed below.

The coatings or layers on the second surface 512a' of substrate 512' may be applied to or deposited on the second surface in a manner to provide multiple and varying layers of chromium oxide or other metals or metal compounds or the like to enhance the performance of the layers. For example, the central region of the second surface 512a' may be masked while leaving the border or perimeter region 512b' unmasked during the application or deposition of the layers 519'. The chromium oxide layer or layers 519a' or the like may be reactively sputter deposited or evaporated in an oxygen atmosphere to deposit a dark, light absorbing chromium layer on the perimeter region 512b' of the second surface 512a' of the front substrate 512'. While the chromium oxide is being deposited or applied to the perimeter region 512b', the oxygen gas level in the vacuum chamber may be gradually reduced to approximately zero, thereby providing varying layers 519a' of chromium oxide on the perimeter region 512b'. The chromium metal conductive layer 519b' may then be sputter deposited or coated onto the chromium oxide layer or layers 519a', such as in a zero oxygen atmosphere, to deposit a metal conducting perimeter coating at the perimeter region 512b' of the rear surface 512a' of front substrate 512'. The front substrate 512' may be removed from the vacuum chamber and the mask over the central region may be removed. The transparent semi-conductive coating or layer 518 may then be sputter deposited or coated or otherwise applied to or deposited on or across the entire rear surface 512a' of front substrate 512'. Such a process and coatings provide a build up of "black chrome" (such as approximately 500 angstroms to approximately 2,000 angstroms thick) initially, followed by "metallic chrome" (such as approximately 500 angstroms to approximately 3,000 angstroms thick), thereby forming a border or perimeter electrically conductive busbar, but with the black chrome layer being substantially non-reflecting when viewed from the first surface side of the front substrate or reflective element assembly. Although described as comprising chrome oxide, other metals may be provided to form a metal compound (such as chrome oxide, nickel oxide, silver oxide or the like) at the substrate surface and a substantially pure metallic deposit (such as chromium, nickel, silver or the like) to provide a highly conductive raceway. The metal compound may be sandwiched between the substrate and the substantially pure metal, and provides a dark (such as black) layer at the substrate surface to at least substantially conceal or hide the seals and connectors and the like, while the substantially pure metal is at the semi-conductive layer or ITO layer or the like.

Optionally, and according to another aspect of the present invention, an electro-optic or electrochromic mirror assembly for a vehicle may comprise an electro-optic or electrochromic mirror element or reflective element assembly comprising a front or first substrate having first and second surfaces and a rear or second substrate having third and fourth surfaces. The first and second substrates are arranged so that the second surface opposes the third surface with an electro-optic or electrochromic medium disposed therebetween. The first substrate has at least one at least partially conductive or semi-conductive coating or layer on the second surface and may also have an opaquifying conductive border/perimeter coating/layer around the perimeter edges or regions of the substrate. The second substrate has at least one at least partially conductive coating or layer on the third surface. The first and second substrates are positioned relative to one another such that at least a portion of an edge of the first substrate is generally flush or aligned with a corresponding edge of the second substrate. The edge of the second substrate may have a relief area formed therealong relative to the edge of the first substrate, wherein the relief area provides clearance or access for electrical connection to the conductive border/perimeter coating/layer on the second surface of the corresponding edge of the first substrate. The electrical connections to the first substrate may provide or deliver electrical power to the semi-conductive coating on the second surface of the first substrate and to the conductive coating on the third surface of the second substrate, as discussed below.

The perimeter seal of the reflective element assembly may be formed such that the outer edge of the perimeter seal is generally flush with the edges of both the first and second substrates except in the relief area or areas formed along the edge of second substrate. The perimeter seal profile in the relief areas along the edge of the second substrate may be configured such that the outer edge of the perimeter seal is recessed from the outer edges of both the first and second substrates, such that a gap or spacing between the first and the second substrates is created outside of the seal. A conductive material or bridge may be disposed or applied at the gap or spacing to couple the conductive coating on the third surface of the second substrate with the appropriate electrical connector or contact at the border/perimeter conductive coating/layer on the second surface of the first substrate. In addition, in order to avoid shorting of the positive and negative electrical contacts, a small portion of the border/perimeter conductive coating/layer and the underneath transparent semi-conductive coating on the second surface of the first substrate may be removed (electrically isolated) in a pattern generally around the electrical contact for the second substrate at the spacing created in the relief area or areas formed along the edge or edges of the substrates. Electrical contact to the semi-conductive layer of the second surface of the first substrate may be made by affixing an electrical lead to the perimeter/border conductive coating/layer in the relief areas, while electrical contact to the third surface of the second substrate may be made by affixing an electrical lead to the perimeter/border conductive coating/layer of the first substrate in the electrically isolated portion of the relief area or areas. The electrical contact is then made to the third surface of the second substrate via the conductive material or bridge between the first and second substrates at the electrically isolated relief area or areas.

The electrical contacts to the transparent semi-conductive layer on the front substrate and the reflective conductive layer on the rear substrate may thus be made at one of the substrates, with a conductive bridge connecting one of the contacts at one substrate to the coating or layer on the other substrate. Such a configuration or arrangement may provide for a true flush, bezelless cell or reflective element assembly and may facilitate making both electrical contacts to the front substrate at specified areas or relief areas along the perimeter edges or regions of the substrates.

Figure 21:
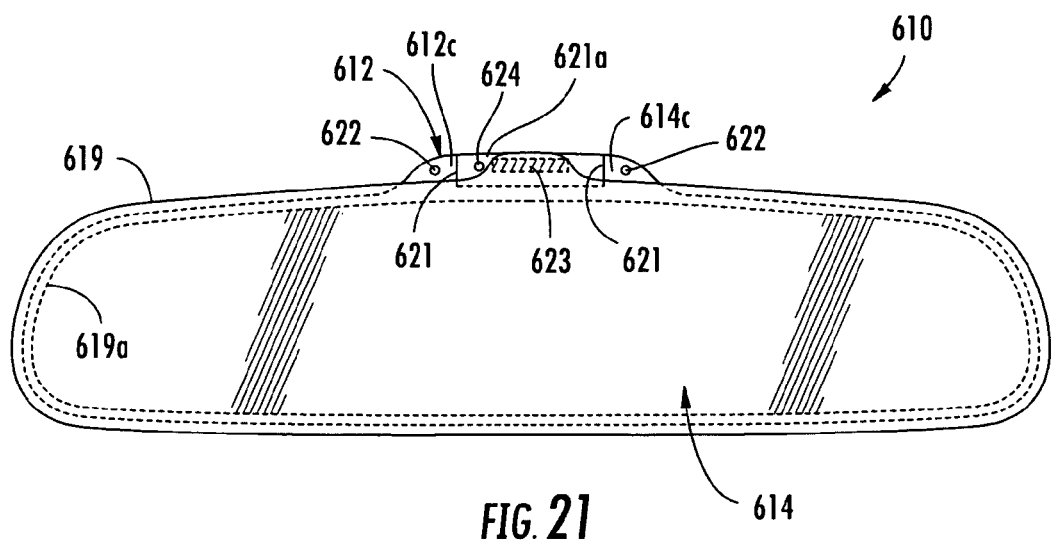
FIG. 21 is a plan view of the rear surface of another electro-optic reflective element assembly in accordance with the present invention, with the electrical connections provided at the front substrate.

For example, and with reference to FIG. 21, an electro-optic or electrochromic reflective element assembly or cell 610 includes a front substrate 612 and a rear substrate 614 and may provide generally flush edges of the substrates substantially around the reflective element assembly. As shown in FIG. 21, the front substrate 612 may provide a top hat form or protrusion 612c along the upper edge of the front substrate, and the rear substrate 614 may also provide a smaller top hat form or protrusion 614c along its upper edge (such as discussed above with respect to the rear substrate 414 of FIGS. 13-15). The seal around the electrochromic medium is positioned along and between the outer edges of the substrates, except at the top hat forms. The top hat form 614c of rear substrate 614 thus generally overlaps the top hat form 612c of front substrate 612, with a gap or spacing defined between the top hat forms 612c, 614c and outward of the seal.

The second surface or rear surface of front substrate 612 is coated with a semi-conductive transparent coating or layer and a perimeter busbar layer 619a and perimeter opaquifying or "black-out" layer 619 around its perimeter edges, such as, for example, coatings or layers similar to the busbar layer 519a and opaquifying layer 519 of reflective element assembly 510, discussed above. As can be seen in FIG. 21, the top hat form 612c of front substrate 612 provides for electrical contacts or connectors 622 (such as pins or clips or the like) at the perimeter busbar layer 619a at either or both ends of the top hat form 612c. A gap or deletion line 621 may be provided along a portion of the conductive layer on top hat form 612c to electrically isolate a center portion or region 621a of the top hat form 612c from the ends of the top hat form where the positive electrical contacts are provided. An electrical contact or connector 624 (such as a pin or clip or the like) may be provided at the electrically isolated region 621a.

Top hat form 614c of rear substrate 614 may be coated with the conductive coating on the third surface of the substrate and/or may have a conductive coating or layer and tab-out edge of the conductive coating on the surface (such as, for example, a conductive coating or layer and tab-out portion of the types described above with respect to FIG. 16). The second or rear substrate 614 may include a perimeter, electrically conductive coating or layer around the perimeter edges and perimeter regions of the third surface of the rear substrate 614 (such as, for example, a perimeter electrically conductive coating of the type described above with respect to FIG. 18).

Reflective element assembly 610 further includes a conductive material or bridge 623, such as a conductive epoxy or the like, disposed at the electrically isolated region 621a and spanning the gap between the top hat forms 612c, 614c of the front and rear substrates. The conductive bridge 623 provides for electrical connection between the electrically isolated region 621a (and the electrical connector 624 connected thereto) of the top hat form 612c of front substrate 612 and the conductive coating or layer or tab-out region of the top hat form 614c of rear substrate 614.

Accordingly, electrical power may be applied to the semi-conductive coating or layer on the second surface of the front substrate via an electrical connector or contact (such as a pin or clip or the like) at the top hat form of the front substrate. Electrical power may also be applied to the conductive coating or layer on the third surface of the rear substrate via an electrical connector or contact (such as a pin or clip or the like) also positioned at the top hat form of the front substrate (and via the conductive bridge). The present invention thus provides a flush electro-optic or electrochromic cell or reflective element assembly with electrical contacts at only one of the substrates.

Figure 22:
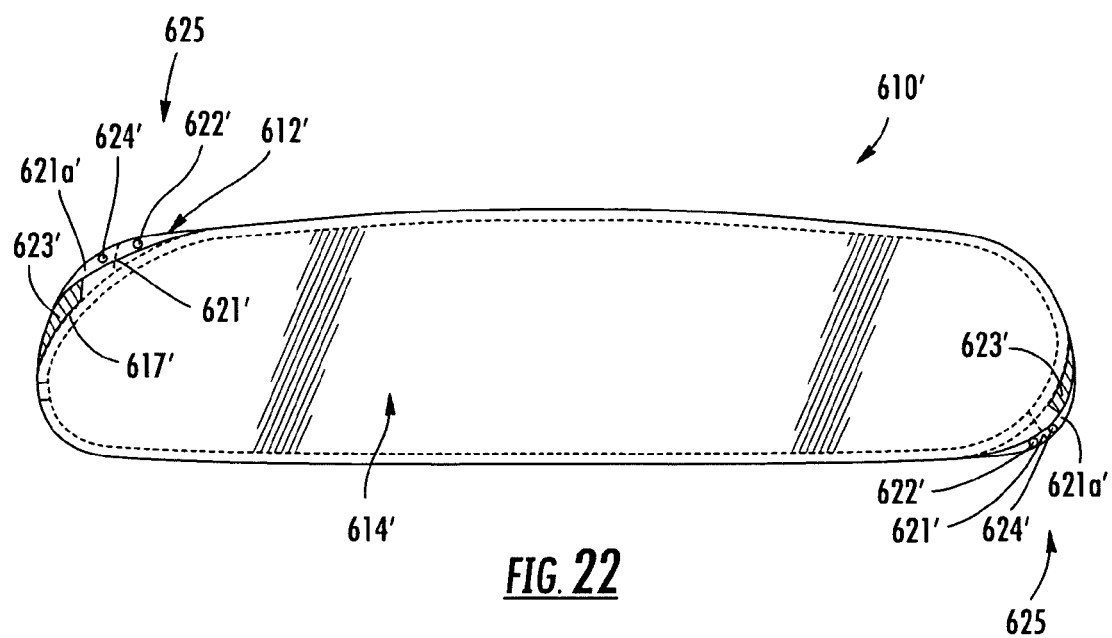
FIG. 22 is a plan view of the rear surface of another electro-optic reflective element assembly similar to FIG. 21, but with the electrical connections provided at opposite corners of the reflective element assembly.
Figure 23:
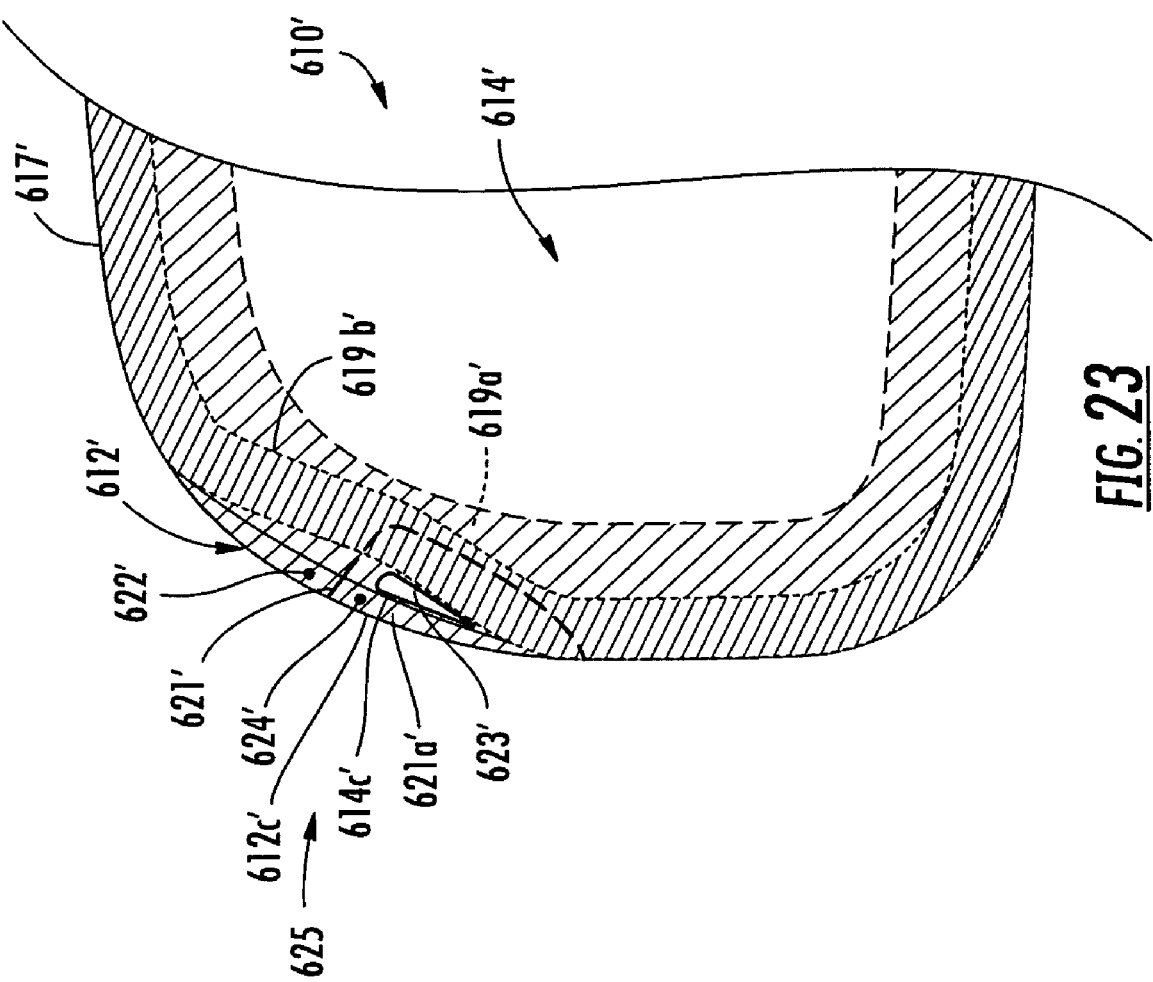
FIG. 23 is an enlarged plan view of one of the corners of the reflective element assembly of FIG. 22.

Optionally, and with reference to FIGS. 22 and 23, an electro-optic or electrochromic mirror cell or reflective element assembly 610' may provide one or more relief regions 625 around the perimeter edges of the reflective element assembly, such as at generally opposite corners of the reflective element assembly 610'. The relief regions 625 may be defined by areas or regions of the rear substrate 614' which may be cut back relative to the corresponding edge or edges of the front substrate 612' to provide a relief area exposing the second surface of the front substrate 612' when the reflective element assembly is viewed from the rear of the reflective element assembly. The front and rear substrates 612', 614' may otherwise be generally flush along their edges except at the relief regions 625.

The front substrate 612' may include a transparent semi-conductive layer on its second or rear surface and may include a busbar layer 619a' (which may include a tab out portion 619b' over the relief region or regions 625) and/or a opaquifying or black-out layer around its perimeter edges and an electrical contact 622' at each of the areas or regions exposed by the relief regions (such as discussed above). The electrical contact 622' is electrically connected to the semi-conductive layer and busbar layer or tab out portion on the front substrate 612'. Each of the areas or regions of the second surface of the front substrate that are exposed by the relief regions also includes a deletion line 621' that defines an electrically isolated area or region 621a'. A second electrical contact 624' is applied or connected to the electrically isolated region 621a' of each of the relief regions.

As can be seen in FIGS. 22 and 23, the seal 617' around the electro-optic or electrochromic medium of the reflective element assembly may be configured or arranged to be between the front and rear substrates and generally along the perimeter edges of the front and rear substrates, except in the relief regions 625. At the relief regions 625, the seal may be positioned inward of the outer edges 614c' of the rear substrate 614', which are inward of the outer edges 612c' of the front substrate 612'. A gap or spacing thus exists between the front and rear substrates outside of the seal 617' and at each of the relief regions 625. The electrically isolated region 621a' is formed to generally correspond with the area of the substrates that have the gap or spacing therebetween. A conductive material or bridge 623' is provided between the front and rear substrates at each of the relief regions to conductively span the gap between the electrically isolated area 621a' (and electrical connector 624') of the front substrate 612' and the conductive coating or layer or layers of the rear substrate 614'.

Optionally, and as shown in FIG. 24, the reflective element assembly 610" may include a perimeter conductive coating or busbar coating 619a" around the perimeter of the front substrate 612' and a seal 617" around the perimeter of the substrates except at the relief region 625" of the rear substrate 614". In the illustrated embodiment of FIG. 24, the electro-optic or electrochromic reflective element assembly includes one relief region 625" (defined by the cut off or reduced edge 614c" of rear substrate 614"), but could include two or more, such as at opposite corners of the reflective element assembly or the like, without affecting the scope of the present invention. The reflective element assembly 610" is otherwise substantially similar to reflective element assembly 610', discussed above, such that a detailed discussion of the reflective element assembly will not be repeated herein.

The electro-optic or electrochromic mirror cell or reflective element assembly 610' thus may provide for electrical connections at two or more locations around the mirror cell or reflective element assembly, and may provide for the electrical connections at only the front substrate of the reflective element assembly. The reflective element assembly thus may provide a flush reflective element assembly or mirror cell that may be implemented in a bezeless mirror assembly, while providing enhanced performance or coloring or darkening of the reflective element assembly.

Optionally, and with reference to FIGS. 25A and 25B, an exterior rearview mirror cell or reflective element assembly for an exterior rearview mirror assembly of a vehicle includes a first or front substrate 712 (FIG. 25A) and a second or rear substrate 714 (FIG. 25B) and an electro-optic or electrochromic medium and seal 717 sandwiched therebetween, such as described above. As also described above, the front substrate 712 may have a transparent semi-conductive layer or coating 718 (such as ITO or the like) applied to the second or rear surface 712a of the substrate, and may include an opaquifying conductive border/perimeter coating or layer 719 (such as, for example, a black conductive epoxy or dark colored conductive frit or black chrome/metallic chrome layer or the like) applied around the perimeter edges of the front substrate 712. As shown in FIG. 25A, the perimeter coating or layer 719 may be along the perimeter edges of the front substrate 712 except in an electrical connection area or region 725 of substrate 712, where the perimeter coating 719 is inward of the outer edges of substrate 712. The electrical connection region 725 is coated by the semi-conductive layer 718 and/or a conductive layer or the like. A deletion line 721, such as a non-conductive area in the region 725 where the busbar layer and semi-conductive layer is etched off or otherwise removed from or not applied to the surface of the substrate, is formed at the electrical connection area 725 to separate and define and electrically isolate a rear substrate electrical connection area 725a or raceway portion of the semi-conductive layer from a front substrate electrical connection area 725b or surface portion of the semi-conductive layer.

An electrical connection or contact 722 is connected to or applied to the front substrate electrical connection area 725b to provide electrical power or connection to the semi-conductive layer 718 on the rear surface of the front substrate 712. Likewise, an electrical connection or contact 724 is connected to or applied to the electrically isolated rear substrate electrical connection area 725a and is in electrical communication with the conductive layer of the third surface 714a of rear substrate 714 via a conductive material or bridge 723, as discussed below.

With reference to FIG. 25B, rear substrate 714 includes a metallic reflector layer 720 (such as a layer or layers comprising, for example, chromium, chromium/rhodium, aluminum, silver, aluminum alloy, silver alloy, an ITO/silver/ITO stack, an ITO/aluminum/ITO stack or the like, such as ITO-silver-ITO stacks or layers, or display on demand stacks or layers or infrared transmitting stacks or layers of the types described in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference) on its front or third surface 714a, and a perimeter black seal 717 generally around the perimeter edges of the substrate. As can be seen in FIG. 25B, an electrical connection area 727 may be defined at a region of the rear substrate 714, such as at a corner of the substrate, where the perimeter seal 717 is positioned inward of the outer edge of the substrate. The rear substrate 714 is formed to be substantially identical in shape to the front substrate 712, except at the electrical connection area 727, where the rear substrate may be cut back or reduced along a cut-away or cut back edge 714c. The conductive bridge 723 is positioned at a portion of the electrical connection area 727 to provide electrical connection to the metallic reflective coating or layer 720 via electrical connector 724 at front substrate 712.

When the substrates 712, 714 are placed together to form the electro-optic or electrochromic mirror cell or reflective element assembly (with the electro-optic or electrochromic medium disposed or sandwiched therebetween), the electrical connection area 727 of rear substrate 714 generally aligns with a portion of the electrical connection area 725 of front substrate 712. The conductive bridge 723 bridges or spans the gap or spacing between the electrical connection areas 725a and 727 to connect the electrical contact or connector 724 and electrical connection area 725a to the metallic conductive reflective layer 720 of rear substrate 714.

The cut-away edge 714c of rear substrate 714 provides for exposure of the electrical connectors or contacts 722, 724 along the outer edge 712c of the electrical connection area 725 of front substrate 712. The electrical contacts for providing electrical power to the conductive or semi-conductive layers at both substrates are made at only one of the substrates. The other edges of the substrates 712, 714 are generally flush or aligned to form a flush reflective element assembly for an exterior rearview mirror assembly. The reflective element assembly may thus be implemented in a mirror assembly having a minimal bezel or a bezelless mirror assembly to enhance the appearance of the mirror assembly.

Figure 26:
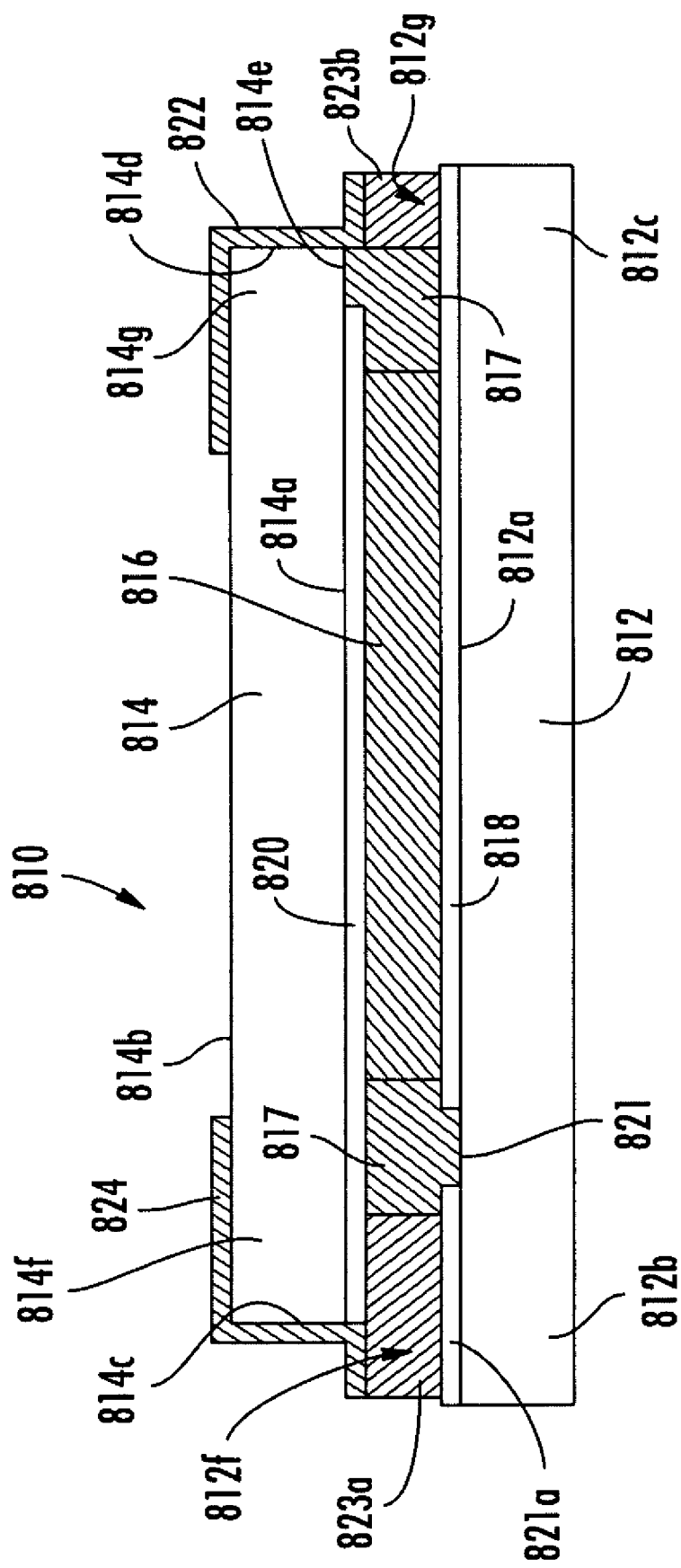
FIG. 26 is a sectional view of another electro-optic reflective element assembly in accordance with the present invention, with the electrical connections provided at the front substrate.
Figure 27:
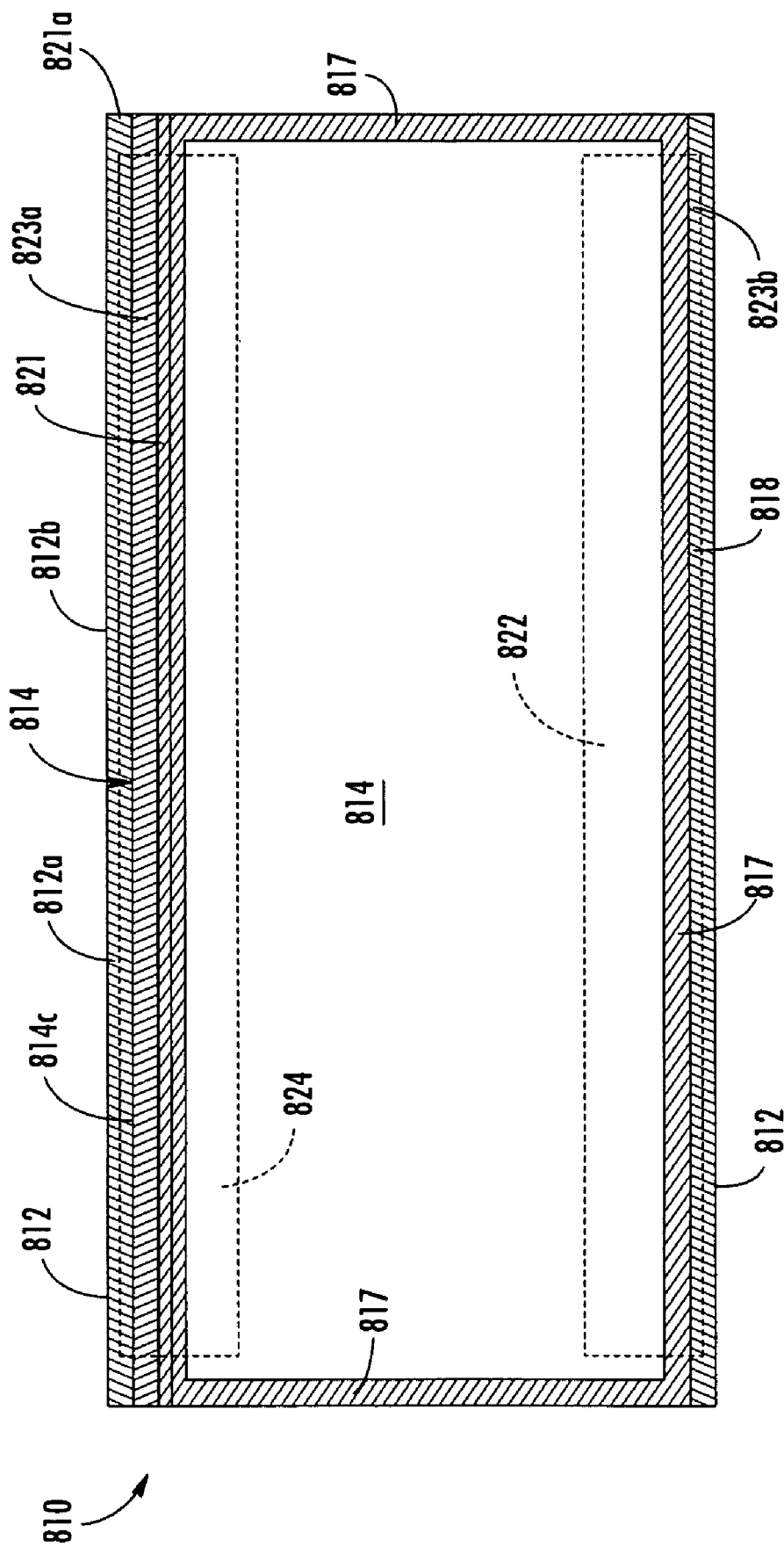
FIG. 27 is a plan view of the electro-optic reflective element assembly of FIG. 26.

Referring now to FIGS. 26 and 27, an electro-optic or electrochromic mirror cell or reflective element assembly 810 includes a front substrate 812 and a rear substrate 814 and an electro-optic or electrochromic medium 816 sandwiched between the semi-conductive or conductive layers 818, 820 on the surfaces 812a, 814a of the substrates 812, 814, respectively. A dimension of the front substrate, such as a height dimension, is greater than that of the rear substrate, such that the upper and lower perimeter regions or edge portions 812b, 812c of front substrate 812 extend beyond the upper and lower perimeter regions or edge portions 814f, 814g of rear substrate 814 and define overhang regions 812f, 812g. As shown in FIG. 26, the conductive layer 820 of rear substrate 814 does not extend fully over third surface 814a at the perimeter region 814g of substrate 814. Third surface 814a may be masked during the coating process, such that a non-conductive glass surface 814e is provided generally along the perimeter region 814g of surface 814a.

Reflective element assembly 810 includes electrical connectors 824, 822 at a rear surface 814b of rear substrate 814 and at least partially along the upper edge 814c and lower edge 814d of rear substrate 814, respectively. The connectors may be disposed partially at the rear surface 814b of rear substrate 814 and may extend along and overlap the edges 814c, 814d of rear substrate 814. The electrical or metallic connectors 824, 822 are in electrical connection with the respective conductive layers 820, 818 and may be connected to an electrical power source or circuitry or the like to provide electrical power to the semi-conductive coatings 818, 820 to darken or color the electrochromic medium 816. The front substrate 812 includes a deletion line 821 along the upper portion 812b of the substrate and along the semi-conductive coating or layer 818 on the rear surface 812a of substrate 812. The deletion line 821 defines an electrically isolated area or region 821a along a perimeter region of substrate 812, such as along the upper portion of the substrate 812.

As can be seen with reference to FIG. 27, the reflective element assembly 810 includes a non-conductive perimeter seal 817 around the electrochromic medium 816, as is known in the art. The seal 817 overlaps and at least partially or substantially fills or encompasses the deletion line 821 along one side of the reflective element assembly and at least partially or substantially fills or covers or encompasses the masked surface 814e along the other side of the reflective element assembly. A conductive material or adhesive or bridge or the like 823a is disposed or applied along the upper region of the front substrate and outside of the seal 817, while a conductive material or adhesive or bridge or the like 823b is disposed or applied along the lower region of the front substrate and outside of the seal 817. Accordingly, when power is applied to connector 822, the connector provides or delivers power to or energizes the semi-conductive layer 818 on front substrate 812 via the conductive bridge 823b (whereby the conductive bridge may function as an electrical raceway along the edge of the reflective element assembly). The non-conductive seal 817 and non-conductive surface 814e of rear substrate 814 function to electrically isolate or insulate connector 822 and conductive bridge 823b from conductive coating or layer 820 of rear substrate 814. When power is applied to connector 824, the connector provides or delivers power to the conductive layer 820 on rear substrate 814 via contact of the connector 824 along the edge of the conductive coating 820 and via the conductive bridge 823a along the edge or perimeter region of the reflective element assembly. The conductive bridge 823a and raceway portion 821a may function as an electrical raceway along an edge portion or perimeter region of the conductive layer or coating 820 of rear substrate 814. The conductive bridge 823a does not power the semi-conductive layer 818 on front substrate 812 because the conductive bridge 823a is at the electrically isolated area 821a along the upper portion or perimeter region of the front substrate.

Optionally, and as shown in FIG. 28, an electro-optic or electrochromic mirror cell or reflective element assembly 810' may include metallic connectors 822', 824' that extend across the gap between the substrates 812, 814 and contact the semi-conductive layer 818 on the rear surface 812a of the front substrate 812. The conductive bridge 823 functions to communicate the power from connector 824' to the conductive layer 820 on the front surface 814a of rear substrate 814. The deletion line 821 defines the electrically isolated area 821a along the front substrate where the connector 824' connects to or contacts the semi-conductive layer 818 of the front substrate 812 at the overhang region 812f of front substrate 812. The connector 822' contacts the surface portion of the semi-conductive layer 818 (which substantially covers the rear surface of the front substrate 812) along the other border or perimeter region or overhang region 812g of the front substrate. The non-conductive glass surface 814e and non-conductive perimeter seal 817 function to electrically isolate or insulate the connector 822' from conductive coating 820 of rear substrate 814. The mirror cell or reflective element assembly 810' is otherwise substantially similar to the reflective element assemblies discussed above, such that a detailed discussion of the reflective element assembly will not be repeated herein.

Optionally, and as shown in FIG. 29, a reflective element assembly 810" is substantially similar to the reflective element assembly 810', discussed above, but includes conductive pins or foil strips 822", 824". The foil strips 822", 824" are disposed between a heater pad or backing plate 811 and the semi-conductive layer 818 at the rear surface 812a of the front substrate 812. The strips 822", 824" may include one or more pins or extensions 822a", 824a" extending rearwardly through the backing plate 811 for connection to an appropriate power source, control or circuitry or the like. The conductive bridge 823 functions to communicate the power from strip 824" to the conductive layer 820 on the front surface 814a of rear substrate 814. The deletion line 821 defines the electrically isolated area 821a along the front substrate where the strip 824" connects to or contacts the semi-conductive layer 818 of the front substrate 812. The strip 822" contacts the surface portion of the semi-conductive layer 818 along the other border or perimeter region of the front substrate and may function as an electrical raceway along the border region of the semi-conductive layer 818. The mirror cell or reflective element assembly 810" is otherwise substantially similar to the reflective element assemblies discussed above, such that a detailed discussion of the reflective element assembly will not be repeated herein.

Figure 30:
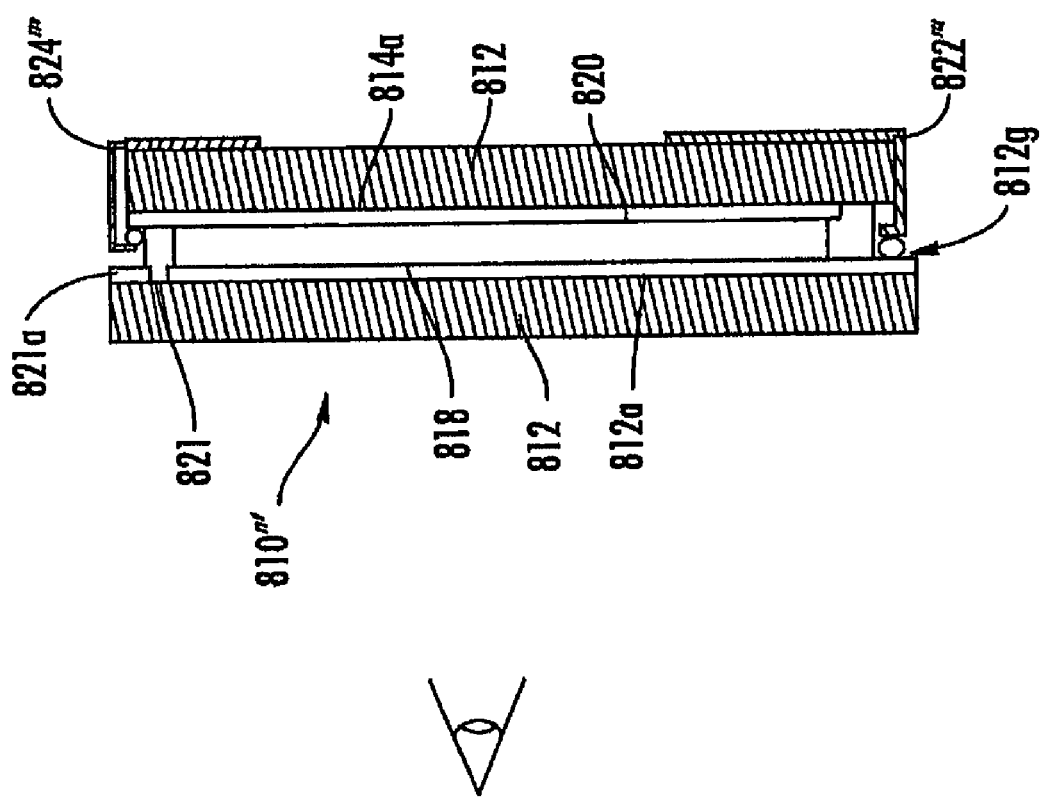
FIG. 30 is a sectional view of another electro-optic reflective element assembly in accordance with the present invention.
Figure 31:
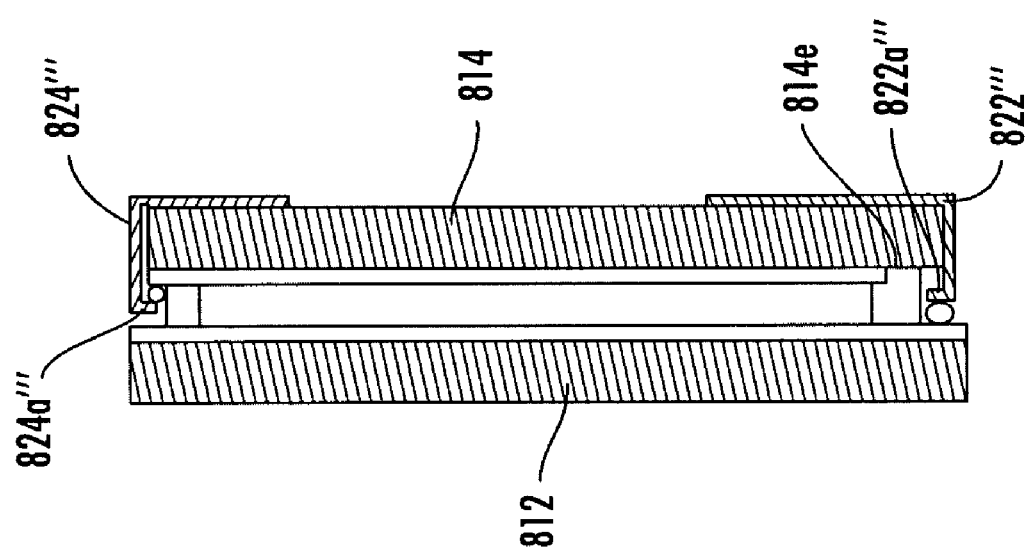
FIG. 31 is a sectional view of another electro-optic reflective element assembly in accordance with the present invention.

Optionally, and with reference to FIG. 30, a reflective element assembly 810''' includes metallic connectors or strips or foil 822''', 824''' that are inserted partially between the substrates 812, 814. The strip or foil 822''' extends across the gap between the substrates 812, 814 and contacts the semi-conductive layer 818 on the rear surface 812a of the front substrate 812 and generally at the overhang region 812g. The strip or foil 824''' contacts and connects to the conductive layer 820 on the front surface 814a of rear substrate 814. The deletion line 821 defines the electrically isolated area or raceway portion 821a along the front substrate where the strip or foil 824''' is generally positioned to isolate that portion of the front substrate to avoid shorting of the cell or reflective element assembly due to any contacting of the strip or foil 824''' to the surface portion of the semi-conductive layer 818 of the front substrate 812. The mirror cell or reflective element assembly 810''' is otherwise substantially similar to the reflective element assemblies discussed above, such that a detailed discussion of the reflective element assembly will not be repeated herein. As can be seen in FIG. 31, the connectors or strips or foils 822''', 824''' may be insulated on their sides 822a''', 824a''' opposite to their electrically contacting side, such that the deletion line is not necessary.

Figure 32:
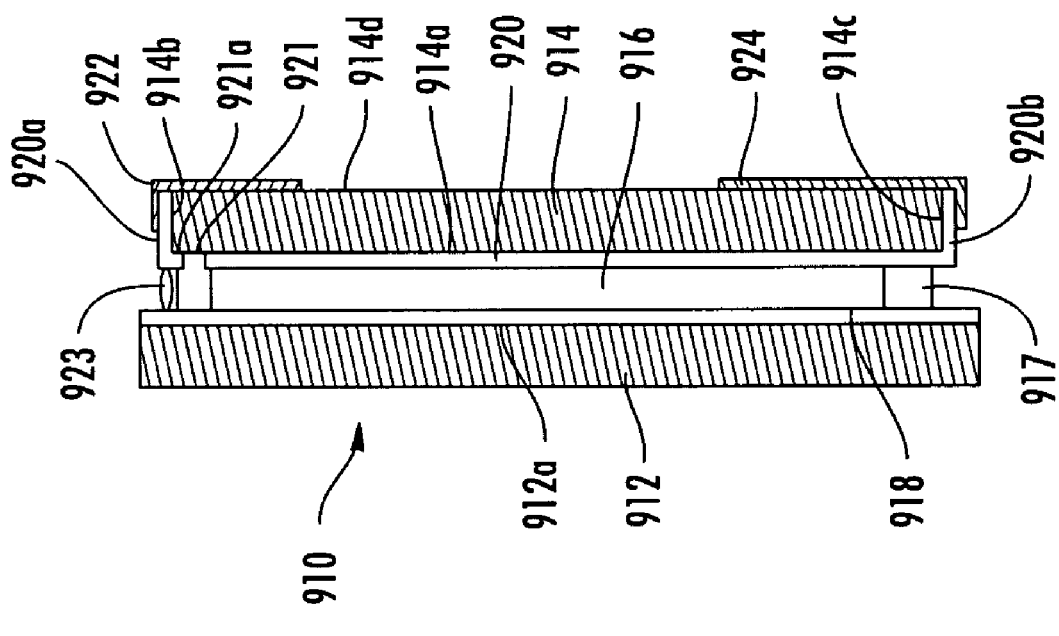
FIG. 32 is a sectional view of another electro-optic reflective element assembly in accordance with the present invention.

Optionally, and with reference to FIG. 32, an electro-optic or electrochromic cell or reflective element assembly 910 includes a front substrate 912 and a rear substrate 914 with an electro-optic or electrochromic medium 916 sandwiched between a semi-conductive layer or coating (such as ITO or the like) 918 on the rear surface 912a of the front substrate 912 and a conductive layer or coating 920 (such as silver, silver alloy, or the like) on the front surface 914a of the rear substrate 914. A perimeter seal 917 is disposed around the electrochromic medium 916. As can be seen in FIG. 32, the conductive layer 920 is applied or coated or oversprayed at least partially onto the edges 914b, 914c of the rear substrate 914. The conductive layer 920 on the rear substrate 914 includes a deletion line 921 to define an electrically isolated area or raceway portion 921a along a perimeter or border region or portion of the rear substrate 914. A conductive material or bridge 923 (such as a conductive epoxy, frit, paste or the like) is disposed along the perimeter or border region and between the electrically isolated area 921a and the semi-conductive layer 918 of front substrate 912.

An electrical connector 922 is disposed at the rear substrate, such as partially along the rear surface 914d of rear substrate 914, and overlaps at least a portion 920a of the conductive layer 920 on the edge 914b of rear substrate 914, thereby providing an electrical connection from the rear of the reflective element assembly 910 to the electrically isolated area 921a of the conductive layer 920. The connector 922 thus provides an electrical connection to the semi-conductive layer 918 on the rear surface 912a of the front substrate 912 via the conductive bridge 923 extending along and between the isolated area 921a and the semi-conductive layer 918 at the perimeter or border regions of the front and rear substrates. The isolated area 921a and the conductive bridge 923 provide an electrical raceway along a perimeter or border portion of the semi-conductive layer 918 to enhance the performance of the reflective element assembly 910.

A second electrical connector 924 is disposed partially along the rear surface 914d of the rear substrate 914 and overlaps at least a portion 920b of the conductive layer 920 at the edge 914c of rear substrate 914, thereby providing an electrical connection from the rear of the reflective element assembly 910 to the conductive layer 920 along the front surface 914a of rear substrate 914.

Referring now to FIGS. 33A-C, an electro-optic or electrochromic cell or reflective element assembly 1010 includes a front substrate 1012 and a rear substrate 1014 with an electro-optic or electrochromic medium 1016 sandwiched between a semi-conductive layer or coating (such as ITO or the like) 1018 on the rear surface 1012a of the front substrate 1012 and a conductive layer or coating (such as silver, silver alloy or the like) 1020 on the front surface 1014a of the rear substrate 1014. A perimeter seal 1017 is disposed around the electrochromic medium 1016. The semi-conductive layer 1018 on the front substrate 1012 includes a deletion line 1019 to define an electrically isolated area or raceway portion 1019a along a perimeter or border region or portion 1012b of the front substrate 1012, while the conductive layer 1020 on the rear substrate 1014 includes a deletion line 1021 to define an electrically isolated area or raceway portion 1021a along a perimeter or border region or portion 1014b of the rear substrate 1014. A conductive material or bridge 1023a (such as a conductive epoxy, film, frit, paste or the like) is disposed along the perimeter or border region 1012b and between the electrically isolated area 1019a and the conductive layer 1020 of rear substrate 1014, while a second conductive material or bridge 1023b (such as a conductive epoxy, film, frit, paste or the like) is disposed along the opposite perimeter or border region 1014b and between the electrically isolated area 1021a and the semi-conductive layer 1018 of front substrate 1012.

As can be seen in FIGS. 33B and 33C, the rear substrate 1014 includes a pair of notches 1025a, 1025b to provide for electrical contact to the respective conductive bridges 1023a, 1023b. As best shown in FIG. 33C, an electrical connector or contact (not shown) may engage or contact the conductive bridge 1023a at the notch or cut away 1025a, whereby the conductive bridge 1023a may function as an electrical raceway along the border region 1014c of rear substrate 1014, while the electrically isolated area 1019a and deletion line 1019 of border region 1012b of front substrate 1012 substantially precludes electrical power from reaching the semi-conductive layer 1018 along the rear surface 1012a of front substrate 1012. Likewise, another electrical connector or contact may engage or contact the conductive bridge 1023b at the notch or cut away 1025b, whereby the conductive bridge 1023b may function as an electrical raceway along the border region 1012c of front substrate 1012, while the electrically isolated area 1021a and deletion line 1021 of border region 1014b of rear substrate 1014 substantially precludes electrical power from reaching the conductive layer 1020 along the front surface 1014a of rear substrate 1014.

Figure 34:
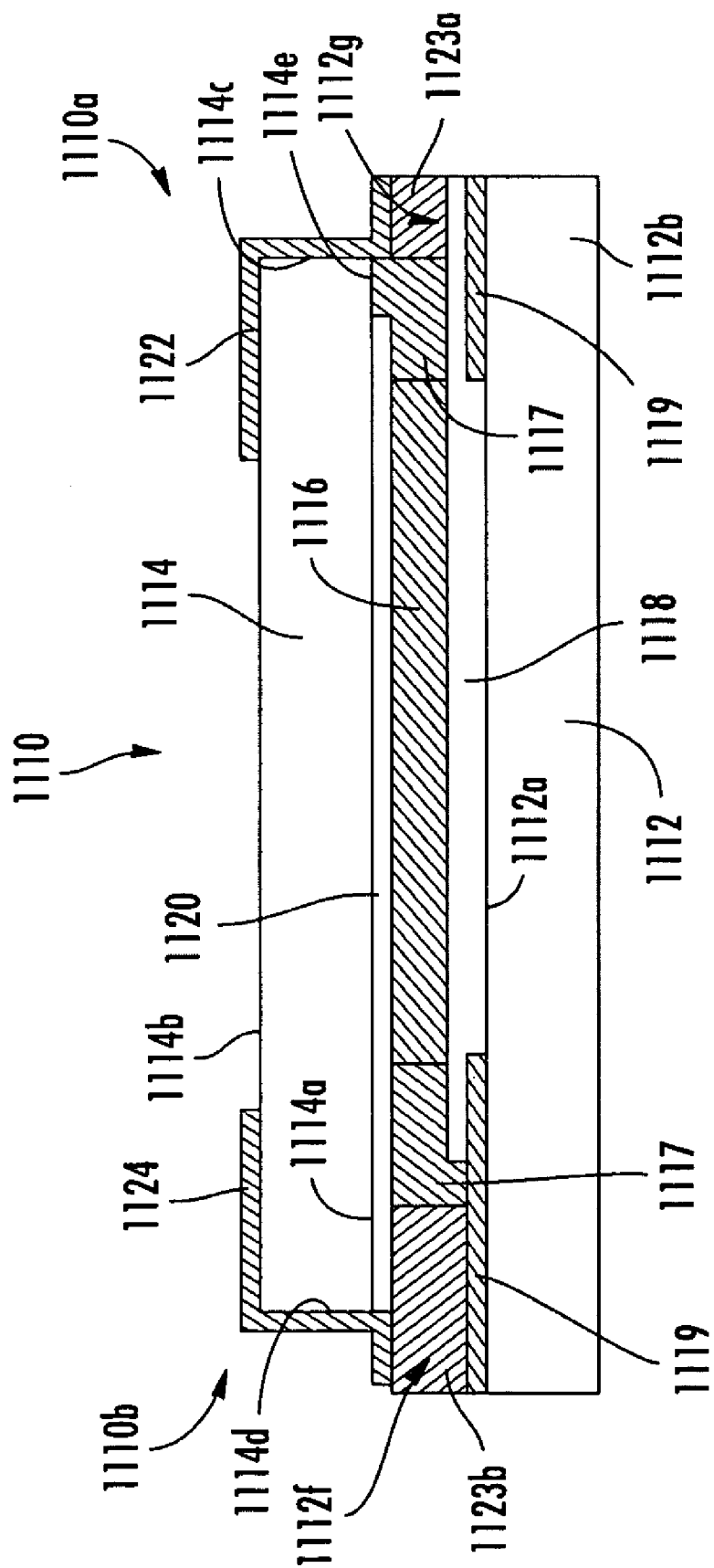
FIG. 34 is a sectional view of another electro-optic reflective element assembly in accordance with the present invention.

Referring now to FIG. 34, an electro-optic or electrochromic cell or reflective element assembly 1110 includes a front substrate 1112 and a rear substrate 1114 with an electro-optic or electrochromic medium 1116 sandwiched between a semi-conductive layer or coating (such as ITO or the like) 1118 on the rear surface 1112a of the front substrate 1112 and a conductive layer or coating (such as silver, silver alloy, or the like) 1120 on the front surface 1114a of the rear substrate 1114. A perimeter seal 1117 is disposed around the electrochromic medium 1116. The front substrate 1112 includes an opaquifying or darkening or blackening or concealing or hiding non-conductive border coating 119 disposed around the perimeter regions or border of the rear surface 1112a. The border coating 1119 may comprise a decorative and/or color matching coating, and may be colored to match the body color, the color of the mirror case or the color of the electrochromic medium in its night state, or any other desired color. The transparent semi-conductive coating or layer 1118 is disposed on the rear surface 1112a of front substrate 1112 and may at least partially overlap the non-conductive border coating 1119, at least along one border region 1112b of the front substrate 1112, such as shown in FIG. 34.

Reflective element assembly 1110 includes an electrical connector 1122 that may be disposed at a perimeter or border region 1110a of the reflective element assembly for providing or delivering electrical power to the semi-conductive layer 1118 of front substrate 1112 via a conductive bridge or adhesive 1123a. As can be seen in FIG. 34, the connector 1122 is formed to overlay the rear surface 1114b of rear substrate 1114 and extend along an edge 1114c of the rear substrate and contact the conductive bridge 1123a disposed between the connector 1122 and the semi-conductive layer 1118 and outside of the perimeter seal 1117 at the overhang region 1112g. The conductive layer 1120 may not extend fully across the front surface 1114a of rear substrate 1114 at the connector 1122, so that a non-conductive glass surface 1114e is defined along the perimeter edge portion or region 1114c of rear substrate, whereby a gap is defined between the connector 1122 and conductive layer 1120. The non-conductive glass surface 1114e or gap and the non-conductive perimeter seal 1117 function to electrically isolate or insulate the connector 1122 from conductive coating 1120 of rear substrate 1114 to preclude shorting of the electrochromic cell or reflective element assembly.

Likewise, a second electrical connector 1124 may be disposed on another perimeter region 1110b of the reflective element and may be formed to overlay the rear surface 1114b of rear substrate 1114 and extend along an edge 1114d of the rear substrate and contact the conductive bridge 1123b disposed between the connector 1124 and the conductive layer 1120 and outside of the perimeter seal 1117. The conductive layer or coating 1118 of front substrate 1112 may not extend fully across the surface 1112a of front substrate 1112 so as to define a non-conductive surface or area of border coating 1119 at conductive bridge 1123b and generally at the overhang region 1112f. The second surface 1112a of front substrate 1112 and the non-conductive border coating 1119 and non-conductive seal 1117 function to electrically isolate or insulate the connector 1124 and conductive adhesive 1123b from the conductive coating 1118 of front substrate 1112. The second connector 1124 may provide electrical power to the metal reflector coating or conductive layer 1120 on the rear substrate 1114, with the conductive adhesive 1123b acting as a raceway along a perimeter or border region of the front surface of the rear substrate 1114. The connectors 1122, 1124 may be connected to an appropriate power source, control, circuitry or the like for controlling the electrochromic cell or reflective element assembly.

Figure 35:
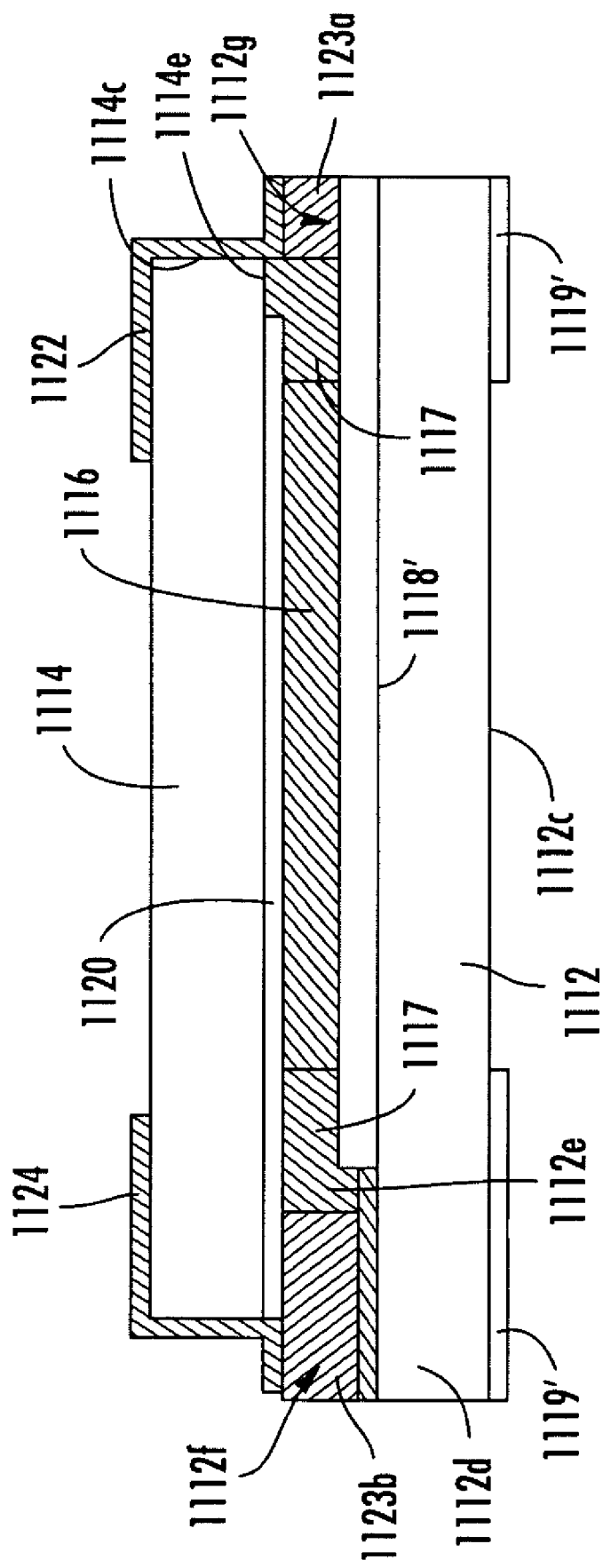
FIG. 35 is a sectional view of another electro-optic reflective element assembly in accordance with the present invention.
Figure 36:
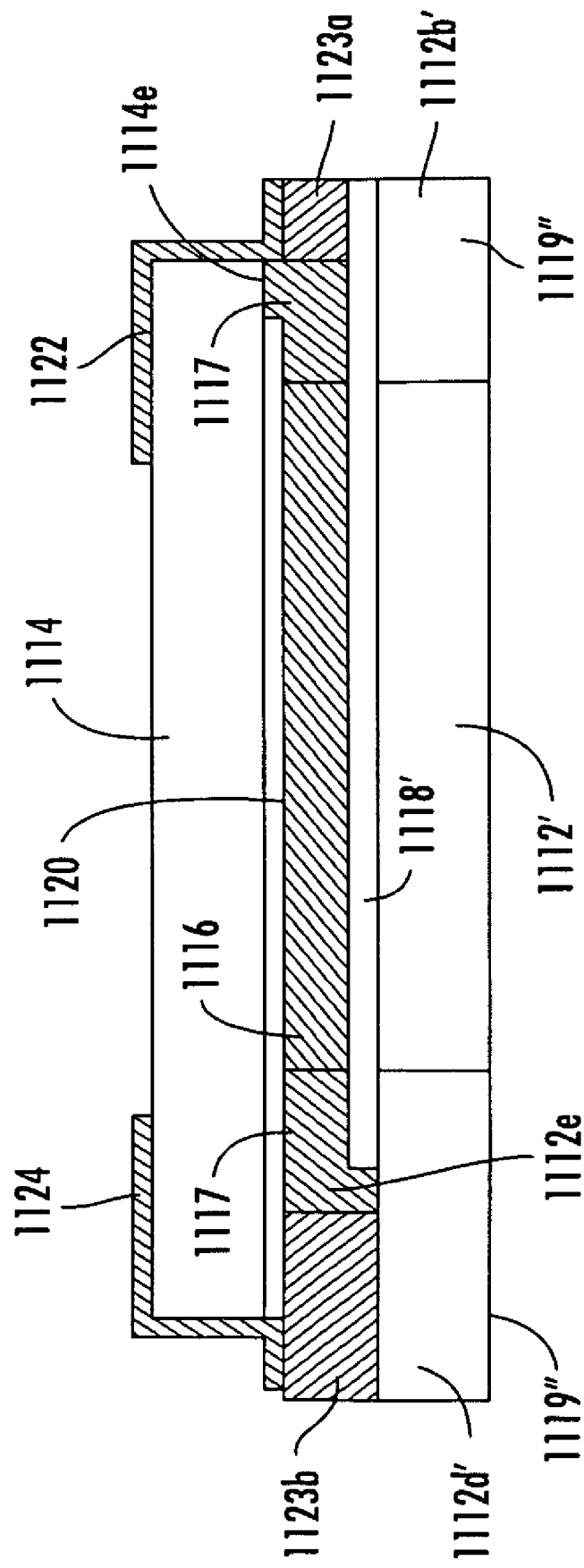
FIG. 36 is a sectional view of another electro-optic reflective element assembly in accordance with the present invention.

Optionally, and as shown in FIG. 35, an opaquifying non-conductive border coating or layer 1119' may be disposed along the front surface 1112c of front substrate 1112 to provide a decorative border coating along the perimeter or border regions of the front surface 1112c of front substrate 1112. The transparent semi-conductive coating or layer 1118' thus may be disposed on the rear surface 1112a of front substrate 1112 in a generally uniform thickness and may coat the border region 1112b, but may not extend to the border region 1112d, thereby defining a non-conductive area or electrically isolated area or non-conductive glass surface 1112e at the border region 1112d. The non-conductive glass surface 1112e and non-conductive seal 1117 function to electrically isolate or insulate the conductive coating 1118 of front substrate 1112 from connector 1124 and conductive adhesive 1123b generally at the overhang region 1112f. Likewise, and as described above, the conductive coating 1120 may not extend to the edge 1114c of rear substrate 1114 to define a non-conductive glass surface 1114e at and adjacent to connector 1122, so that connector 1122 is electrically isolated and insulated from conductive coating 1120 by non-conductive surface 114e and non-conductive seal 1117. Optionally, and as shown in FIG. 36, an opaquifying border 1119" may be embedded in the border regions 1112b', 1112d' of the front substrate 1112', such as via a radiation induced coloration in the glass of the substrate or via other means or processes.

Figure 37:
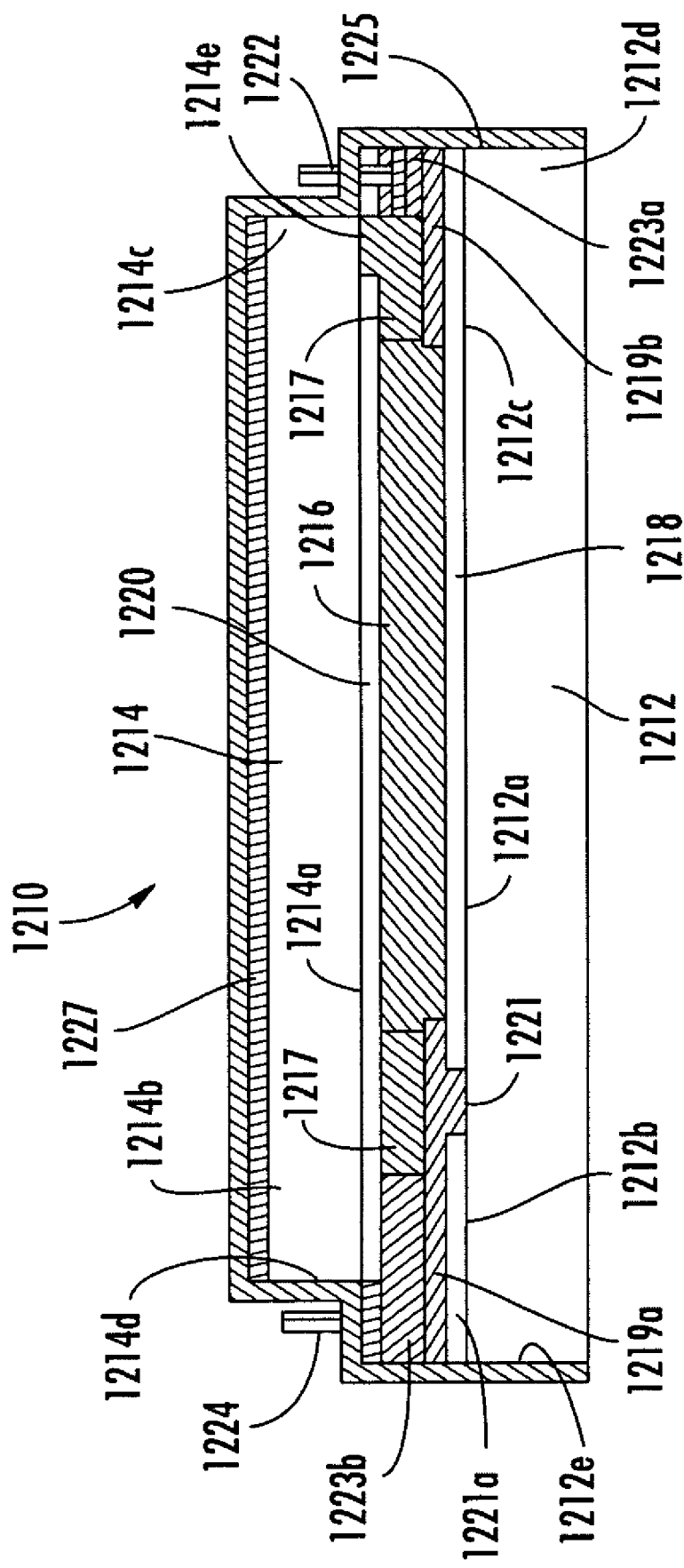
FIG. 37 is a sectional view of another electro-optic reflective element assembly in accordance with the present invention.

Referring now to FIG. 37, an electro-optic or electrochromic cell or reflective element assembly 1210 includes a front substrate 1212 and a rear substrate 1214 with an electro-optic or electrochromic medium 1216 sandwiched between a semi-conductive layer or coating (such as ITO or the like) 1218 on the rear surface 1212a of the front substrate 1212 and a conductive layer or coating (such as silver, silver alloy, or the like) 1220 on the front surface 1214a of the rear substrate 1214. The conductive coating 1220 of rear substrate 1214 does not extend fully to the edge 1214c of substrate 1214, so that a non-conductive glass surface or area or region 1214e is defined on surface 1214a along the perimeter portion at edge 1214c. A non-conductive perimeter seal 1217 is disposed around the electrochromic medium 1216 and may at least partially or substantially fill or cover or encompass the non-conductive glass surface 1214e. The non-conductive glass surface 1214e and non-conductive seal 1217 thus function to electrically isolate or insulate the conductive coating 1220 from the connector 1222 and conductive adhesive 1223a.

The front substrate 1212 includes an opaquifying or darkening or blackening or concealing or hiding non-conductive border coating 1219a disposed over the semi-conductive layer 1218 and around or along a perimeter region or border 1212b of the rear surface 1212a of the front substrate 1212, and an opaquifying conductive border coating 1219b disposed over the semi-conductive layer 1218 and around or along a perimeter region or border 1212c of the rear surface 1212a of the front substrate 1212. The transparent semi-conductive coating or layer 1218 may include a deletion line 1221 to define an electrically isolated area or region 1221a, with the non-conductive border coating 1219a disposed along the semi-conductive layer 1218 and over the deletion line 1221. The non-conductive border coating 1219a may at least partially or substantially fill in or encompass deletion line 1221. The non-conductive border coating 1219a and deletion line 1221 thus function to electrically isolate or insulate the conductive coating 1218 from electrical connector 1224.

In the illustrated embodiment, the reflective element assembly 1210 includes an encapsulant 1225 which substantially surrounds the rear and side edges of the reflective element assembly and may cover or overlay a heater pad or the like 1227 at the rear surface 1214b of the rear substrate 1214. The encapsulant 1225 extends along the edges 1214c, 1214d of rear substrate 1214, and further at least partially along the perimeter edges 1212d, 1212e of front substrate 1212. A metal connector 1222 may be provided through the encapsulant 1225 to power or energize the semi-conductive layer 1218 on rear surface 1212a of front substrate 1212 via a conductive bridge or epoxy or adhesive 1223a disposed at least partially around the connector 1222 and between the connector 1222 and the opaquifying conductive border coating 1219b. As can be seen in FIG. 37, the connector 1222 may be disposed generally within the conductive bridge 1223a and the non-conductive glass surface 1214e and non-conductive seal 1217 may separate or isolate the connector 1222 and conductive bridge 1223a from the conductive layer or coating 1220 of rear substrate 1214, in order to avoid contact or electrical communication between the connector 1222 and the conductive layer 1220 on front surface 1214a of rear substrate 1214.

Likewise, the metal connector 1224 may be provided through the encapsulant 1225 to power or energize the conductive layer 1220 on front surface 1214a of rear substrate 1214 via a conductive bridge or epoxy or adhesive 1223b disposed at least partially around the connector 1224 and between the connector 1224 and the opaquifying conductive border coating 1219a, and further between the opaquifying conductive border coating 1219a and the conductive layer 1220. The non-conductive border coating 1219a and deletion line 1221 thus serve to electrically isolate the connector 1224 and conductive bridge 1223b from conductive layer or coating 1218 of front substrate 1212.

Figure 38:
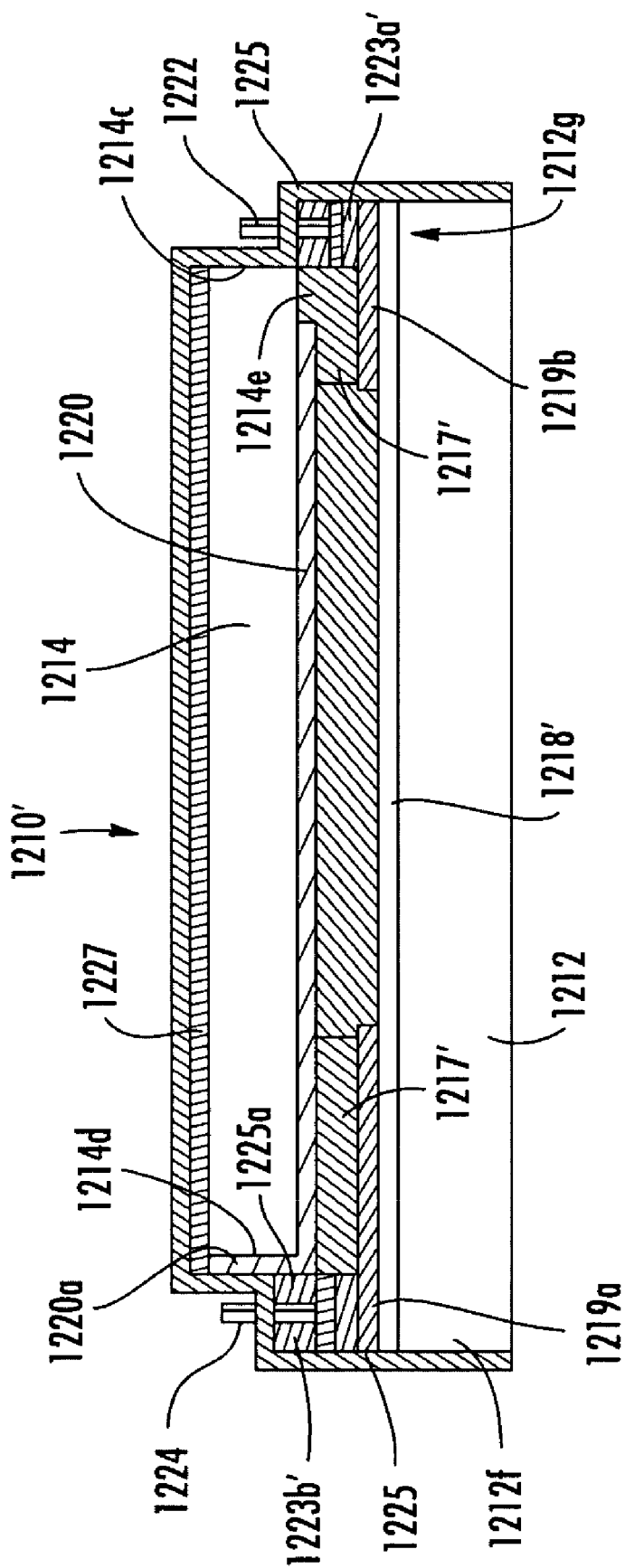
FIG. 38 is a sectional view of another electro-optic reflective element assembly in accordance with the present invention.

Optionally, and with reference to FIG. 38, the conductive bridge or adhesive 1223b' may be disposed at the overhang regions 1212f, 1212g of the front substrate 1212, with the perimeter seal 1217' disposed generally flush with the edges 1214c, 1214d of the rear substrate 1214. As can be seen in FIG. 38, the connectors 1222, 1224 may be positioned generally within the respective conductive bridges 1223a, 1223b', whereby the electrical contact to the conductive coating 1219b (and the semi-conductive layer 1218') and to the conductive layer 1220 is through the respective conductive bridges 1223a', 1223b'. The conductive metallic reflector layer 1220 on front surface 1214a of rear substrate 1214 may not be applied at the outer perimeter region of the front surface 1214a to provide a non-conductive glass surface or region or area 1214e at or near or adjacent to the connector 1222 and conductive bridge 1223a' to electrically isolate or insulate connector 1222 and conductive bridge 1223a' from conductive layer 1220 of rear substrate 1214.

The conductive bridge 1223b' may contact the conductive layer 1220 along an edge portion 1220a of the conductive layer. Optionally, in such an embodiment, the edge portion 1220a of the metallic reflector or conductive layer 1220 may wrap at least partially around the edge dimension 1214d of the rear substrate 1214 to extend partially along the edge 1214d, and the encapsulant 1225 may provide a cavity 1225a partially along the edge 1214d for receiving the conductive bridge or epoxy or adhesive or paste or frit or the like 1223b' to provide contact to the conductive layer 1220 along the wrapped edge portion 1220a of the conductive layer 1220 to enhance the electrical contact and conductivity from the connector 1224 to the conductive layer 1220. The reflective element assembly 1210' thus may provide an enlarged electro-optic or electrochromic region of the reflective element assembly by reducing the conductive bridge region for the conductive adhesive or bridge 1223b'.

Therefore, the present invention provides an electro-optic or electrochromic reflective element assembly that provides electrical contact to electrical raceways or conductive layers or coatings along regions or border or perimeter regions of the assembly that have a restricted overhang. The electrical connections may be made at overhang regions of the front substrate where the perimeter regions of the front substrate extend beyond the corresponding perimeter regions of the rear substrate, such that the electrical connectors are not viewable through the front surface of the front substrate. The present invention thus may provide a reduced or minimal bezel or no bezel assembly and may provide enhanced performance of the electrochromic mirror assembly. The conductive epoxy or adhesive or bridge may provide an electrical raceway along a perimeter or border portion of the semi-conductive and/or conductive layers of the substrates to provide rapid electrical flow along the layers or coatings to further provide rapid and substantially uniform darkening or coloring of the electrochromic medium. The connectors and bridges of the present invention facilitate such enhanced performance at a restricted overhang region and thus provide for a minimal bezel or no bezel around the perimeter of the reflective element assembly. The electrical connectors are electrically isolated or insulated from the other conductive layer or coating via a non-conductive surface and non-conductive seal being positioned between the connector and the respective other conductive layer.

In the embodiments described above, it is envisioned that the non-conductive glass surfaces (where applicable) may be formed by masking the surface of the substrate during coating or deposition of the conductive layer or coating, or may be formed by etching (such as laser etching, chemical etching, mechanical etching or the like) or otherwise removing the conductive layer or coating at the desired area or region, such as via a high voltage discharge to remove or burn the coating off of the desired area or region. The masked portion or etched portion or non-conductive portion may be generally at the outer perimeter or edge of the coating, and may have a width of approximately 0.05 mm, or approximately 0.1 mm, or up to approximately 1 mm. The masked portion or non-conductive surface may be partially or substantially filled or encompassed by the non-conductive seal or by other non-conductive layers or the like disposed at the surface of the substrate. Likewise, the deletion lines (where applicable) may be formed on and through the respective conductive or semi-conductive layer to define electrically isolated areas or regions of the layers. The deletion lines may be formed via any known manner, such as via chemical etching, mechanically etching or, and preferably, laser etching of the layers. The size or width of the deletion line is selected to be sufficient to create an electrical break so there is no electrical conductivity between the layer and the electrically isolated region of the layer. Typically, the deletion lines may be formed to be approximately 0.01 mm to approximately 0.5 mm or thereabouts.

Also, the perimeter seal that generally surrounds the electrochromic medium and spaces the front and rear substrates may have a width of preferably approximately 0.5 mm to approximately 3 mm, more preferably approximately 1 mm to approximately 2 mm, and most preferably approximately 1.25 mm to approximately 1.75 mm. The overhang that is defined at the edges of the substrates (where, for example, the rear substrate may be smaller than the front substrate) may be preferably approximately 0.1 mm to approximately 2 mm, more preferably approximately 0.25 mm to approximately 1.5 mm, and most preferably approximately 0.75 mm to approximately 1.25 mm.

In addition to other materials to be used as conductive busbars (such as silver frit, paste, conductive inks, and/or the like), optionally, ultrasonic soldering techniques may be used to apply a busbar which consists of solder (typically, standard soldering technique may not provide good adhesion/flow between the solder and a glass substrate). The solder can be used to provide a busbar for an semi-conductive coating (such as ITO or the like) or for a metallic coating. For example, an ultrasonic soldering system made by Asahi Glass company of Japan (e.g., Model: Sunbonder USM-3) may be used for applying this special solder. The solders that may be used include, for example, ultrasonic solders 143 and 297, available from Asahi Glass company. However, other materials may be implemented, such as conductive inks, pastes, frits, and the like, without affecting the scope of the present invention.

Figure 39:
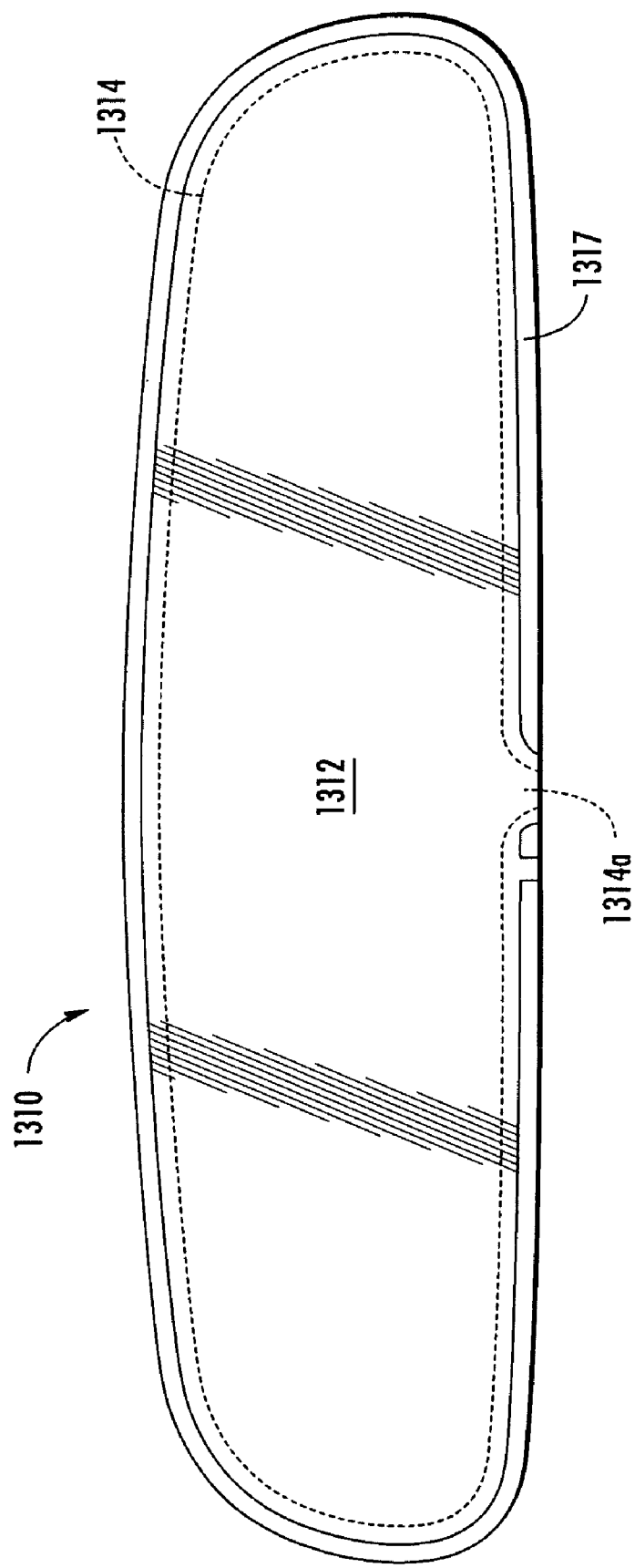
FIG. 39 is a plan view of another electro-optic reflective element assembly in accordance with the present invention.

Optionally, and with reference to FIG. 39, the rear or smaller substrate 1314 of an electro-optic or electrochromic cell or reflective element assembly 1310 may be formed to have a tab out portion or protrusion 1314a along one edge. The electro-optic or electrochromic medium may then be injected through an opening or gap in the perimeter seal 1317 (that spaces the front substrate 1312 from the rear substrate 1314) that generally corresponds with the outward protrusion 1314a of the rear substrate 1314. A plug is applied or inserted into the gap to seal the electrochromic medium within the perimeter seal and the substrates after the electrochromic medium is injected. Typically, such plugs may be difficult to insert in non-flush edges of mirror cells because they may be visible if they are inserted too far into the gaps in the seals. The tab out portion 1314a of the rear substrate 1314 provides an edge portion that is generally flush with the front substrate to provide a larger area for the plug to be positioned at without having the plug insert into the area where it may be visible to a user of the mirror assembly. Optionally, an opaquifying or hiding or darkening layer of the reflective element assembly (if applicable) may be expanded in that area to cover or conceal or hide the plug and tab out portion.

Optionally, the electro-optic or electrochromic cell or reflective element assembly of the present invention and the electrical connectors thereon or therearound may be coated with a protective coating to limit or reduce corrosion that may occur on the electrical connectors over time. The coating may comprise a parylene coating or parylene C coating or the like to enhance corrosion resistance (or may comprise other known parylene coatings, such as a parylene N coating, a parylene D coating or a parylene HT coating or the like). Such a parylene coating may be formed in a plasma chamber or vacuum applied and is highly penetrating or permeating so that the parylene coating may penetrate and surround the metal electrical clips or pins or connectors and seal them to limit corrosion of the electrical components. The parylene coating may comprise a thin coating (such as, for example, approximately 2.5 µm to about 12.5 µm) which coats and permeates anything placed in the chamber and not otherwise covered or masked. The parylene coating may comprise a vacuum applied polymer that is either in a gaseous or solid state, and may possess substantial dielectric and barrier properties per unit thickness. Such parylene coatings are known and are typically used in position sensor applications, intake manifold pressure sensor applications, gas sensor applications and valve cover gasket applications for vehicles.

For example, an electrical clip or connector may be in contact with the semi-conductive or conductive layer and may be susceptible or vulnerable to corrosion at the point where the two come in contact (particularly in a high moisture or salt environment and particularly for exterior rearview mirror assemblies). A parylene coating may be applied to substantially seal the connector at the semi-conductive or conductive layer to resist such corrosion. The electrochromic cell or reflective element assembly (with electrical contacts or connectors attached thereto) may be placed in a chamber and the parylene coating may be applied, such as via a vacuum vapor deposition process or the like. Optionally, two or more cells may be stacked in a stepped or offset manner, such that the edges of each cell are exposed to the parylene coating, while the above and below cell act as a mask over the rest of the cell. The parylene coating thus may only be applied to the offset area. The cells of the stack of cells thus may act as a self masking element for the other cells of the stack. Such a self masking approach with multiple cells may be particularly useful for parylene coatings because of the amount of time that it typically may take to coat an item with such parylene coatings.

The parylene raw material (di-para-xylylene dimer) is a crystalline powder and may be vaporized at approximately 150 degrees C. and then molecularly cleaved or pyrolyzed at approximately 680 degrees C. This forms the para-xylylene, which may be introduced generally at room temperature into a vacuum deposition chamber as a monomeric gas that polymerizes substantially evenly on the substrates. The coating then grows as a conformal film on all of the exposed surfaces, edges, etc. of the substrates or cells.

Testing has shown that a known conventional corrosion protection coating or seal may allow corrosion of the electrical contacts and failure of the mirror after about 12 weeks in a salt spray test chamber (such as a test chamber conducting tests in accordance with ASTM B-117, which is hereby incorporated herein by reference), while a substantially identical or similar mirror coated with a parylene C coating may be substantially unchanged, with the electrical contacts remaining at least substantially uncorroded, after about 22 weeks in the same salt spray test chamber and undergoing the same salt spray test. The parylene coating thus provides substantial enhancement of corrosion resistance and the mirror reflective element life cycle over known mirror corrosion protection means.

Optionally, the mirror assemblies or reflective element assemblies or cells of the present invention may include one or more displays for displaying information to the driver or occupant of the vehicle. Optionally, the conductive or semi-conductive layers of the reflective element assembly may have a metallic layer which may be absent or removed at portions, such as to create a local window for placement therebehind of a light emitting display, such as a compass display or PSIR display or other informational display or the like, such as a display of the type disclosed in commonly assigned U.S. Pat. Nos. 6,222,460 and 6,326,900, which are hereby incorporated herein by reference in their entireties, but while maintaining at least the underlying semi-conducting layer at the local window region so that electrical connection through the electrochromic medium at that local region is sustained.

Optionally, the reflective element assembly of the present invention may include other display systems or elements (not shown) which are operable to provide, emit or display information or light through the reflective element assembly. The light is emitted through the reflective element assembly at a display area, such that the display information or light is viewable by a driver of the vehicle. The second or rear substrate and the respective semi-conductive layers of the reflective element assembly or cell then comprise a transflective one way mirror, such as disclosed in commonly assigned U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference. Preferably, the reflective element assembly (behind which the display is disposed so that the information displayed is visible by viewing through the reflective element assembly) of the mirror assembly comprises a transflective mirror reflector or reflective element assembly such that the mirror reflective element assembly is significantly transmitting to visible light incident from its rear (i.e., the portion furthest from the driver in the vehicle), while simultaneously, the mirror reflective element assembly is substantially reflective to visible light incident from its front (i.e. the position closest to the driver when the mirror assembly is mounted in the vehicle, such as is disclosed in U.S. patent application Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268; and/or in U.S. Pat. Nos. 5,668,663 and 5,724,187, the entire disclosures of which are hereby incorporated by reference herein.

The display system preferably comprises a display-on-demand type of display and includes a display element or light emitting device (also not shown) positioned at the back or fourth surface of the rear substrate. The display element is operable to emit light, such as in the form of indicia, alphanumeric characters, images, or the like, in response to a control or input. The display element may be a vacuum fluorescent (VF) display, a light emitting diode (LED), an organic light emitting diode (OLED), a gas discharge display, a plasma display, a cathode ray tube, a backlit active matrix LCD screen, an electroluminescent display, a field emission display or the like, without affecting the scope of the present invention. The particular display element may be selected to provide a desired color to the display. For example, a VF display may be selected to provide a blue-green color or other colors to the information displayed (depending on the phosphor selected for the display), while a light emitting diode may be selected to provide other colors, such as reds, ambers, or other colors.

Preferably, the display is a display-on-demand type of display, such as of the types disclosed in commonly assigned U.S. Pat. Nos. 5,668,663 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; and/or Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268, which are all hereby incorporated herein by reference. With such a display, it is not only desirable to adjust the display brightness according to ambient lighting conditions, but it is also desirable to adjust the display brightness such that a sufficient contrast ratio is maintained against the variable background brightness of the reflected scene. Also, it may be desirable to compensate for changes in transmission of the electrochromic device affected to control rearward glare sources, in order that the display brightness appears to be maintained at a generally constant level.

In certain conditions, the ambient light intensity within the cabin of the vehicle may be sufficiently high so that reflected light from the mirror reflective element and, in particular, from the display region, tends to "wash-out" the display. It is envisioned that this glare may be reduced by taking advantage of the electrochromic function of the mirror assembly. More particularly, the electro-optic or electrochromic medium of the electro-optic or electrochromic reflective element assembly may be colored or darkened in the area of the display by constructing a locally addressable region across the display. This may be achieved by creating a deletion line in the second surface semi-conductive layer at the second surface of the first or front substrate and/or in the third surface semi-conductive layer of the rear substrate, hence breaking electrical continuity from the rest of the electrochromic cell. An ambient light sensor (not shown) may be used to detect the critical ambient light levels at which "wash-out" is a problem. The addressable region may then be separately colored or darkened to the appropriate level to reduce the glare from the display area in response to the ambient light sensor. Although such a glare problem could be solved by coloring the entire mirror, by localizing the region of coloration to only the display area, the electrochromic mirror assembly of the present invention allows the rest of the mirror reflective area, which does not incorporate the display, to retain full reflectivity while the display area is colored or darkened (such as may be useful when driving by day).

In order to maintain easy viewing of the display, it is desirable to adjust the display intensity in response to ambient light levels (in order to avoid washout during daytime driving conditions and glare during nighttime driving conditions) and in response to the degree of transmissivity of the electrochromic reflective element. For example, in low lighting conditions, such as during the nighttime, the intensity of the display may be dimmed to avoid glare, while in higher lighting conditions, such as during the daytime, the intensity of the display may be increased to provide sufficient visibility of the display to the driver of the vehicle. The mirror assembly may include light sensors for sensing the ambient light in the cabin of the vehicle or at the mirror assembly and may include a control which is operable to automatically adjust the display intensity and/or the transmissivity of the electrochromic medium in response to the ambient light sensors.

Further, automatic dimming circuitry used in electro-optic or electrochromic mirror assemblies utilizing the reflective element assemblies of the present invention may utilize one or more (typically two) photo sensors to detect glaring and/or ambient lighting. For example, a silicon photo sensor, such as a TSL235R Light-to-Frequency converter (available from Texas Advanced Optoelectronic Solutions Inc. of Plano, Tex.), can be used as such photo sensors. Such light-to-frequency converters comprise the combination of a silicon photodiode and a current-to-frequency converter on a single monolithic CMOS integrated circuit.

The reflective element assembly or assemblies of the present invention may also include or house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays, such as shown in U.S. Pat. Nos. 5,530,240 and 6,329,925, blind spot detection systems, such as disclosed in U.S. Pat. No. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245, 5,673,994; 5,649,756; or 5,178,448, microphones, such as disclosed in U.S. Pat. Nos. 6,243,003 and 6,278,377, speakers, a compass, such as disclosed in U.S. Pat. No. 5,924,212, a seat occupancy detector, a trip computer, an ONSTAR® system or the like (with all of the above-referenced patents commonly assigned to Donnelly Corporation, and with the disclosures of the referenced patents being hereby incorporated herein by reference in their entireties).

The reflective element assembly or assemblies of the present invention may include a printed circuit board (PCB), which may be attached to the rear surface (e.g. the fourth surface) of the mirror element by, for example, a suitable adhesive or the like. An example of such an arrangement is disclosed in commonly assigned U.S. Pat. No. 5,820,245, which is hereby incorporated herein by reference in its entirety. The PCB optionally may include glare sensing and ambient photo sensors and electrochromic circuitry that automatically dims the reflectivity of the electrochromic mirror element when glare conditions are detected, such as at nighttime or the like. Alternately, the PCB may be snap connected, by a clip or otherwise attached, to a plastic plate that itself is adhered to the electrochromic element.

The printed circuit board may include electronic or electrical circuitry for actuating the variable reflectance of the reflective element and for operating other electrical or electronic functions supported in the rearview mirror assembly. The circuit board may support, for example, light emitting diodes (LEDs) for illuminating indicia on display elements provided on the chin of the bezel of the mirror assembly or display devices provided on the reflective element, or map or dash board lights or the like. The circuit board may be independently supported from the reflective element or in the casing or may be mounted to the reflective element's rear or fourth surface on a separate plate or may be directly adhered to the rear surface by a suitable adhesive. Reference is made to U.S. Pat. Nos. 5,671,996 and 5,820,245, the disclosures of which are hereby incorporated herein by reference in their entireties.

Therefore, the present invention provides an electro-optic or electrochromic reflective element assembly which requires a minimal bezel or no bezel around the perimeter edges of the reflective element assembly. The reflective element assembly may provide for electrical connection to the conductive layer at the front substrate that is substantially non viewable through the front substrate. The present invention may also provide a reflective element assembly which may provide a flush alignment of the edges of the substrates along at least one side or edge, while providing a relief area for electrical connection to one of the substrates along the flush or aligned edges. The reflective element assembly of the present invention provides enhanced manufacturing of the reflective element assembly, since the flush alignment of the substrates obviates the need for stepped spacers or pins positioned along the upper or lower edges of the substrates during assembly of the reflective element assembly.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. An interior rearview mirror assembly adapted for mounting to an interior portion of a vehicle, said interior rearview mirror assembly comprising:
   a reflective element assembly comprising a front substrate and a rear substrate with an electro-optic medium sandwiched therebetween;
   wherein said electro-optic medium is disposed between said front substrate and said rear substrate in a cavity established by a perimeter seal that connects said front substrate to said rear substrate and that spaces said front substrate apart from said rear substrate;
   wherein said front substrate defines a first overhang region at a first perimeter edge of said front substrate that extends beyond a corresponding first perimeter edge of said rear substrate;
   wherein said front substrate has a first surface and a second surface opposite said first surface, said second surface facing said electro-optic medium;
   at least one first electrically conductive layer disposed on said second surface of said front substrate, wherein said at least one first electrically conductive layer comprises a transparent electrically conductive layer;
   wherein said rear substrate has a third surface and a fourth surface opposite said third surface, said third surface facing said electro-optic medium;
   at least one second electrically conductive layer disposed on said third surface of said rear substrate, wherein said at least one second electrically conductive layer includes a metallic reflective layer;
   a substantially non-transparent perimeter band disposed at said second surface of said front substrate and around a perimeter border region of said second surface of said front substrate, wherein said perimeter band is not specularly reflective to visible light that passes through said first substrate and is incident on said perimeter band, and wherein said perimeter band renders said perimeter seal at least substantially unobservable to a driver of a vehicle normally operating the vehicle and viewing said reflective element assembly when said interior rearview mirror assembly is normally mounted in the equipped vehicle;
   a first electrical connection at said first electrically conductive layer at said first overhang region;
   a second electrical connection at said second electrically conductive layer; and
   wherein said perimeter band is dimensioned so as to render the presence of said perimeter seal and at least said first electrical connection substantially unobservable to a driver normally viewing said reflective element assembly when the vehicle is normally equipped with said interior rearview mirror assembly.

2. The interior rearview mirror assembly of claim 1, wherein said perimeter band renders the presence of said second electrical connection substantially unobservable to a driver normally viewing said reflective element assembly when the vehicle is normally equipped with said interior rearview mirror assembly.

3. The interior rearview mirror assembly of claim 1, wherein said perimeter band comprises a dark colored perimeter band.

4. The interior rearview mirror assembly of claim 3, wherein said perimeter band comprises an electrically conductive layer.

5. The interior rearview mirror assembly of claim 4, wherein said perimeter band comprises a layer of chromium oxide.

6. The interior rearview mirror assembly of claim 1, wherein said perimeter band comprises a layer of non-electrically conductive material, and wherein said first electrically conductive layer is at least partially disposed over at least a portion of said perimeter band so that said at least a portion of said perimeter band is sandwiched between at least a portion of said first electrically conductive layer and said second surface of said front substrate.

7. The interior rearview mirror assembly of claim 1, wherein an electrically conductive tab portion, that is in electrical contact with said second electrically conductive layer, extends from said perimeter seal and outward towards a second perimeter edge of said rear substrate.

8. The interior rearview mirror assembly of claim 7, wherein said second electrical connection is made at said electrically conductive tab portion.

9. The interior rearview mirror assembly of claim 8 further comprising a second overhang region at a second perimeter edge of said front substrate that extends beyond said second perimeter edge of said rear substrate, and wherein said second overhang region overhangs at said second perimeter edge of said rear substrate that said electrically conductive tab portion extends outward from said seal towards.

10. The interior rearview mirror assembly of claim 1, wherein said rear substrate defines a second region at a second perimeter edge of said rear substrate that extends beyond a corresponding second perimeter edge of said front substrate, and wherein said second electrical connection is made at said second region.

11. The interior rearview mirror assembly of claim 1, wherein said rear substrate has a smaller dimension across a dimension of said rear substrate than a corresponding dimension across said front substrate, and wherein said front substrate defines a second overhang region at a second perimeter edge of said front substrate that extends beyond a corresponding second perimeter edge of said rear substrate, and wherein said second electrical connection is made at said second overhang region.

12. The interior rearview mirror assembly of claim 1, wherein said second electrical connection is made at a second overhang region at a second perimeter edge of said front substrate that extends beyond a corresponding second perimeter edge of said rear substrate.

13. The interior rearview mirror assembly of claim 12, wherein said first and second overhang regions are separated by a dimension of said front substrate, and wherein said dimension of the said front substrate comprises a width dimension of said front substrate or a length dimension of said front substrate.

14. The interior rearview mirror assembly of claim 12, wherein said second electrical connection comprises a conductive epoxy making electrical connection with said second electrically conductive layer and a metal element making electrical contact with said conductive epoxy.

15. The interior rearview mirror assembly of claim 1, wherein said first electrical connection comprises a conductive epoxy making electrical connection with said first electrically conductive layer and a metal element making electrical contact with said conductive epoxy.

16. The interior rearview mirror assembly of claim 1, wherein said perimeter band comprises at least one of a metal compound layer, a chrome oxide layer, a nickel oxide layer, a silver oxide layer and a frit layer.

17. The interior rearview mirror assembly of claim 1, wherein said interior rearview mirror assembly comprises an interior video mirror assembly adapted for mounting to an interior portion of the vehicle, said interior video mirror assembly comprising a video display disposed to the rear of said reflective element assembly, and wherein said video display is operable, on demand, to be viewable by a driver viewing said reflective element assembly of said interior video mirror assembly when mounted at the interior portion of the vehicle.

18. An interior rearview mirror assembly adapted for mounting to an interior portion of a vehicle, said interior rearview mirror assembly comprising:

a reflective element assembly comprising a front substrate and a rear substrate with an electrochromic medium sandwiched therebetween;

wherein said electrochromic medium is disposed between said front substrate and said rear substrate in a cavity established by a perimeter seal that connects said front substrate to said rear substrate and that spaces said front substrate apart from said rear substrate;

wherein said rear substrate has a smaller dimension across a dimension of said rear substrate than a corresponding dimension across said front substrate such that said front substrate defines a first overhang region at a first perimeter edge of said front substrate that extends beyond a corresponding first perimeter edge of said rear substrate and a second overhang region at a second perimeter edge of said front substrate that extends beyond a corresponding second perimeter edge of said rear substrate;

wherein said front substrate has a first surface and a second surface opposite said first surface, said second surface facing said electrochromic medium;

at least one first electrically conductive layer disposed on said second surface of said front substrate, wherein said at least one first electrically conductive layer comprises a transparent electrically conductive layer;

wherein said rear substrate has a third surface and a fourth surface opposite said third surface, said third surface facing said electrochromic medium;

at least one second electrically conductive layer disposed on said third surface of said rear substrate, wherein said at least one second electrically conductive layer includes a metallic reflective layer;

a substantially non-transparent perimeter band disposed at said second surface of said front substrate and around a perimeter border region of said second surface of said front substrate, wherein said perimeter band is not specularly reflective to visible light that passes through said first substrate and is incident on said perimeter band, and wherein said perimeter band renders said perimeter seal at least substantially not noticeable to a driver of a vehicle normally operating the vehicle and viewing said reflective element assembly when said interior rearview mirror assembly is normally mounted in the equipped vehicle;

a first electrical connection at said first electrically conductive layer at said first overhang region;

a second electrical connection at said second electrically conductive layer at said second overhang region; and wherein said perimeter band is dimensioned so as to render the presence of said perimeter seal and said first and second electrical connections substantially not noticeable to a driver normally viewing said reflective element assembly when the vehicle is normally equipped with said interior rearview mirror assembly.

19. The interior rearview mirror assembly of claim 18, wherein said perimeter band comprises a dark colored perimeter band.

20. The interior rearview mirror assembly of claim 19, wherein said perimeter band comprises an electrically conductive layer.

21. The interior rearview mirror assembly of claim 20, wherein said perimeter band comprises a layer of chromium oxide.

22. The interior rearview mirror assembly of claim 18, wherein said perimeter band comprises a layer of non-electrically conductive material, and wherein said first electrically conductive layer is at least partially disposed over at least a portion of said perimeter band so that said at least a portion of said perimeter band is sandwiched between at least a portion of said first electrically conductive layer and said second surface of said front substrate.

23. The interior rearview mirror assembly of claim 18, wherein said second electrically conductive layer includes an electrically conductive tab portion that extends from said perimeter seal and outward towards a second perimeter edge of said rear substrate, and wherein said second electrical connection is made at said electrically conductive tab portion of said at least one second electrically conductive layer.

24. The interior rearview mirror assembly of claim 18, wherein said first and second overhang regions are separated by a dimension of said front substrate, and wherein said dimension of the said front substrate comprises a width dimension of said front substrate or a length dimension of said front substrate.

25. The interior rearview mirror assembly of claim 18, wherein said second electrical connection comprises a conductive epoxy making electrical connection with said second electrically conductive layer and a metal element making electrical contact with said conductive epoxy.

26. The interior rearview mirror assembly of claim 18, wherein said first electrical connection comprises a conductive epoxy making electrical connection with said first electrically conductive layer and a metal element making electrical contact with said conductive epoxy.

27. The interior rearview mirror assembly of claim 18, wherein said interior rearview mirror assembly comprises an interior video mirror assembly adapted for mounting to an interior portion of the vehicle, said interior video mirror assembly comprising a video display disposed to the rear of said reflective element assembly, and wherein said video display is operable, on demand, to be viewable by a driver viewing said reflective element assembly of said interior video mirror assembly when mounted at the interior portion of the vehicle.

28. An interior rearview mirror assembly adapted for mounting to an interior portion of a vehicle, said interior rearview mirror assembly comprising:

a reflective element assembly comprising a front substrate and a rear substrate with an electro-optic medium sandwiched therebetween;

wherein said electro-optic medium is disposed between said front substrate and said rear substrate in a cavity established by a perimeter seal that connects said front substrate to said rear substrate and that spaces said front substrate apart from said rear substrate;

wherein said front substrate defines a first overhang region at a first perimeter edge of said front substrate that extends beyond a corresponding first perimeter edge of said rear substrate;

wherein said front substrate has a first surface and a second surface opposite said first surface, said second surface facing said electro-optic medium;

at least one first electrically conductive layer disposed on said second surface of said front substrate, wherein said at least one first electrically conductive layer comprises a transparent electrically conductive layer;

wherein said rear substrate has a third surface and a fourth surface opposite said third surface, said third surface facing said electro-optic medium;

at least one second electrically conductive layer disposed on said third surface of said rear substrate, wherein said at least one second electrically conductive layer includes a metallic reflective layer;

a substantially non-transparent dark colored perimeter band disposed at said second surface of said front substrate and around a perimeter border region of said second surface of said front substrate, wherein said perimeter band is not specularly reflective to visible light that passes through said first substrate and is incident on said perimeter band, and wherein said perimeter band renders said perimeter seal at least substantially not noticeable to a driver of a vehicle normally operating the vehicle and viewing said reflective element assembly when said interior rearview mirror assembly is normally mounted in the equipped vehicle;

a first electrical connection at said first electrically conductive layer at said first overhang region;

a second electrical connection at said second electrically conductive layer;

wherein said perimeter band is dimensioned so as to render the presence of said perimeter seal and at least said first electrical connection substantially not noticeable to a driver normally viewing said reflective element assembly when the vehicle is normally equipped with said interior rearview mirror assembly; and wherein said interior rearview mirror assembly comprises an interior video mirror assembly adapted for mounting to an interior portion of the vehicle, said interior video mirror assembly comprising a video display disposed to the rear of said reflective element assembly, and wherein said video display is operable, on demand, to be viewable by a driver viewing said reflective element assembly of said interior video mirror assembly when mounted at the interior portion of the vehicle.

29. The interior rearview mirror assembly of claim 28, wherein said perimeter band renders the presence of said second electrical connection substantially unobservable to a driver normally viewing said reflective element assembly when the vehicle is normally equipped with said interior rearview mirror assembly.

30. The interior rearview mirror assembly of claim 28, wherein said perimeter band comprises an electrically conductive layer.

31. The interior rearview mirror assembly of claim 30, wherein said perimeter band comprises a layer of chromium oxide.

32. The interior rearview mirror assembly of claim 28, wherein said perimeter band comprises a layer of non-electrically conductive material, and wherein said first electrically conductive layer is at least partially disposed over at least a portion of said perimeter band so that said at least a portion of said perimeter band is sandwiched between at least a portion of said first electrically conductive layer and said second surface of said front substrate.

33. The interior rearview mirror assembly of claim 28, wherein said second electrically conductive layer includes an electrically conductive tab portion that extends from said perimeter seal and outward towards a second perimeter edge of said rear substrate, and wherein said second electrical connection is made at said electrically conductive tab portion of said at least one second electrically conductive layer.

34. The interior rearview mirror assembly of claim 28, wherein said rear substrate defines a second region at a second perimeter edge of said rear substrate that extends beyond a corresponding second perimeter edge of said front substrate, and wherein said second electrical connection is made at said second region.

35. The interior rearview mirror assembly of claim 28, wherein said rear substrate has a smaller dimension across a dimension of said rear substrate than a corresponding dimension across said front substrate such that said front substrate defines said first overhang region, and wherein said front substrate defines a second overhang region at a second perimeter edge of said front substrate that extends beyond a corresponding second perimeter edge of said rear substrate, and wherein said second electrical connection is made at said second overhang region.

36. The interior rearview mirror assembly of claim 28, wherein said second electrical connection is made at a second overhang region at a second perimeter edge of said front substrate that extends beyond a corresponding second perimeter edge of said rear substrate.

37. The interior rearview mirror assembly of claim 36, wherein said first and second overhang regions are separated by a dimension of said front substrate, and wherein said dimension of the said front substrate comprises a width dimension of said front substrate or a length dimension of said front substrate.

38. The interior rearview mirror assembly of claim 36, wherein said second electrical connection comprises a conductive epoxy making electrical connection with said second electrically conductive layer and a metal element making electrical contact with said conductive epoxy.

39. The interior rearview mirror assembly of claim 28, wherein said first electrical connection comprises a conductive epoxy making electrical connection with said first electrically conductive layer and a metal element making electrical contact with said conductive epoxy.

\* \* \* \* \*

UNITED STATES PATENT AND TRADEMARK OFFICE
CERTIFICATE OF CORRECTION

PATENT NO. : 7,710,631 B2  Page 1 of 1
APPLICATION NO. : 12/429620
DATED : May 4, 2010
INVENTOR(S) : McCabe et al.

It is certified that error appears in the above-identified patent and that said Letters Patent is hereby corrected as shown below:

Column 4
Line 47, insert --at-- after "at"

Column 8
Line 61, delete "," after "SYSTEMS"

Column 9
Line 27, "minors" should be --mirrors--

Column 12
Line 49, "another, Electrical" should be --another. Electrical--

Column 16
Line 34, insert --at-- after "at"

Column 18
Line 52, delete "," after "521"

Column 31
Line 23, "coating 119" should be --coating 1119--

Column 32
Line 33, "surface 114e" should be --surface 1114e--

Signed and Sealed this

Thirty-first Day of August, 2010

David J. Kappos
*Director of the United States Patent and Trademark Office*